US009440858B2

(12) United States Patent
Lipka et al.

(10) Patent No.: US 9,440,858 B2
(45) Date of Patent: Sep. 13, 2016

(54) CARBON PARTICLES

(75) Inventors: Stephen M. Lipka, Nicholasville, KY (US); Christopher R. Swartz, Lexington, KY (US)

(73) Assignee: UNIVERSITY OF KENTUCKY RESEARCH FOUDATION, Lexington, KY (US)

( * ) Notice: Subject to any disclaimer, the term of this patent is extended or adjusted under 35 U.S.C. 154(b) by 190 days.

(21) Appl. No.: 14/003,978

(22) PCT Filed: Mar. 15, 2012

(86) PCT No.: PCT/US2012/029247
§ 371 (c)(1),
(2), (4) Date: Oct. 16, 2013

(87) PCT Pub. No.: WO2012/125839
PCT Pub. Date: Sep. 20, 2012

(65) Prior Publication Data
US 2014/0027677 A1    Jan. 30, 2014

Related U.S. Application Data

(60) Provisional application No. 61/465,153, filed on Mar. 15, 2011, provisional application No. 61/453,450, filed on Mar. 16, 2011, provisional application No. 61/487,198, filed on May 17, 2011, provisional application No. 61/569,484, filed on Dec. 12, 2011.

(51) Int. Cl.
C01B 31/02    (2006.01)
C01B 31/12    (2006.01)
H01B 1/24    (2006.01)
H01M 4/587    (2010.01)
H01G 11/34    (2013.01)
H01G 9/00    (2006.01)
H01G 11/06    (2013.01)

(52) U.S. Cl.
CPC ............ *C01B 31/125* (2013.01); *C01B 31/02* (2013.01); *H01B 1/24* (2013.01); *H01G 9/0029* (2013.01); *H01G 11/34* (2013.01); *H01M 4/587* (2013.01); *C01P 2004/32* (2013.01); *C01P 2004/60* (2013.01); *C01P 2006/12* (2013.01); *C01P 2006/14* (2013.01); *H01G 11/06* (2013.01); *Y02E 60/13* (2013.01); *Y02T 10/7022* (2013.01)

(58) Field of Classification Search
CPC .. C01B 31/02; C01B 31/125; H01G 9/0029; H01B 1/04
USPC ....... 252/502; 423/445 R, 460, 461; 361/305
See application file for complete search history.

(56) References Cited

U.S. PATENT DOCUMENTS

| | | | |
|---|---|---|---|
| 5,904,980 A | 5/1999 | Rivas | |
| 7,541,312 B2* | 6/2009 | Dietz | B01J 20/20 423/445 R |
| 7,771,628 B2 | 8/2010 | Barker et al. | |
| 7,947,246 B2* | 5/2011 | Cadek | C01B 31/02 252/502 |
| 8,388,922 B2* | 3/2013 | Sotowa | H01M 4/0433 29/623.1 |
| 8,404,384 B2* | 3/2013 | Feaver | C01B 31/00 423/445 R |
| 8,405,955 B2* | 3/2013 | Gadkaree | H01G 11/26 361/502 |
| 8,784,768 B2* | 7/2014 | Cai | C01B 31/08 423/445 R |
| 2005/0227146 A1 | 10/2005 | Ghantous et al. | |
| 2006/0093915 A1* | 5/2006 | Lundquist | C01B 31/10 429/231.8 |
| 2006/0128946 A1* | 6/2006 | Weiner | A61K 38/51 530/370 |
| 2006/0291140 A1* | 12/2006 | Kazaryan | H01G 11/46 361/502 |
| 2007/0015012 A1 | 1/2007 | Bujard et al. | |
| 2008/0170982 A1 | 7/2008 | Zhang et al. | |
| 2008/0254972 A1* | 10/2008 | Istvan | C01B 31/10 502/182 |
| 2010/0028745 A1 | 2/2010 | Salguero et al. | |
| 2010/0033902 A1* | 2/2010 | Cadek | H01G 11/36 361/502 |
| 2010/0075228 A1 | 3/2010 | Yoshinaga et al. | |
| 2010/0111813 A1 | 5/2010 | Fan | |
| 2010/0243968 A1 | 9/2010 | Taniguchi et al. | |
| 2011/0059364 A1 | 3/2011 | Zhang et al. | |
| 2011/0112246 A1* | 5/2011 | Antonietti | C10L 5/44 524/803 |
| 2012/0007027 A1* | 1/2012 | Istvan | B82Y 30/00 252/502 |
| 2013/0209348 A1* | 8/2013 | Ludvik | C01B 31/10 423/460 |
| 2014/0104754 A1* | 4/2014 | Lipka | C01B 31/08 361/502 |
| 2014/0255787 A1* | 9/2014 | Passerini | C01B 17/22 429/231.8 |

OTHER PUBLICATIONS

Kruyt, H.R., et al., "The lyophilic colloids I. General introduction: agar soluble", Kolloidchemische Bejbefte (1928), 28, 1-54 (Abstract).*
International Search report for International application No. PCT/US2012/29247 dated Aug. 24, 2012.
A.G. Pandolfo, et al.; "Carbon particles and their role in supercapacitors"; Journal of Power Sources, vol. 157, Apr. 4, 2006, pp. 11-27.

* cited by examiner

*Primary Examiner* — Douglas McGinty
(74) *Attorney, Agent, or Firm* — King & Schickli, PLLC

(57) ABSTRACT

A composition generally includes carbon particles. The particles are prepared by dissolving a carbohydrate-based precursor in water to form a precursor solution and placing the precursor solution in a pressure vessel. The precursor solution is placed in a pressure vessel. The pressure vessel is heated to a reaction temperature to form carbon particles. The carbon particles are subjected to a chemical activation and a physical activation. The composition includes, by weight, about 5% to about 30% oxygen.

13 Claims, 80 Drawing Sheets

FIG. 24
A
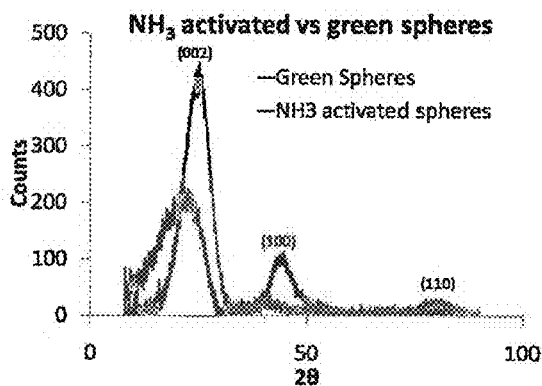
B
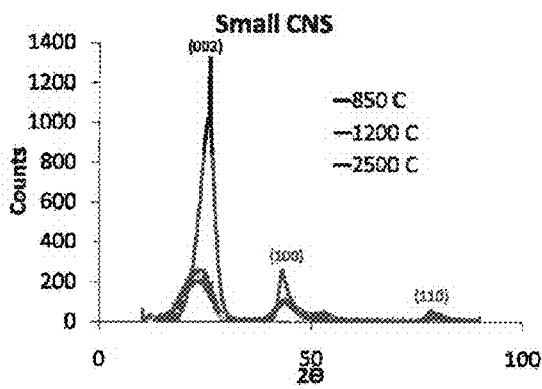
C
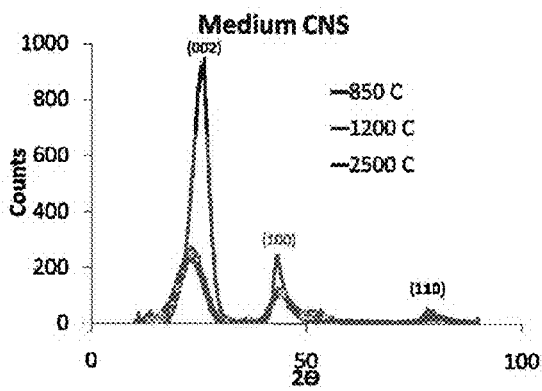

FIG. 25
A
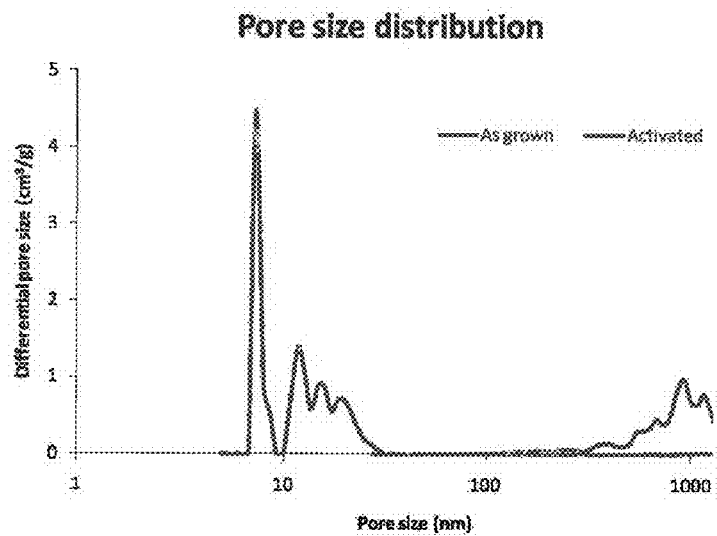
B
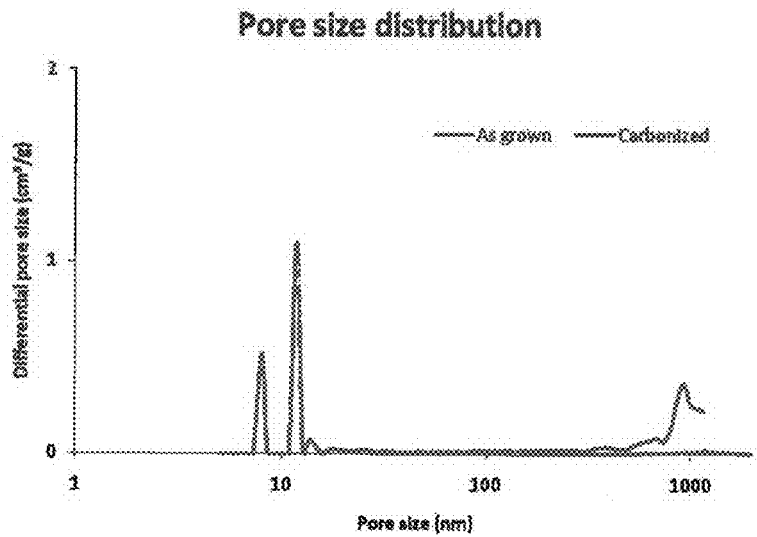

FIG. 26
A
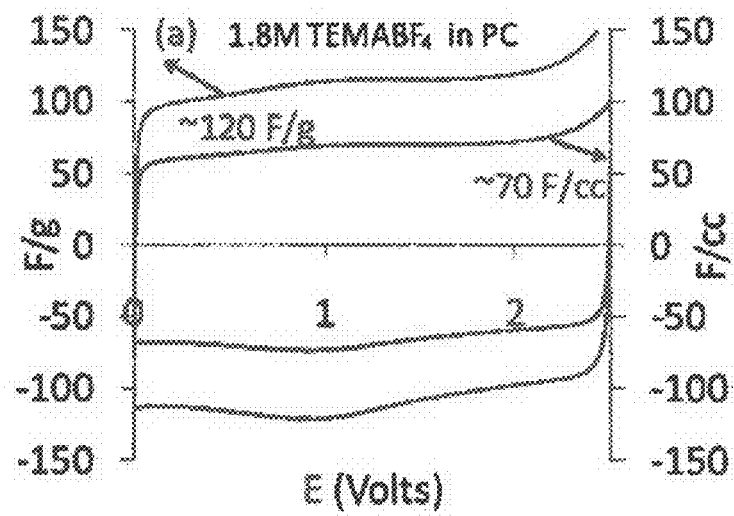
B
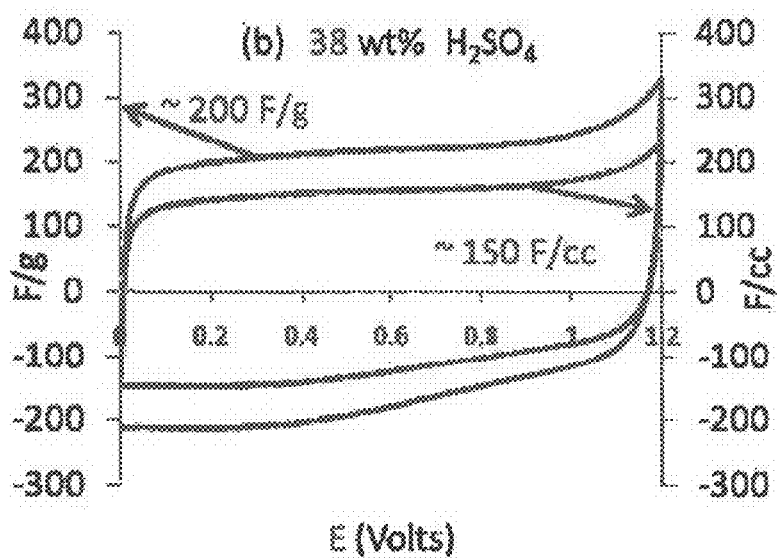

*Tested in other independent lab

FIG. 34
A
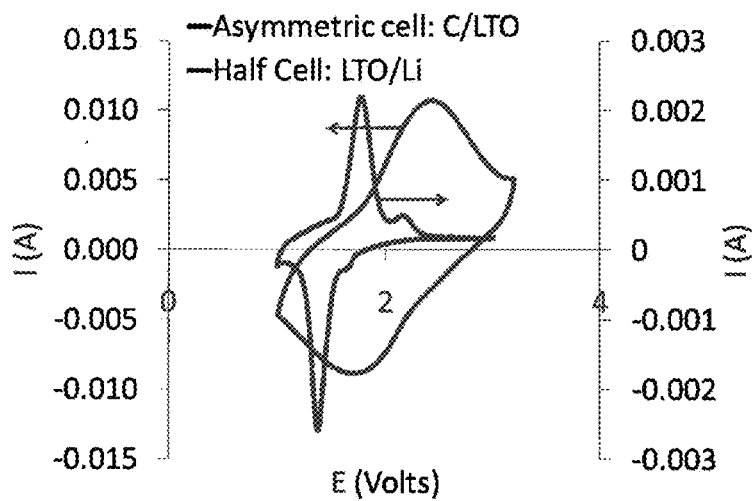
B
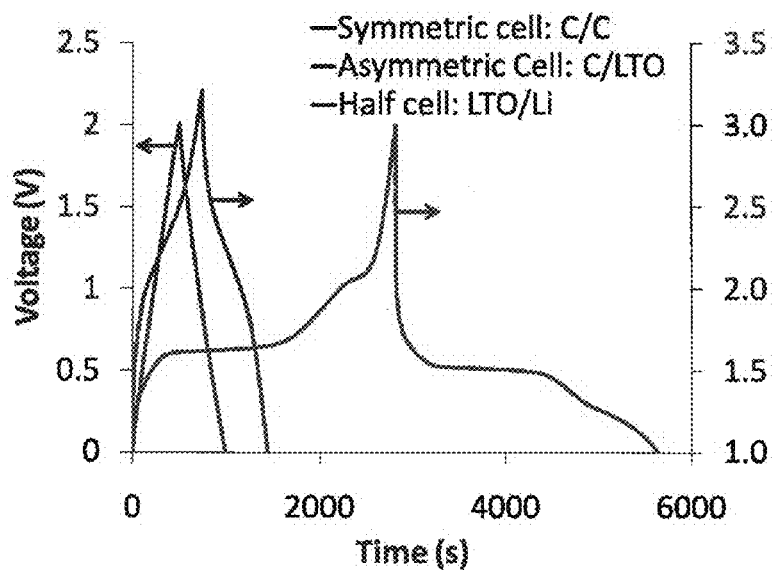

BET: 240 m²/g

Average pore diameter: 4.9 nm
Total pore volume: 0.19 cm³/g

US 9,440,858 B2

CARBON PARTICLES

CROSS-REFERENCE TO RELATED APPLICATIONS

This application is the national stage of International Patent Application No. PCT/US2012/029247 filed Mar. 15, 2012, which in turn claims priority to U.S. Provisional Patent Application No. 61/465,153, filed Mar. 15, 2011, 61/453,450, filed Mar. 16, 2011, 61/487,198, filed May 17, 2011, and 61/569,484, filed Dec. 12, 2011, the entire contents each of which are incorporated herein by reference.

STATEMENT REGARDING FEDERALLY SPONSORED RESEARCH

Activities relating to the development of the subject matter of this invention were funded at least in part by the U.S. Government, Grant N000140810128 awarded by the Office of Naval Research. The government may have certain rights in the invention.

BACKGROUND

Carbon spheres can be synthesized and activated, to provide properties useful for electrochemical applications. For example, carbon spheres activated with potassium hydroxide can be combined with a binder to provide an electrode for electrochemical capacitors. However, the capacitive performance of such carbon spheres can be limited, in turn limiting the energy density of the batteries.

U.S. Patent App. Publication No. 2011/0112246 discloses preparation of hydrothermal hybrid material from biomass. The hydrothermal products are used in the as-synthesized state for binding metal ions.

SUMMARY

In an aspect, the disclosure relates to a composition generally including carbon particles. The particles are prepared from a precursor solution of carbohydrates. The composition includes, by weight, about 5% to about 30% oxygen.

In another aspect, the disclosure relates to a method of making carbon particles. The method generally includes dissolving a carbohydrate-based precursor in water to form a precursor solution. The precursor solution is placed in a pressure vessel. The pressure vessel is heated to a reaction temperature to form carbon particles. The carbon particles are subjected to a chemical activation and a physical activation.

In still another aspect, the disclosure relates to a method of making a composite electrode. The method generally includes preparing a first set of carbon particles from a solution of carbohydrates, the first set of carbon particles being substantially non-spherical. A second set of carbon particles is prepared from a solution of carbohydrates, the second set of carbon particles being substantially spherical. The second set of carbon particles is subjected to chemical activation. The first and second sets of carbon particles are mixed.

In yet another aspect, the disclosure relates to a method of making a composite electrode. The method generally includes preparing a first set of carbon particles from a solution of carbohydrates, the first set of carbon particles having a high gravimetric capacitance and a low volumetric capacitance. A second set of carbon particles is prepared from a solution of carbohydrates, the second set of carbon particles having a low gravimetric capacitance and a high volumetric capacitance. The first and second sets of carbon particles are mixed.

Other aspects and embodiments will become apparent in light of the following description and accompanying drawings.

70 hours. Reaction temperature of 200° C. and xylose concentration of 0.05 mol/L were kept constant.

Figure 14:
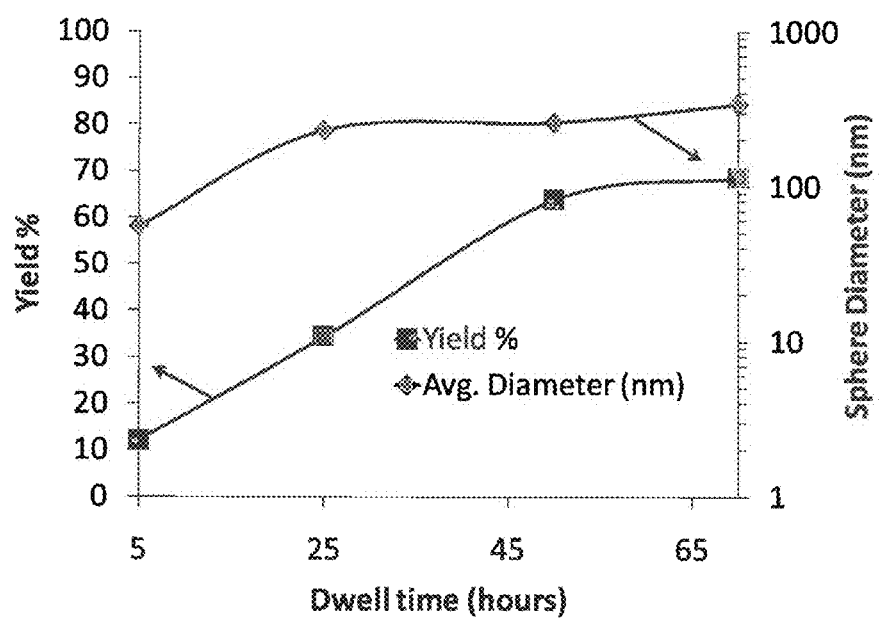

FIG. 14 is a graph showing the effect of dwell time on carbon nanosphere yield (carbon wt %) and diameter. Reaction temperature of 200° C. and xylose concentration of 0.05 mol/L were kept constant.

Figure 15:
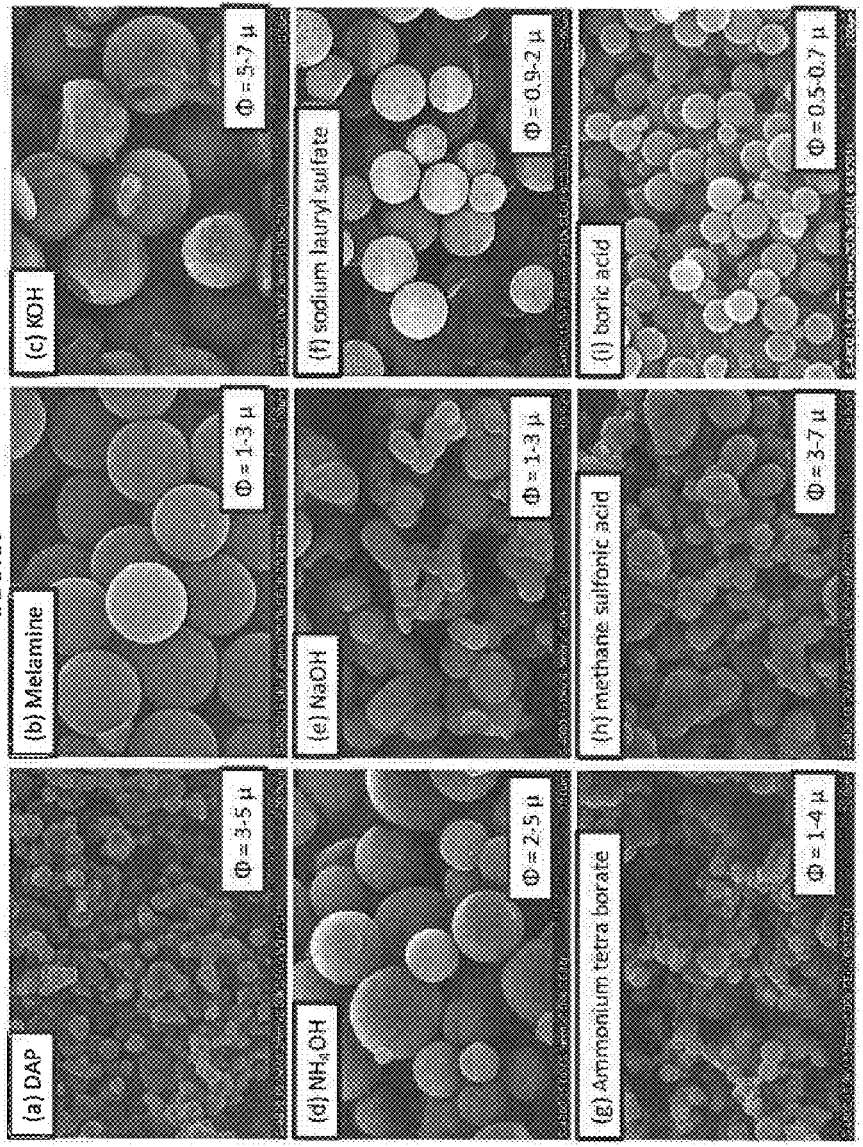

FIG. 15 shows SEM images of carbon spheres with different additives added to a certain initial concentration of xylose solution: 1 wt % diammonium phosphate, 0.8 g/L melamine, 1 g/L potassium hydroxide, 1 g/L ammonium hydroxide, 1 g/L sodium hydroxide, 5% boric acid, 0.8 g/L sodium lauryl sulfate, 1% ammonium tetra borate, and 1% methane sulfonic acid.

Figure 16:
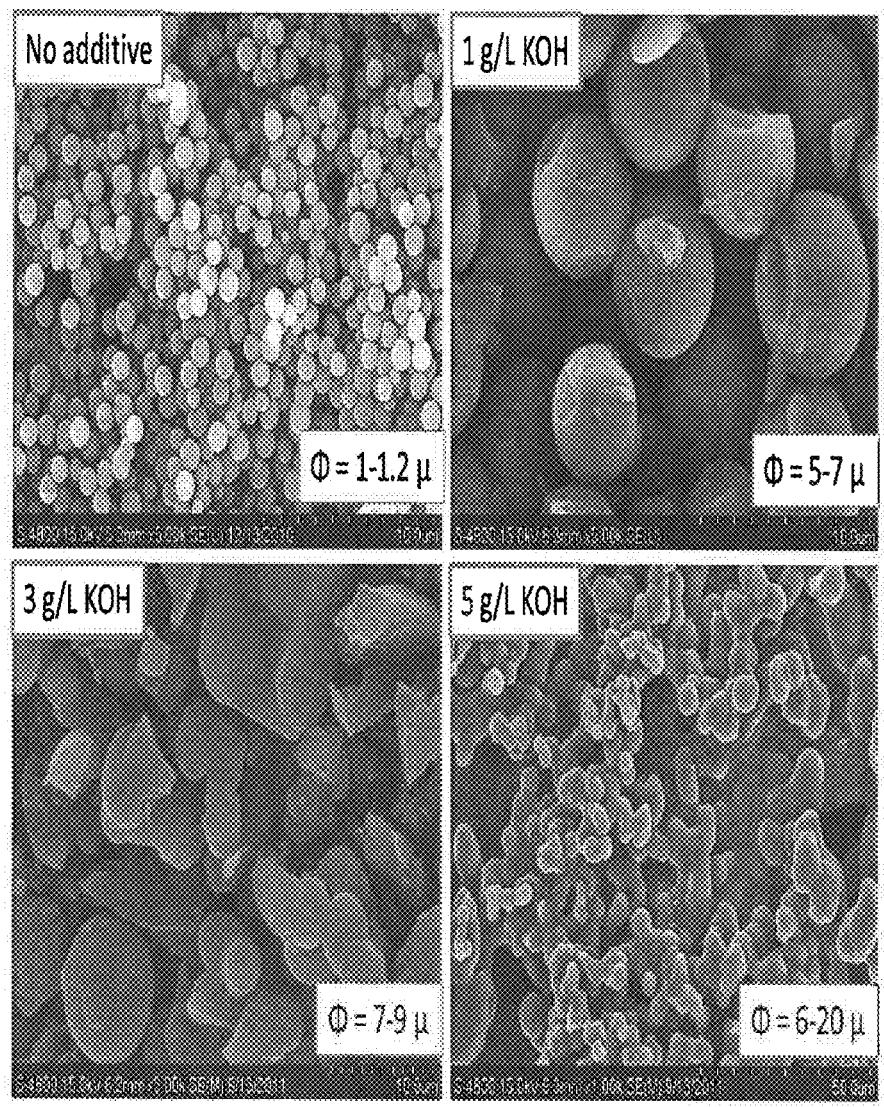

FIG. 16 shows SEM images of carbon spheres made with different concentrations of KOH (1 g/L, 3 g/L and 5 g/L) added to 2 mol/L xylose solution.

Figure 17:
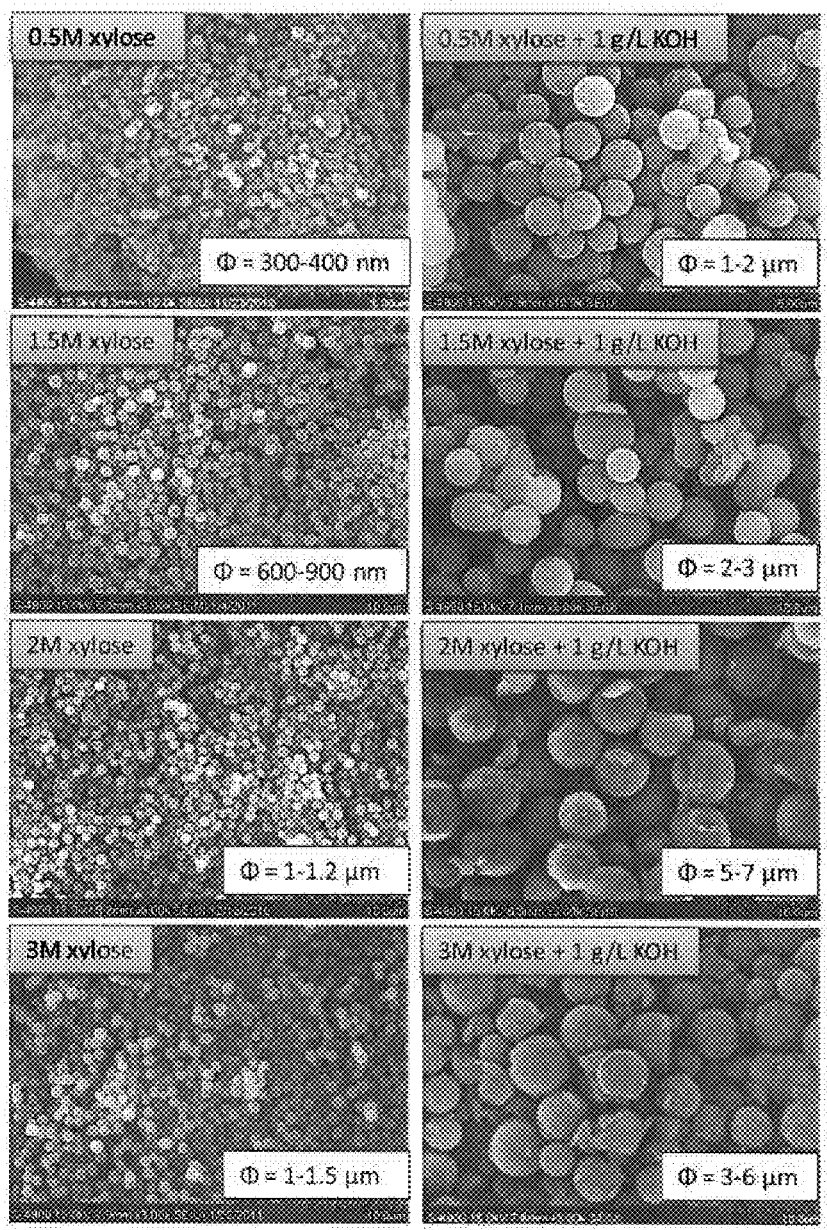

FIG. 17 shows SEM images of carbon spheres made with different xylose concentrations (0.5 mol/L, 1.5 mol/L, 2 mol/L, and 3 mol/L) while the concentration of KOH was kept constant at 1 g/L.

Figure 18:
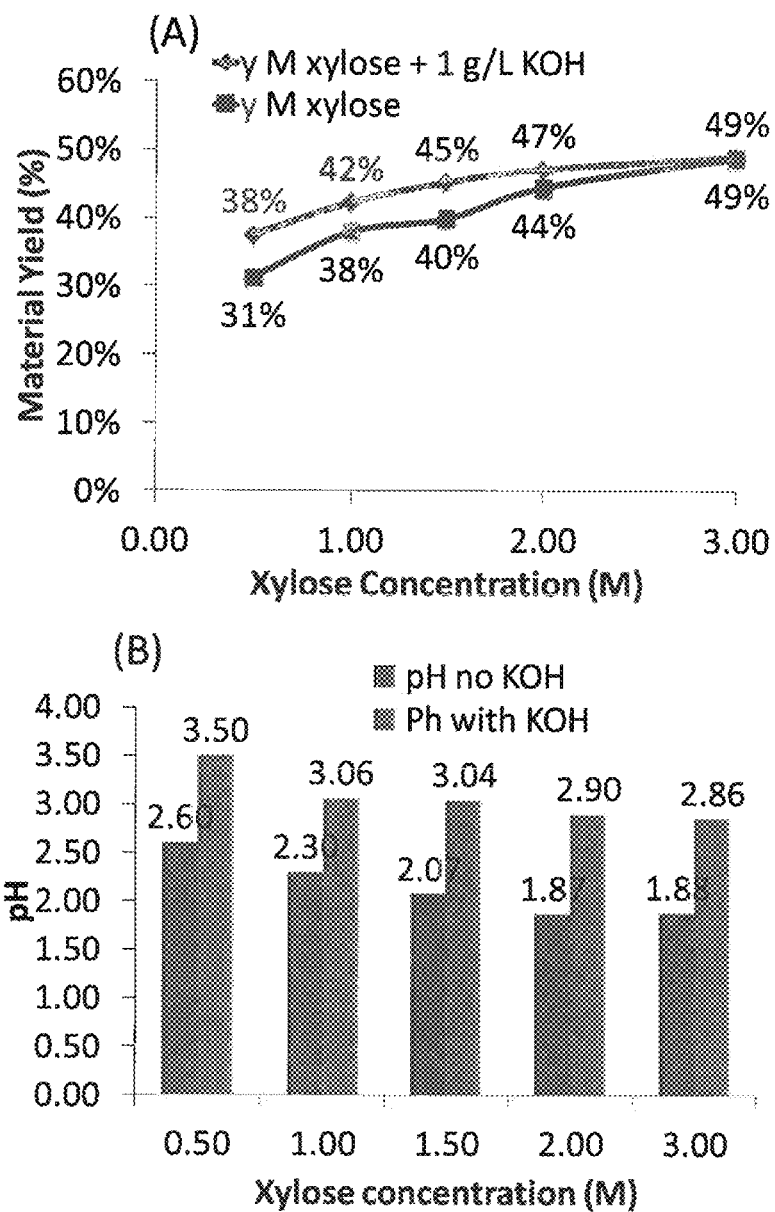

FIG. 18(A) shows a plot of the effect of increasing concentration of xylose (with and without KOH addition) on material yield.

FIG. 18(B) shows the change of pH after a hydrothermal run with and without KOH addition as the xylose concentration increases from 0.5M to 3M.

Figure 19:
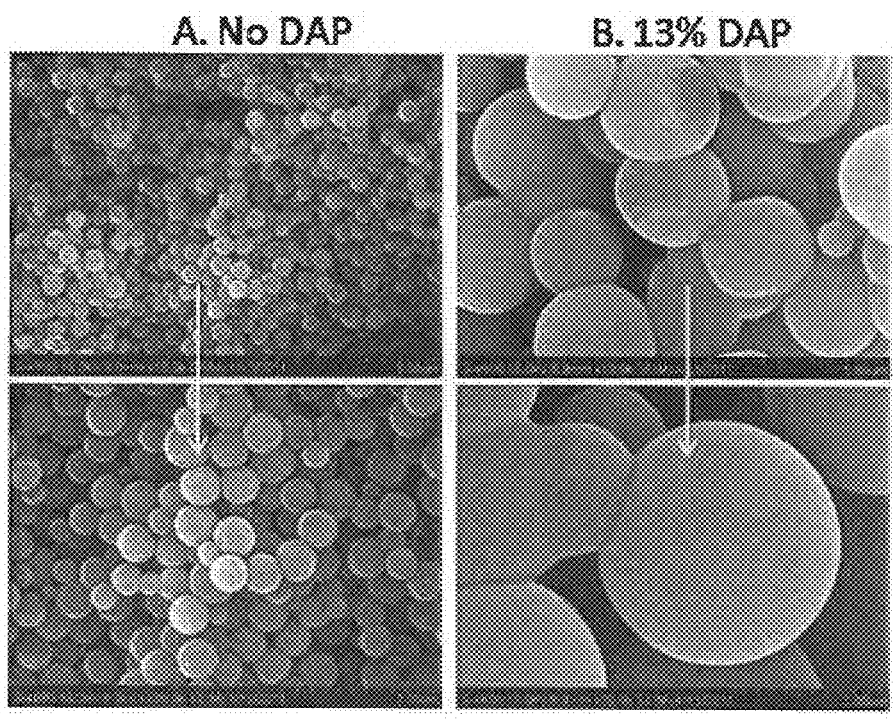

FIG. 19 shows high and low magnification scanning electron images of (A) carbon nanospheres made by HTS method with 1M xylose solution at 200° C. for 24 h, and (B) carbon nanospheres made by HTS method with 1M xylose solution and 13% diammonium phosphate ("DAP") at 200° C. for 24 h.

Figure 20:
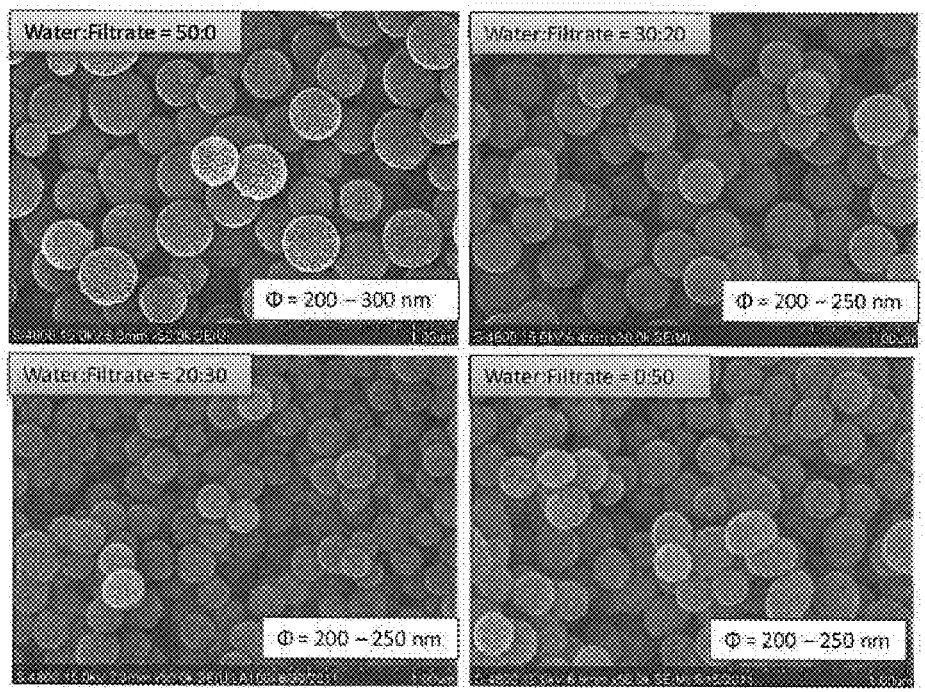

FIG. 20 shows SEM images of carbon spheres made using different ratios of solvent mixture of deionized water to filtrate: 50:0, 30:20, 20:30, and 0:50.

Figure 21:
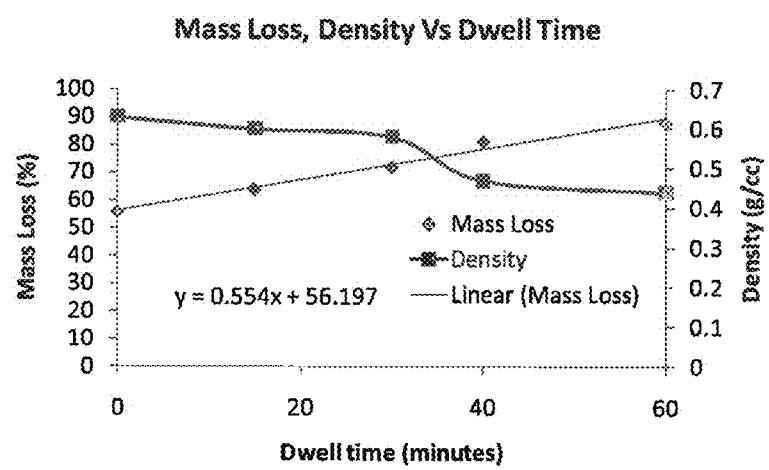

FIG. 21 shows a graph of mass loss and electrode packing density vs. activation dwell time.

Figure 22:
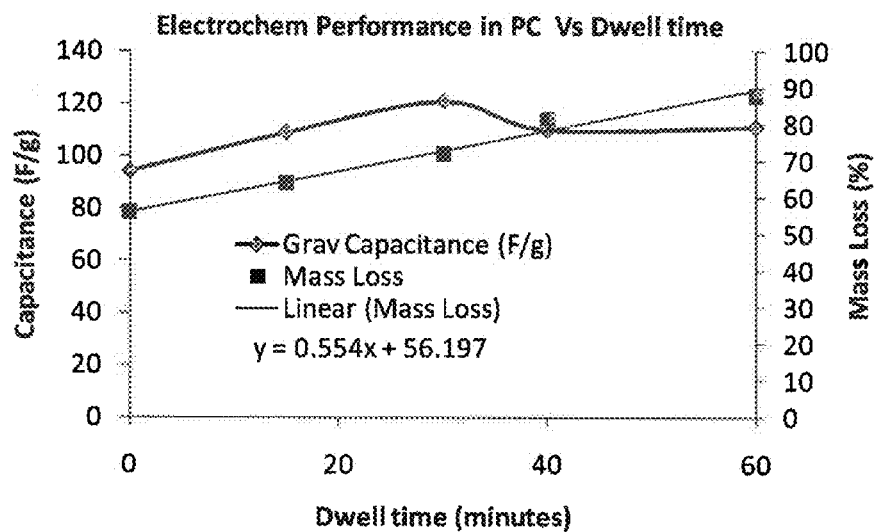

FIG. 22 shows a graph of capacitance (F/g) and mass loss vs. activation dwell time.

Figure 23:
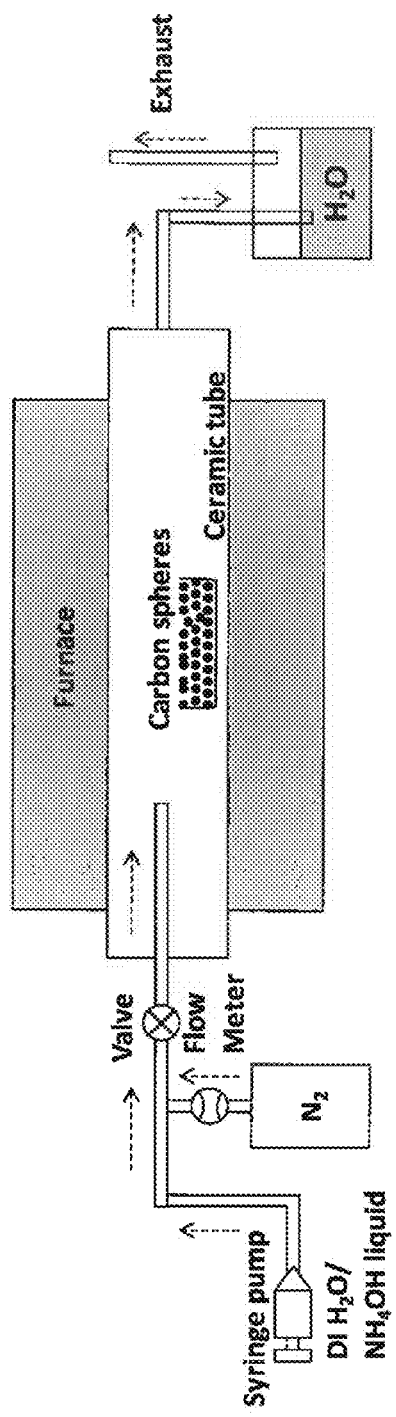

FIG. 23 shows an experimental set-up for activation of carbon nanospheres with ammonium hydroxide or steam using syringe pump.

FIG. 24 shows an x-ray diffraction ("XRD") spectroscopy pattern of (A) as-grown and ammonia-activated carbon nanospheres, (B) small spheres carbonized at 850° C., 1200° C., and 2500° C. under $N_2$, and (C) medium spheres carbonized at 850° C., 1200° C., and 2500° C. under $N_2$.

FIG. 25 shows a graph of the pore size distribution of (A) as-grown and activated carbon nanospheres, and (B) as grown and carbonized carbon nanospheres.

FIG. 26 shows the capacitive performance of xylose-derived ammonia-activated carbon nanospheres in A) 1.8 M $Et_3MeNBF_4$ and B) 38 wt % $H_2SO_4$.

Figure 27:
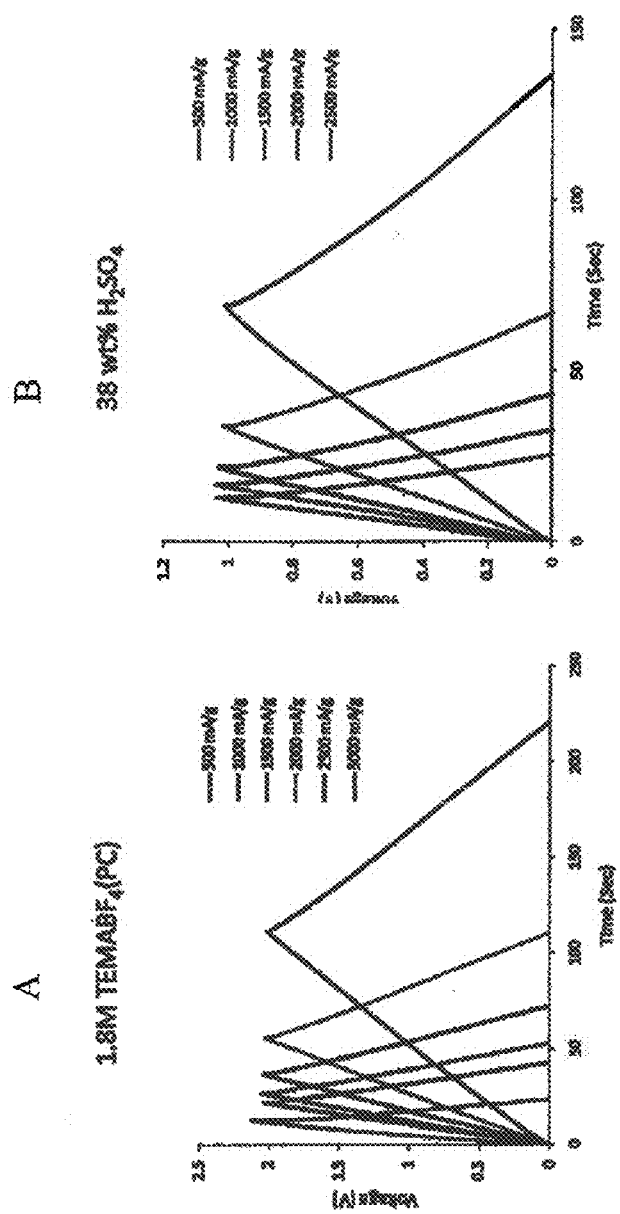

FIG. 27 shows charge/discharge plots of a symmetric C/C supercapacitor cell in (A) 1.8M $Et_3MeNBF_4$ in propylene carbonate ("PC") and (B) 38 wt % $H_2SO_4$. The carbon electrode consists of activated carbon nanospheres mixed with 3% binder (TEFLON®).

Figure 28:
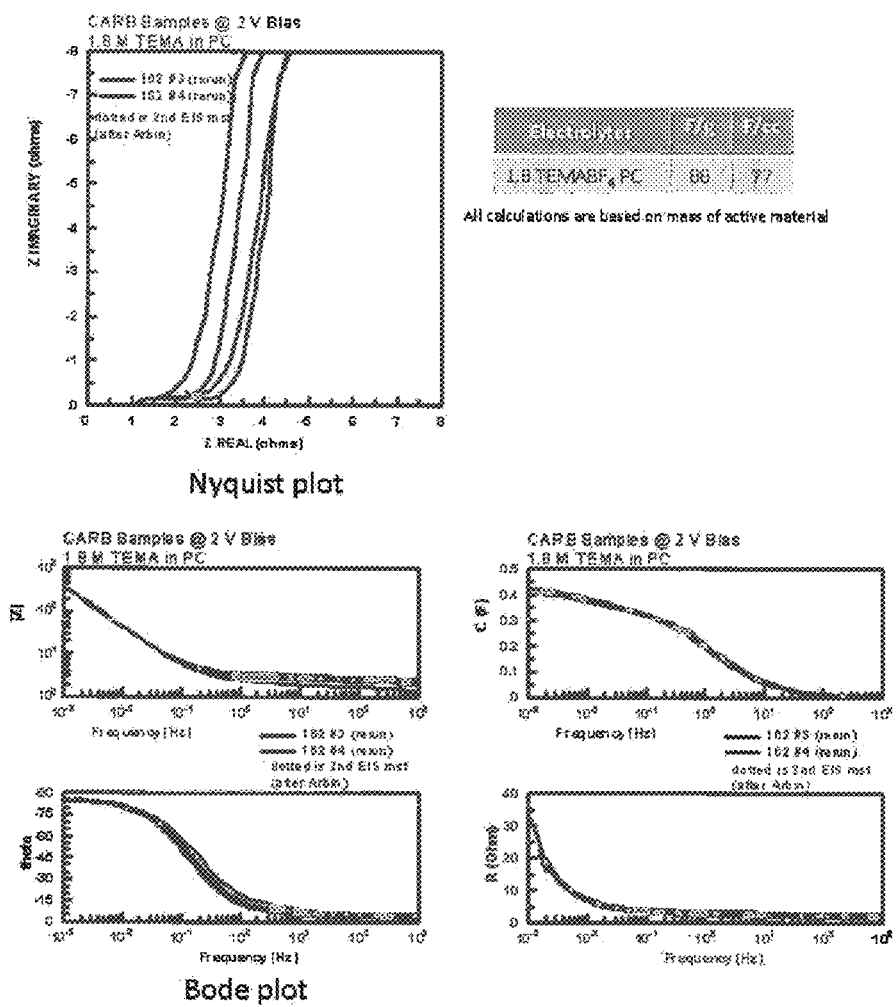

FIG. 28 shows graphs of electrochemical impedance performance of activated carbon nanospheres in 1.8M $Et_3MeNBF_4$ in propylene carbonate ("PC"). The carbon electrode consists of activated carbon nanospheres mixed with 3% binder (TEFLON®).

Figure 29:
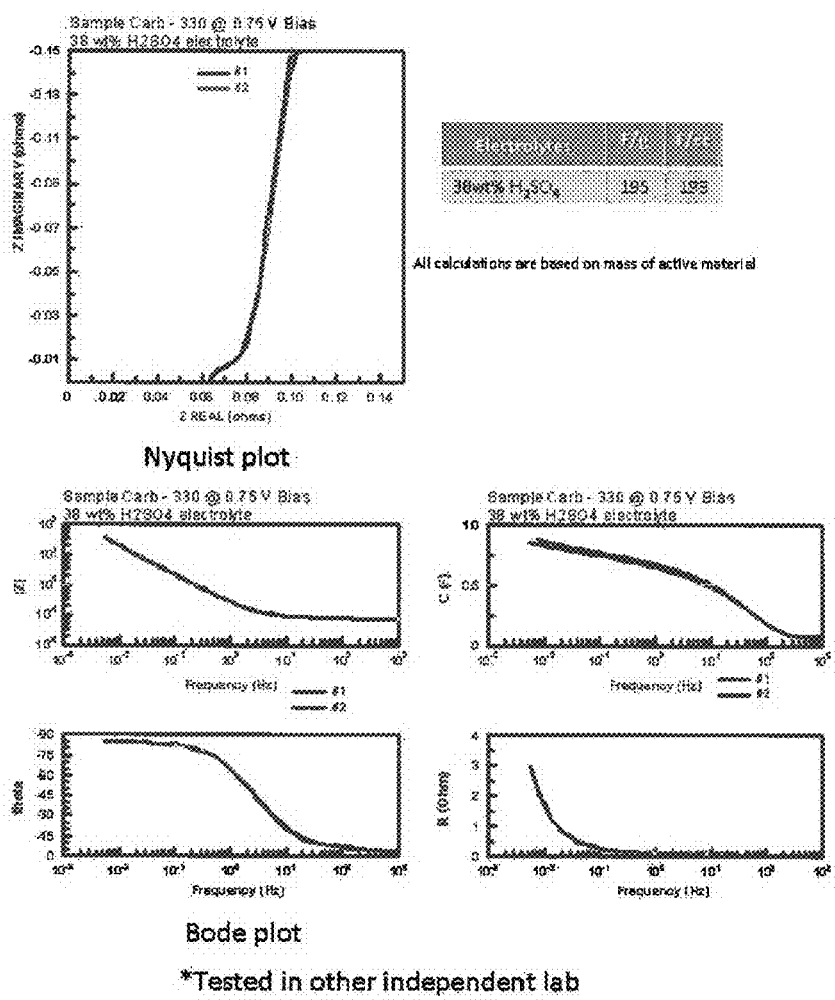

FIG. 29 shows graphs of electrochemical impedance performance of activated carbon nanospheres in 1.8M $Et_3MeNBF_4$ in 38 wt % $H_2SO_4$. The carbon electrode consists of activated carbon nanospheres mixed with 3% binder (TEFLON®).

FIG. 30a shows the cycle-life data of a double-layer supercapacitor cell cycled between 0 to 2.0V, 0 to 2.25V and 0 to 2.5V.

FIGS. 30b-d shows the charge/discharge plots of a double-layer supercapacitor cell cycled between 0-2.0V, 0-2.25V, and 0-2.5V at a random time interval.

Figure 31:
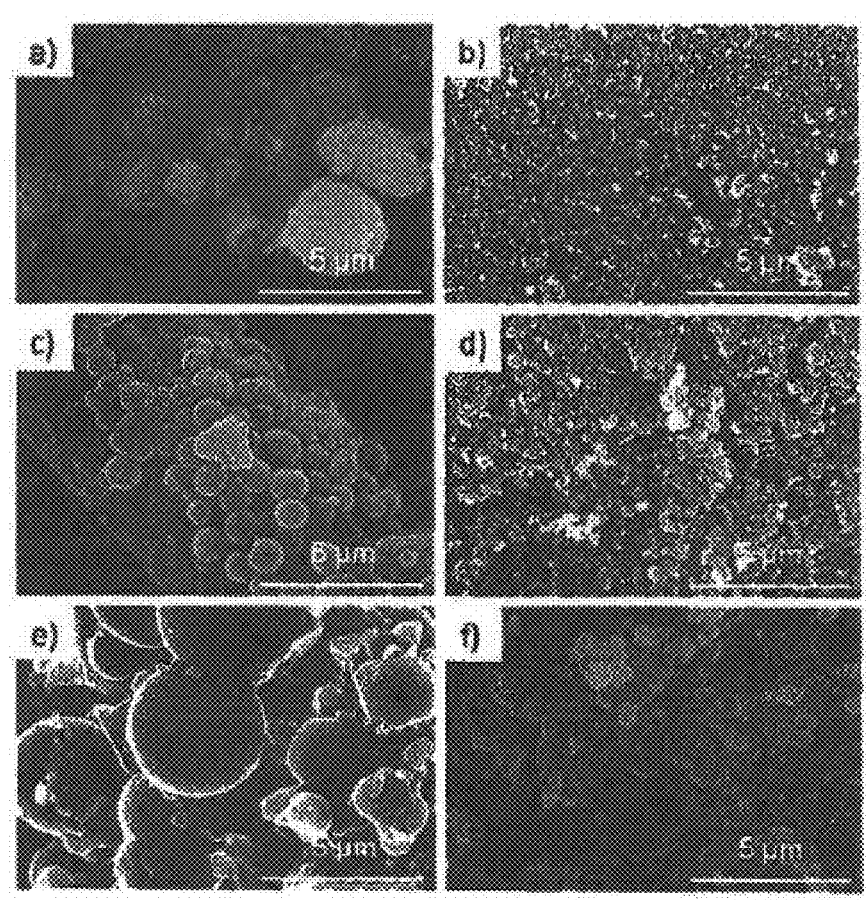

FIG. 31 shows SEM images of the as-synthesized carbon particles derived from different precursors: (a) packaging peanuts, (b) sucrose, (c) rayon fibers, (d) starch, (e) rice water/starch, and (f) bourbon stillage.

Figure 32:
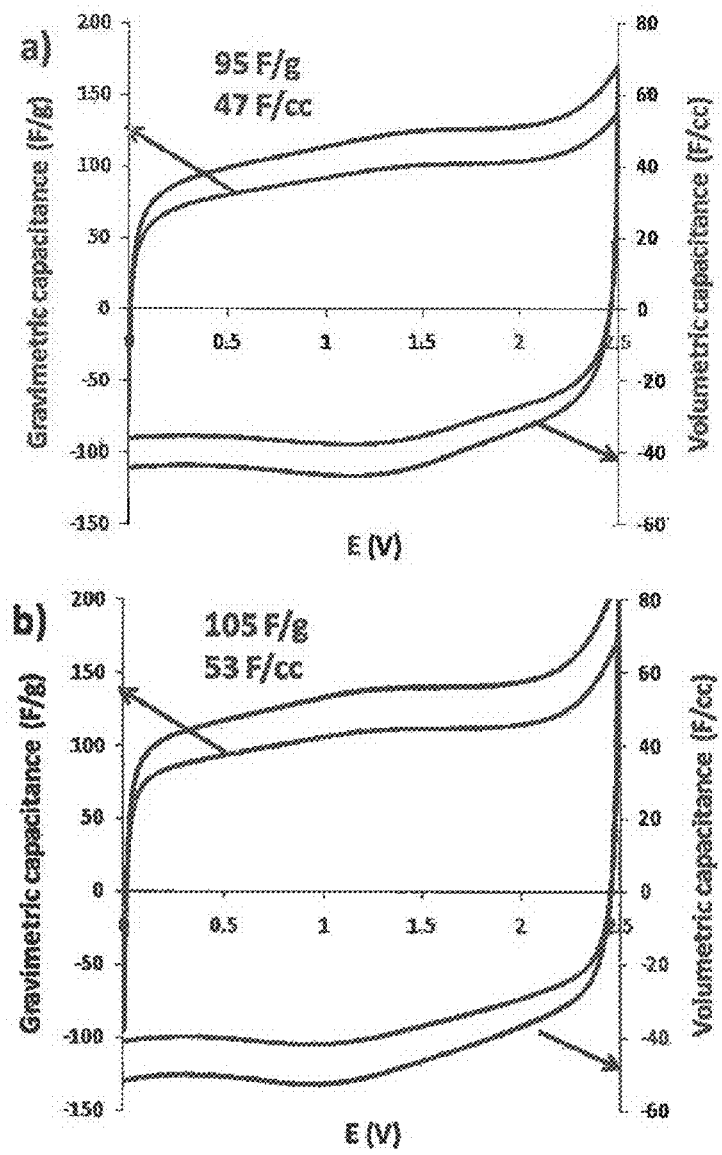
Figure 32:
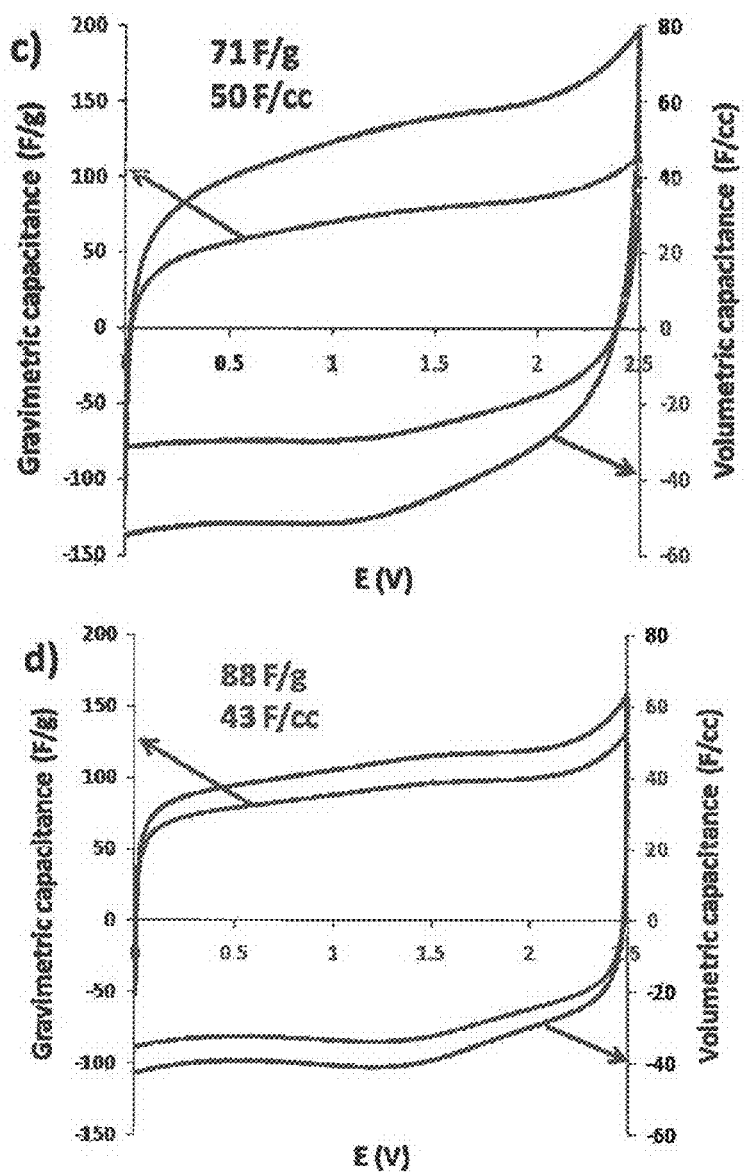
Figure 32:
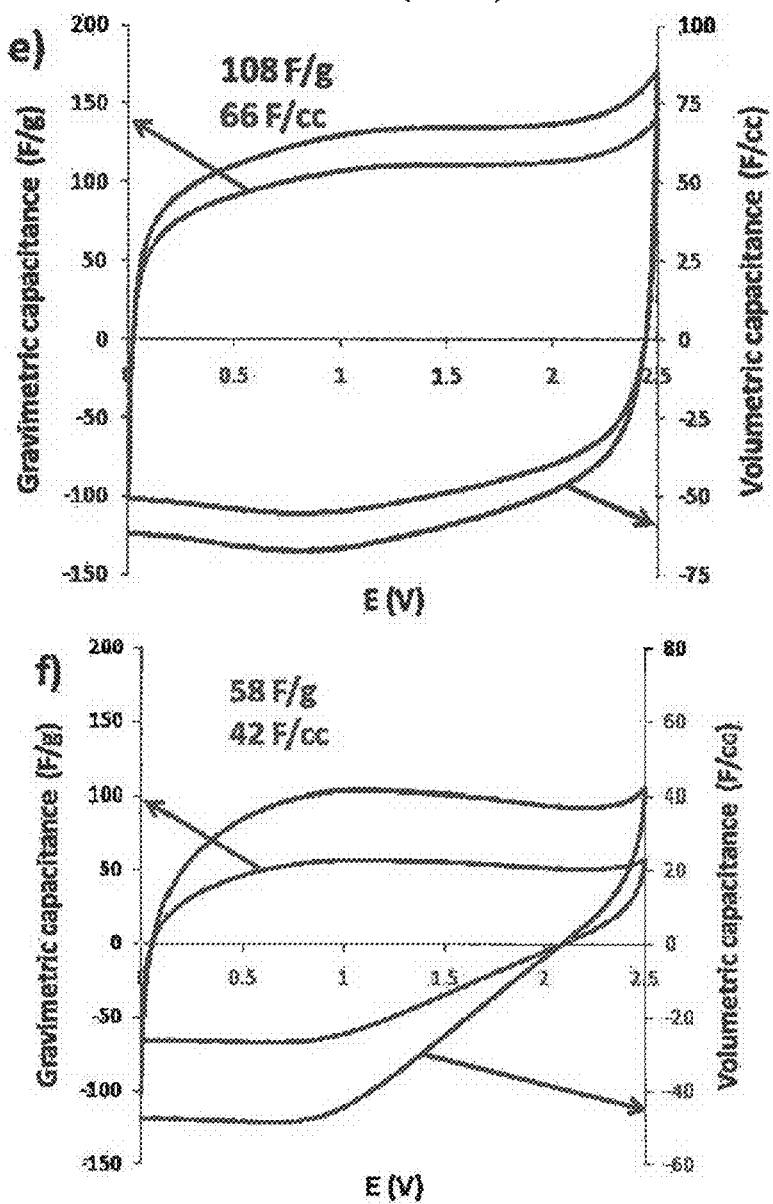

FIG. 32 shows normalized cyclic voltammograms of activated carbon particles derived from different precursors: (a) packaging peanuts, (b) sucrose, (c) rayon fibers, (d) starch, (e) rice water/starch, and (f) bourbon stillage. The cyclic voltammograms are normalized to show gravimetric (F/g) and volumetric capacitances (F/cc).

Figure 33:
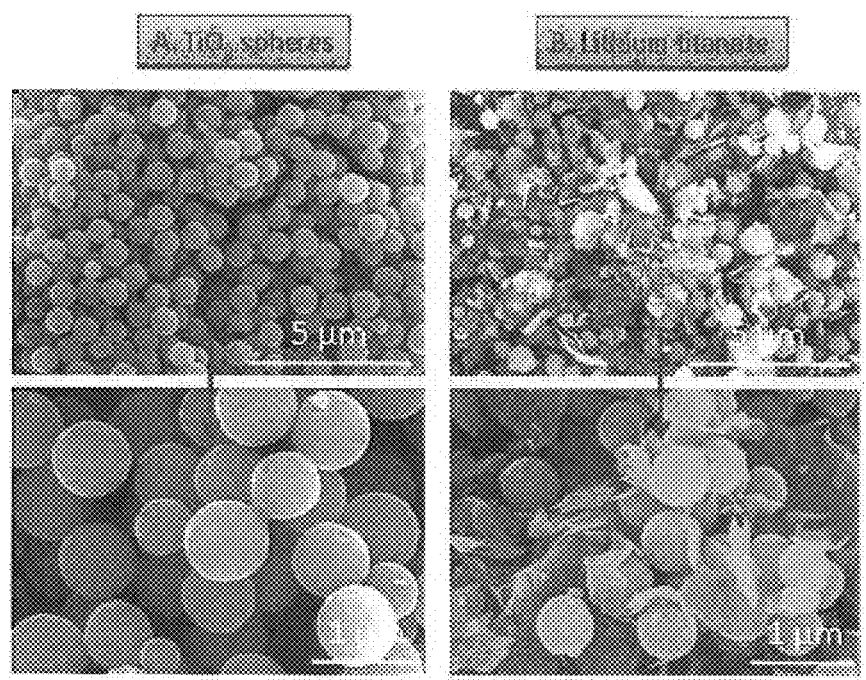

FIG. 33 shows high and low magnification SEM images of (A) $TiO_2$ spheres, and (B) hydrothermally-prepared lithium titanate spheres.

FIG. 34 shows A) cyclic voltammograms, comparison of asymmetric cell—C/LTO and half cell—LTO/Li, and B) charge/discharge plots, comparison of symmetric cell—C/C, half cell—LTO/Li, and asymmetric cell—C/LTO.

Figure 35:
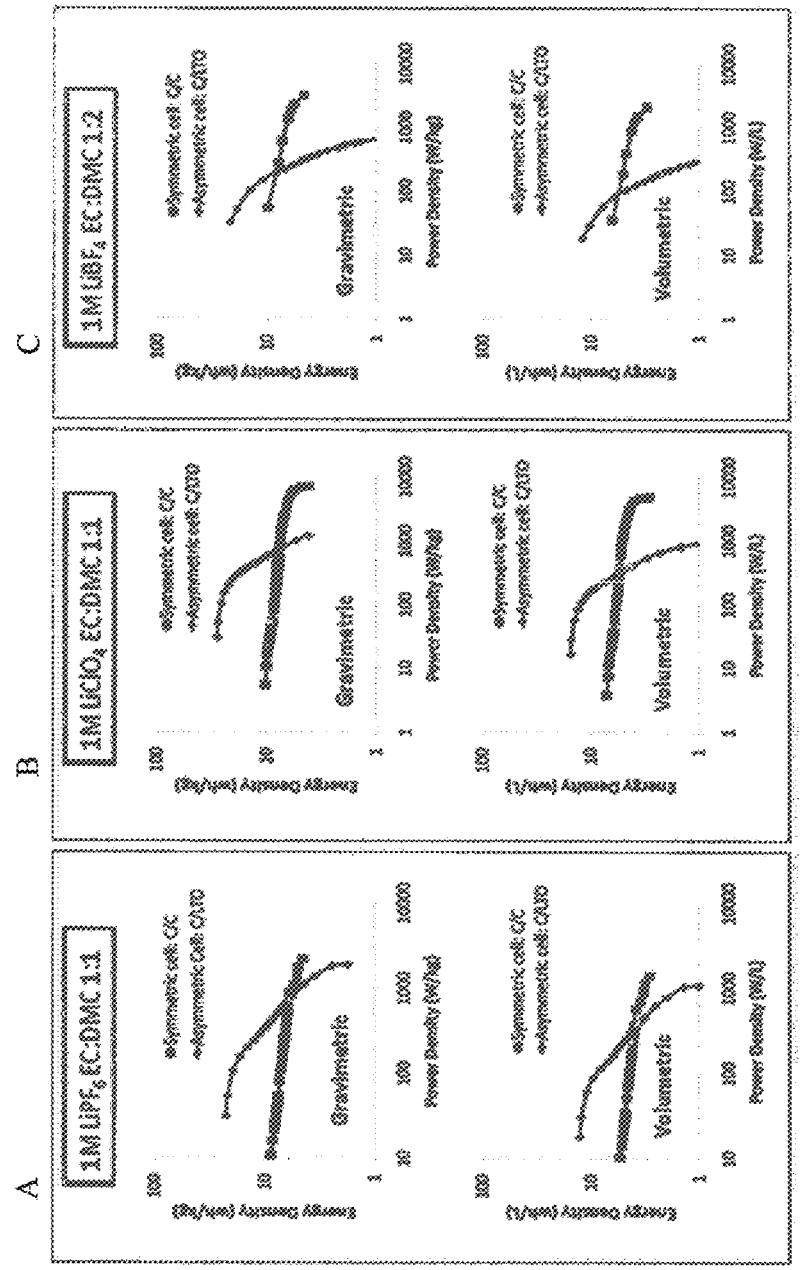

FIG. 35 shows Ragone plots—comparison of symmetric cell—C/C, and asymmetric cell C/LTO using non-aqueous battery electrolytes: A) 1M $LiPF_6$ ethylene carbonate ("EC"):dimethyl carbonate ("DMC") 1:1, B) 1M $LiClO_4$ EC:DMC 1:1, and C) 1M $LiBF_4$ EC:DMC 1:2. The numbers were calculated based on mass of active materials.

Figure 36:
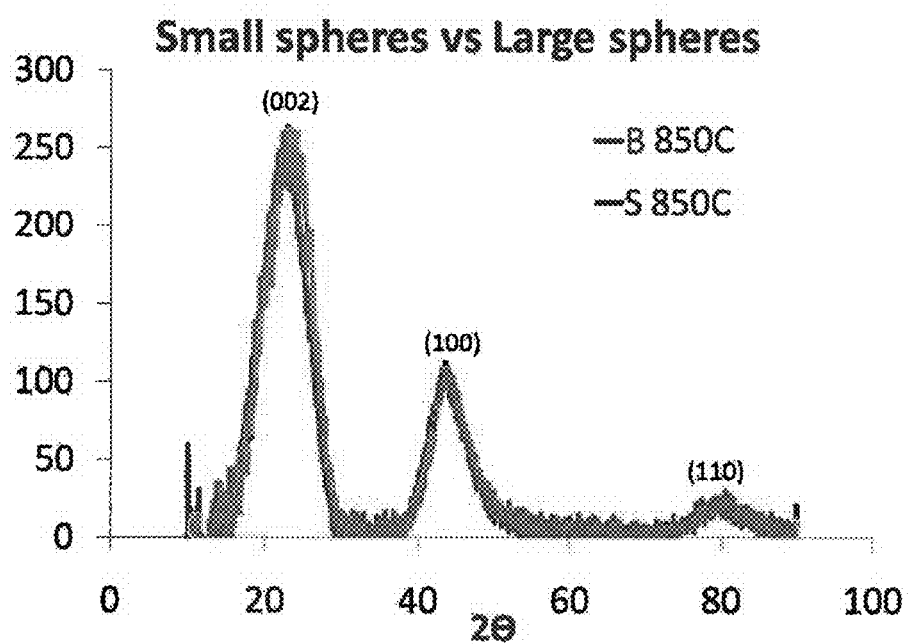

FIG. 36 shows XRD data comparing large and small carbon nanospheres carbonized at 850° C.

Figure 37:
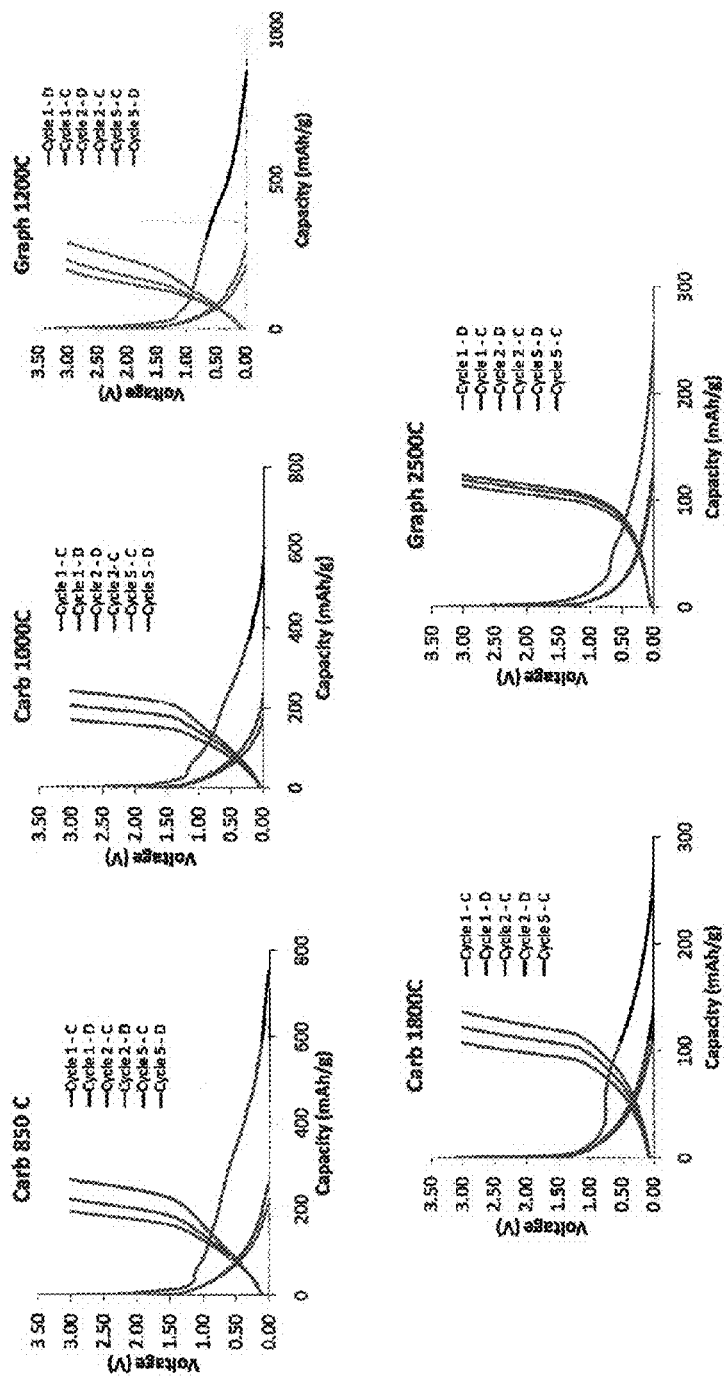

FIG. 37 shows charge/discharge plots of medium carbon nanospheres pyrolyzed at different temperatures: 850° C., 1000° C., 1800° C., and 2500° C. Rate=C/20, and counter/reference electrode=lithium metal, 1M $LiPF_6$ EC:DMC 1:1.

Figure 38:
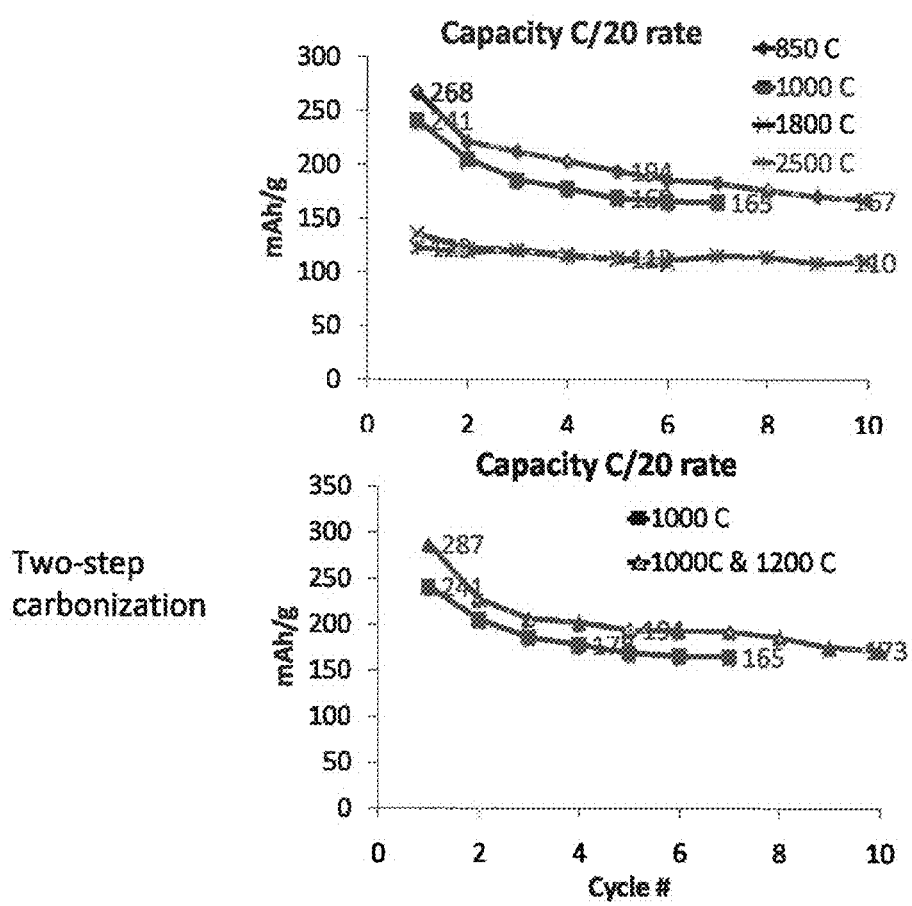

FIG. 38 shows the cycle-life data of carbons pyrolyzed at different temperatures: 850° C., 1000° C., 1800° C., and 2500° C. Also shown is the cycle life data of carbon particles carbonized at 1000° C. and pyrolyzed again at 1200° C. Rate=C/20, and counter/reference electrode=lithium metal, 1M $LiPF_6$ EC:DMC 1:1.

Figure 39:
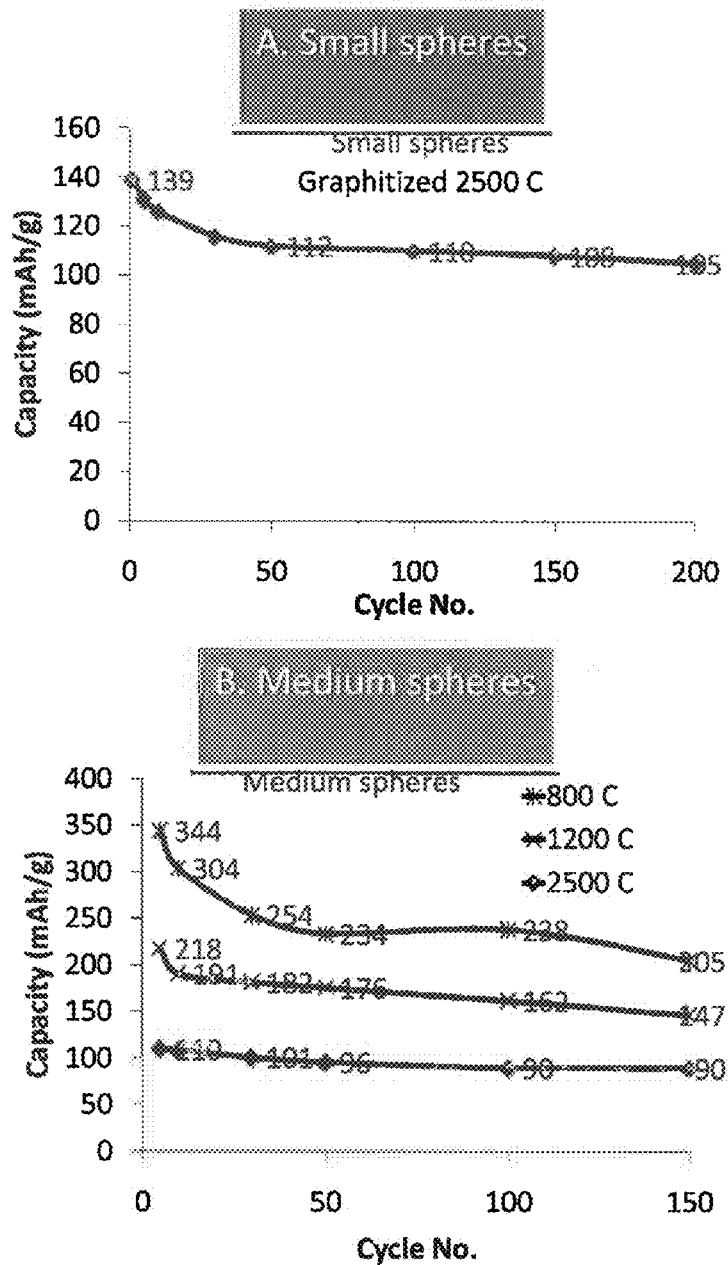

FIG. 39 shows the cycle-life performance of small-sized carbon nanospheres graphitized at 2500° C. and medium-sized carbon nanospheres carbonized at 800° C., 1200° C., or 2500° C. Rate=1 C, and counter/reference electrode=lithium metal, 1M $LiPF_6$ EC:DMC 1:1.

Figure 40:
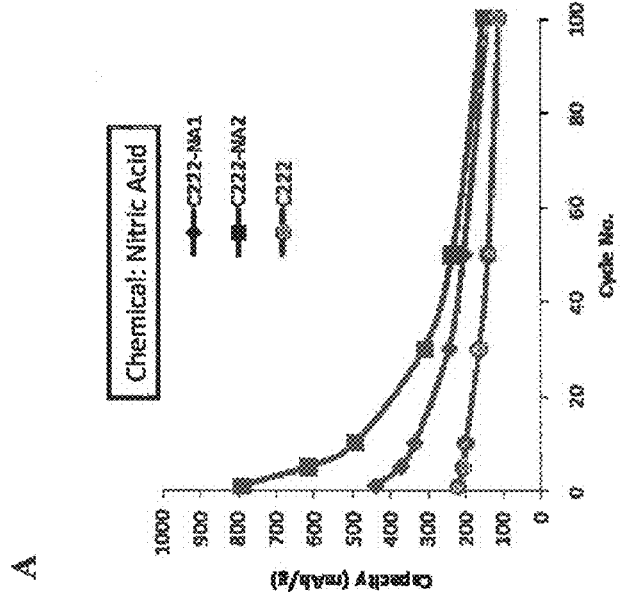

FIG. 40 shows the cycle-life performance of carbon nanospheres treated with A) nitric acid and B) air oxidation vs. the untreated material. Rate=1 C, and counter/reference electrode=lithium metal, 1M $LiPF_6$ EC:DMC 1:1.

Figure 41:
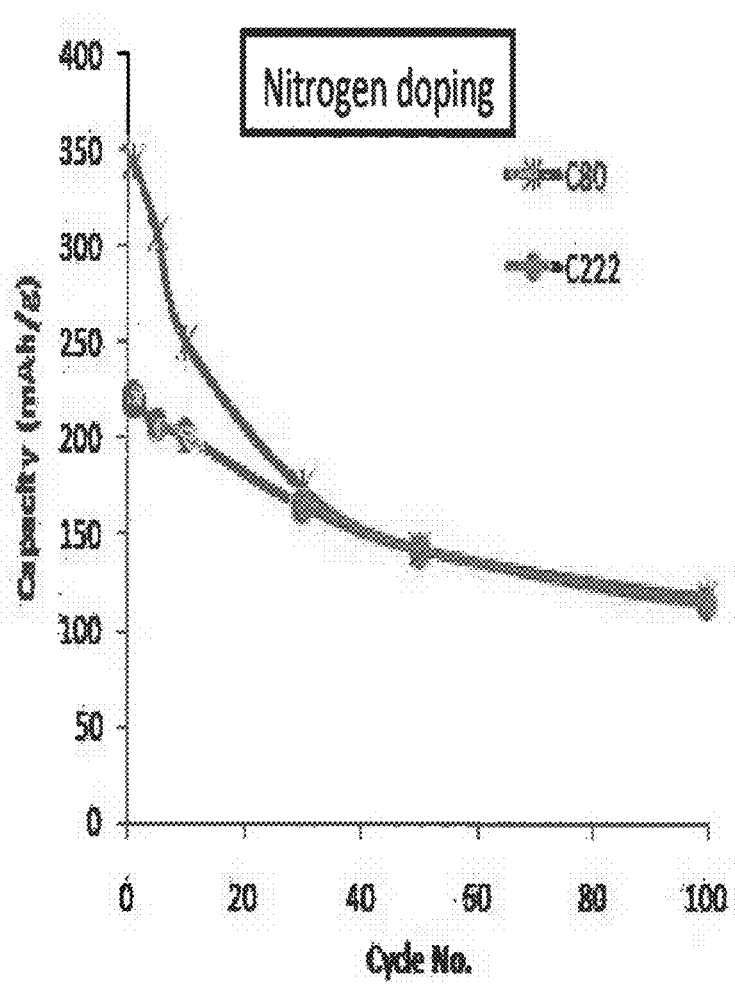

FIG. 41 shows the effects of nitrogen doping on the lithium intercalation capacity of carbon nanospheres vs. the untreated material.

Figure 42:
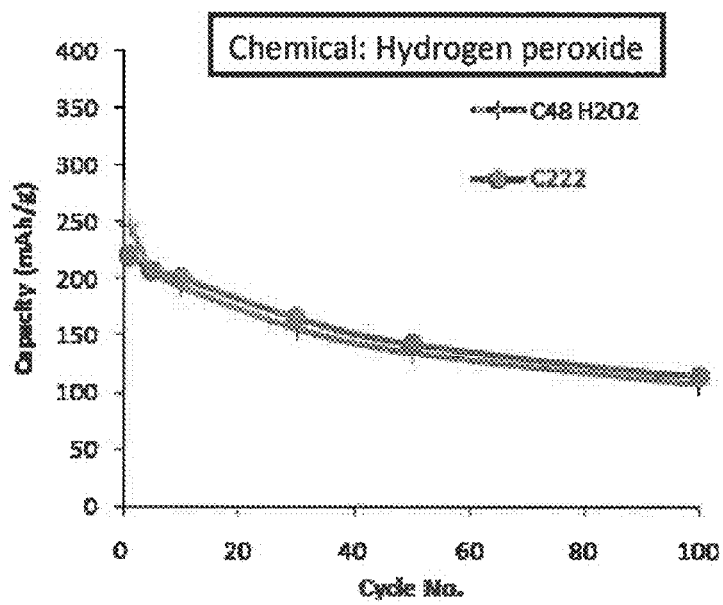

FIG. 42 shows the cycle-life performance of hydrogen peroxide treated carbon nanospheres vs. the untreated material. Rate=1 C, and counter/reference electrode=lithium metal, 1M $LiPF_6$ EC:DMC 1:1.

Figure 43:
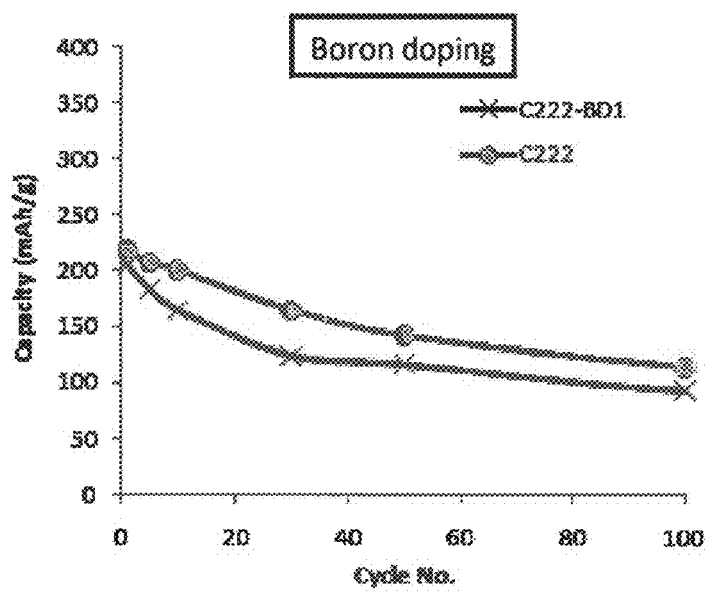

FIG. 43 shows the cycle-life performance of boron-doped carbon nanospheres vs. the untreated material. Rate=1 C, counter/reference electrode=lithium metal, 1M $LiPF_6$ EC:DMC 1:1.

Figure 44:
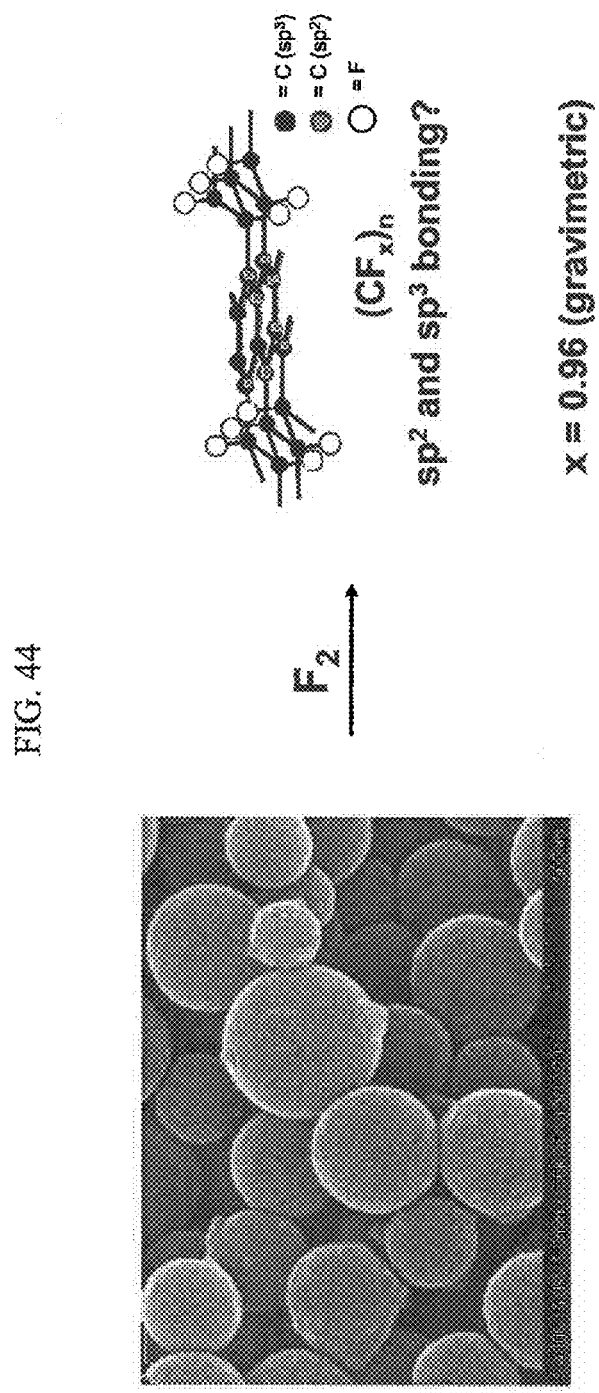

FIG. 44 shows a schematic representation of preparation of fluorinated carbon nanospheres including $CF_{0.96}$.

Figure 45:
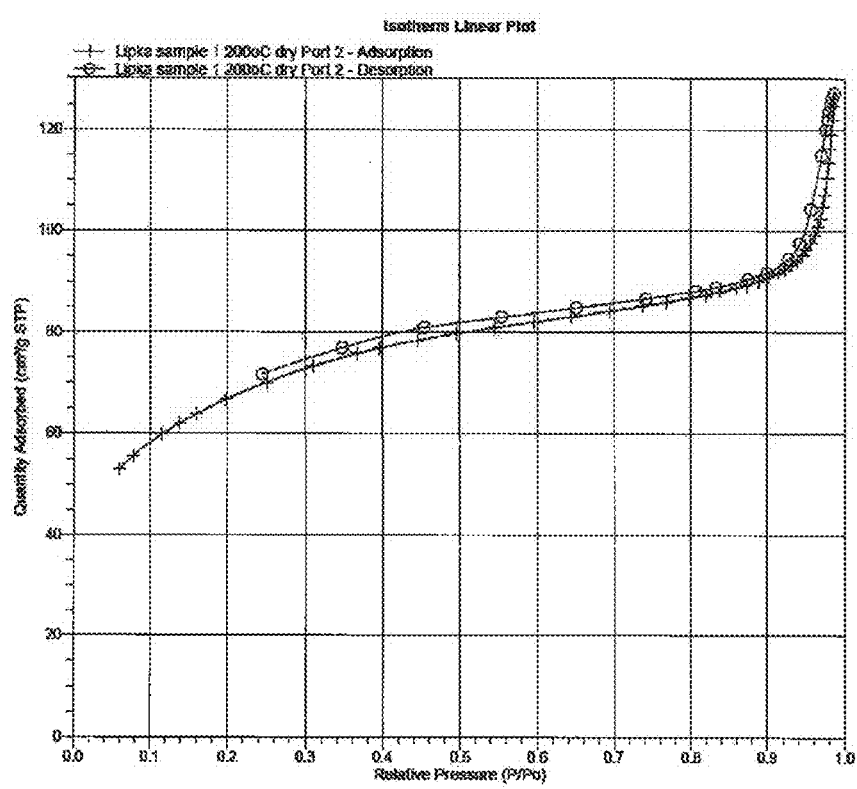

FIG. 45 is a graph showing results of a Brunauer-Emmett-Teller ("BET") method surface area measurements gas sorption study of fluorinated carbon nanospheres including $CF_{0.96}$.

Figure 46:
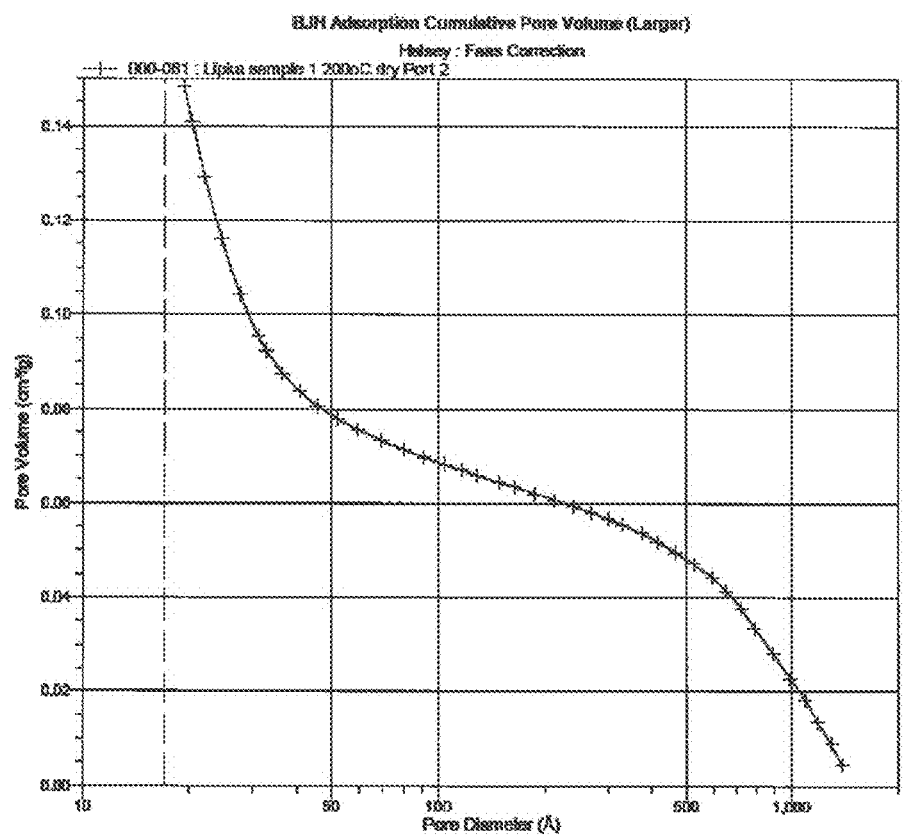

FIG. 46 is a graph showing average pore diameter and total pore volume results of a gas sorption study of fluorinated carbon nanospheres including $CF_{0.96}$.

Figure 47:
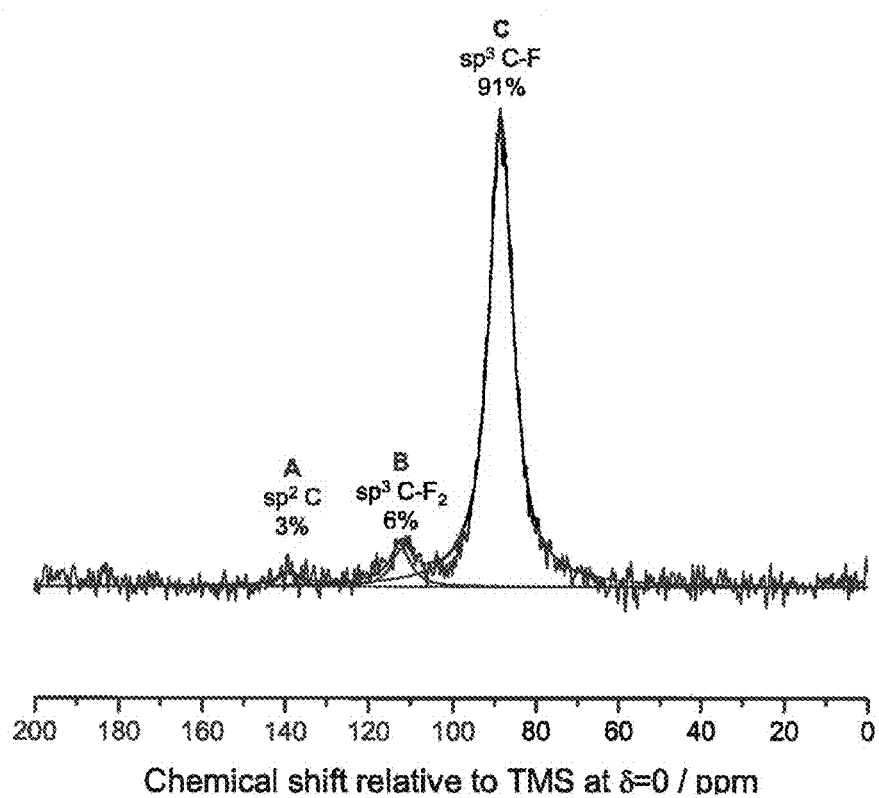

FIG. 47 shows a C-13 solid-state NMR of fluorinated carbon nanospheres including ($CF_{0.96}$); chemical shift relative to TMS at 6=0/ppm.

Figure 48:
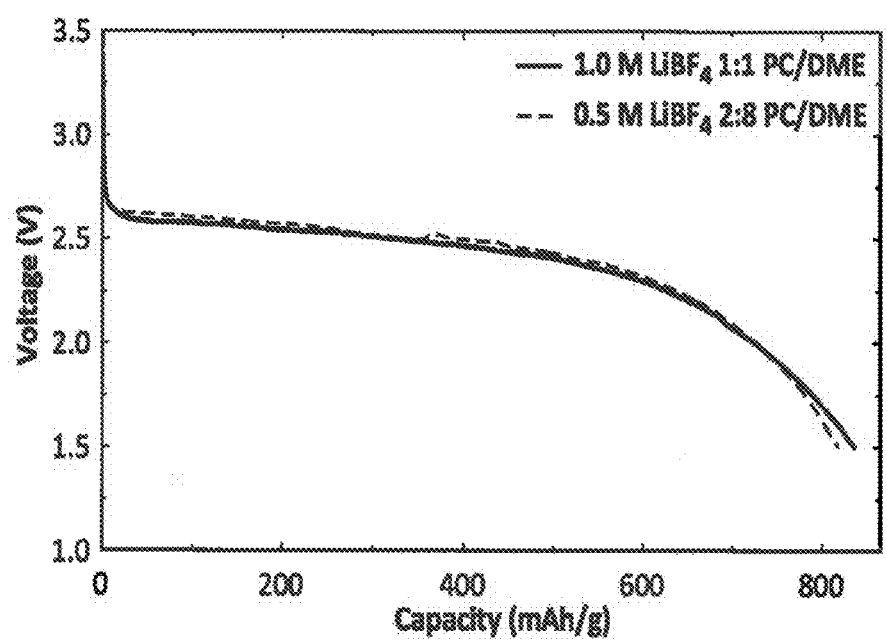

FIG. 48 is a graph showing the discharge profile of fluorinated carbon nanospheres including $CF_{0.96}$.

Figure 49:
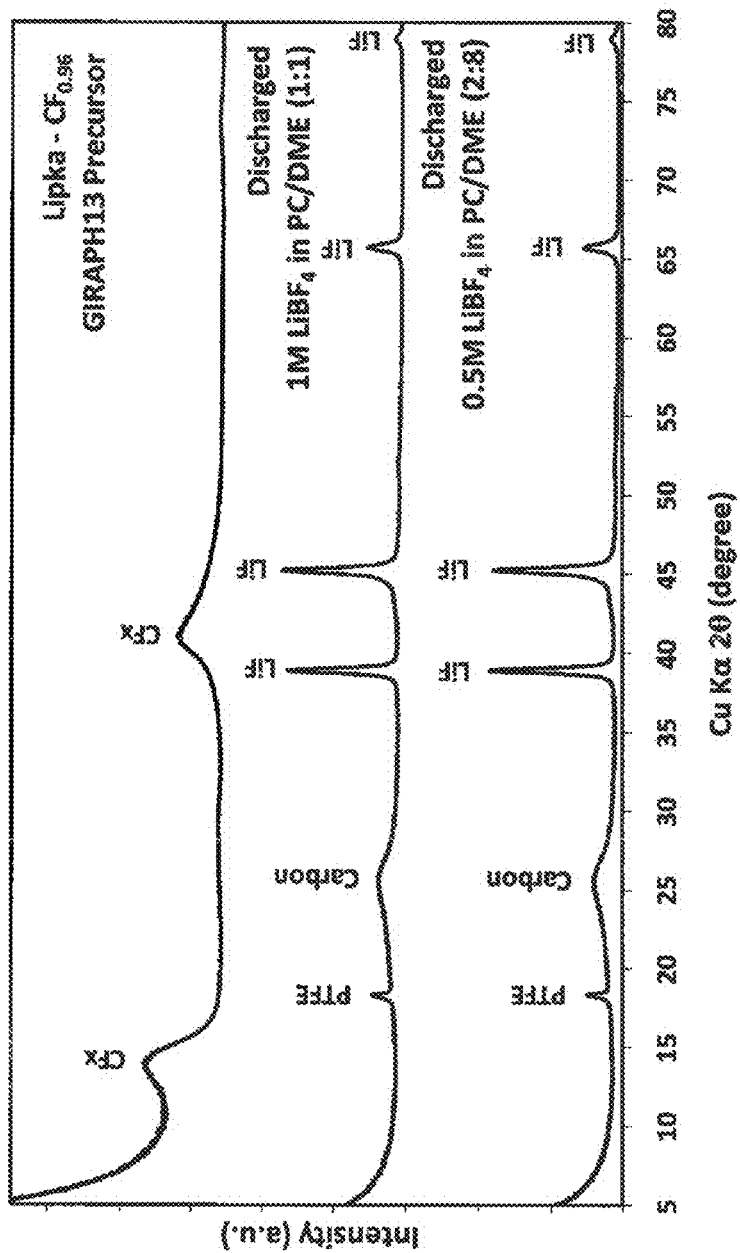

FIG. 49 is a graph showing XRD data for a discharged cathode including $CF_{0.96}$ in fluorinated carbon nanospheres.

Figure 50:
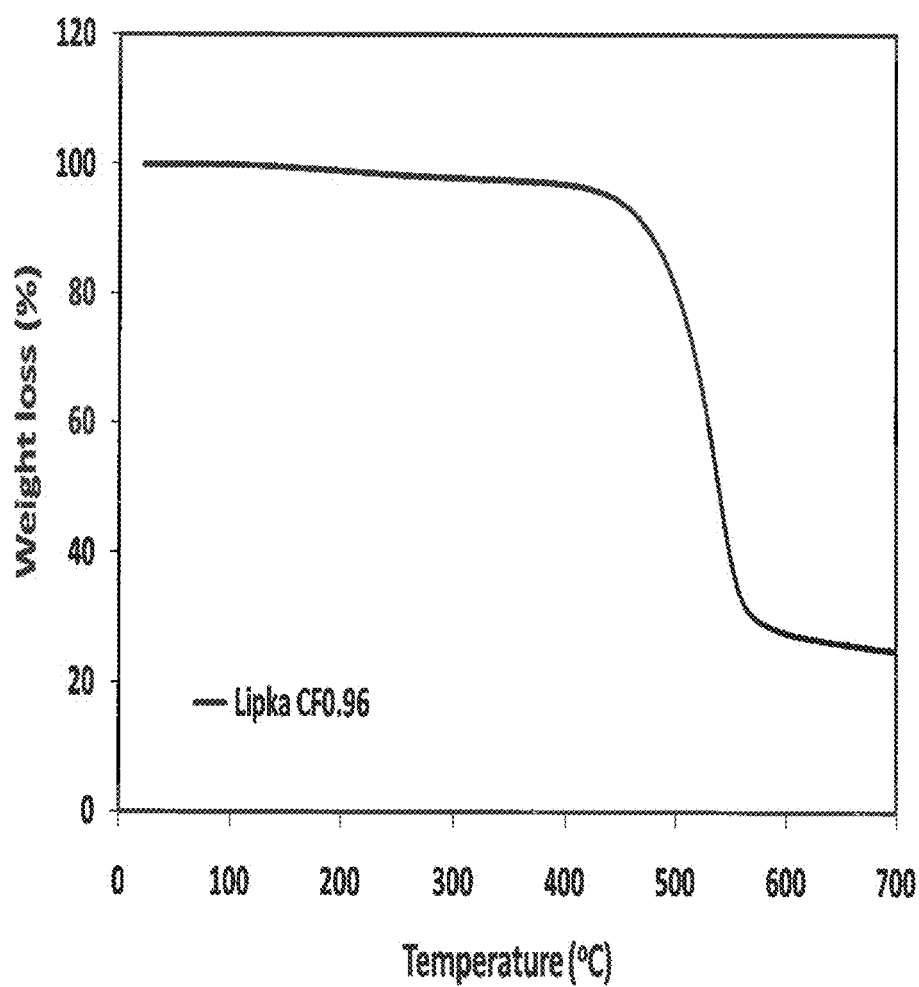

FIG. 50 is a graph showing thermal stability of fluorinated carbon nanospheres including $CF_{0.96}$.

Figure 51:
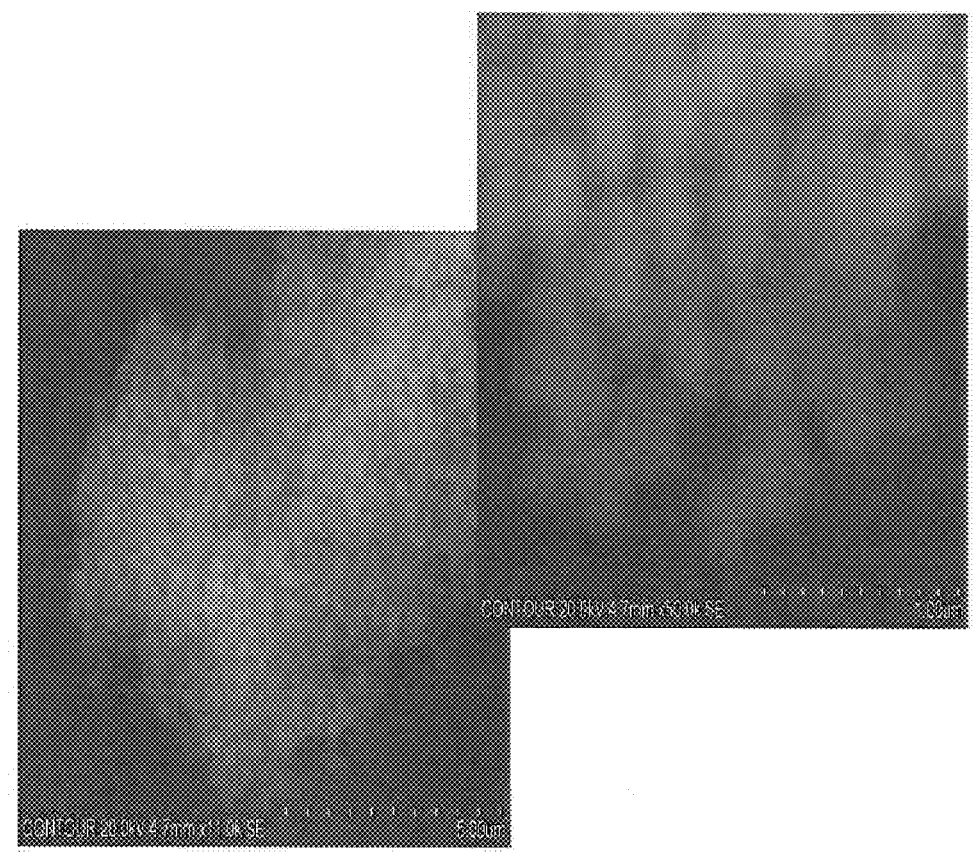

FIG. 51 shows SEM images of as-synthesized fluorinated carbon nanospheres including $CF_{0.96}$.

Figure 52:
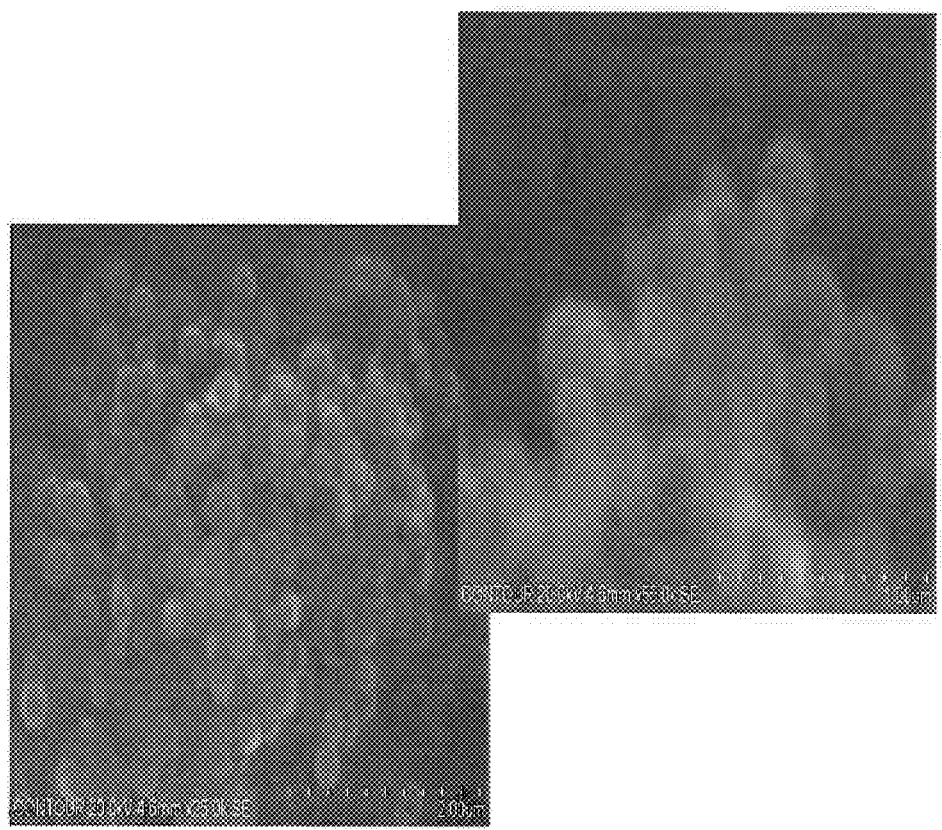

FIG. 52 shows SEM images of fluorinated carbon nanospheres including $CF_{0.96}$ after thermal decomposition.

Figure 53:
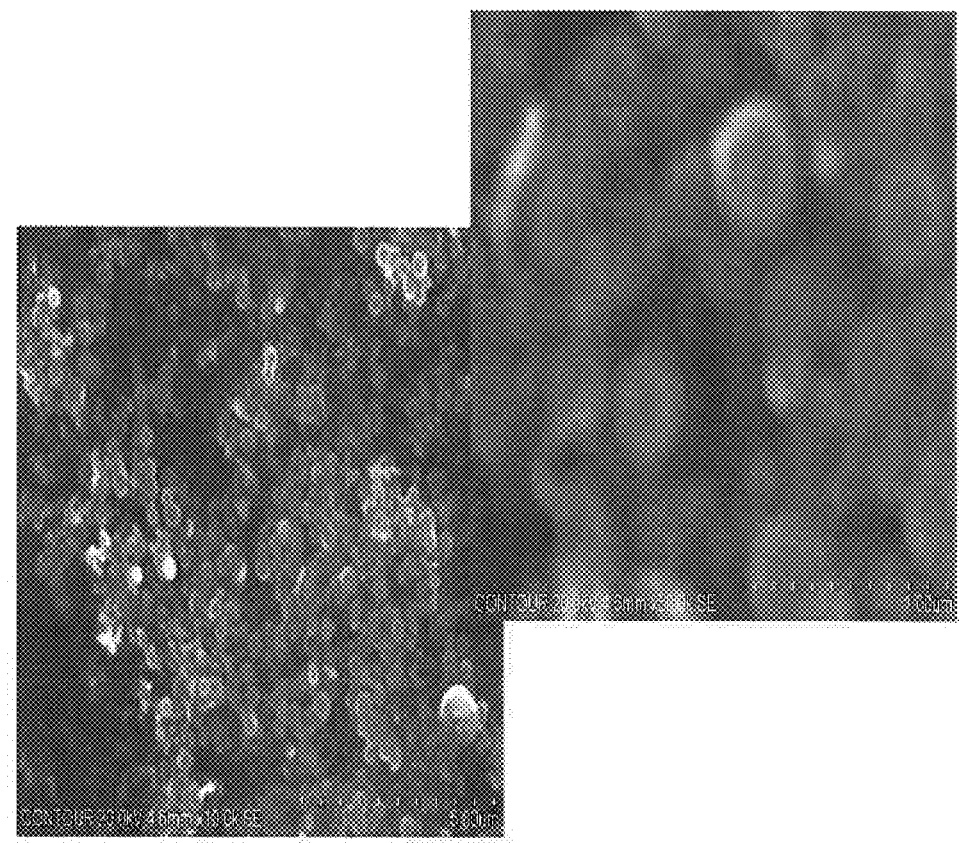

FIG. 53 shows SEM images of carbon obtained as the electrochemical discharge product of fluorinated carbon nanospheres including $CF_{0.96}$ in 1M $LiBF_4$ in PC:dimethoxyethane ("DME") (1:1).

Figure 54:
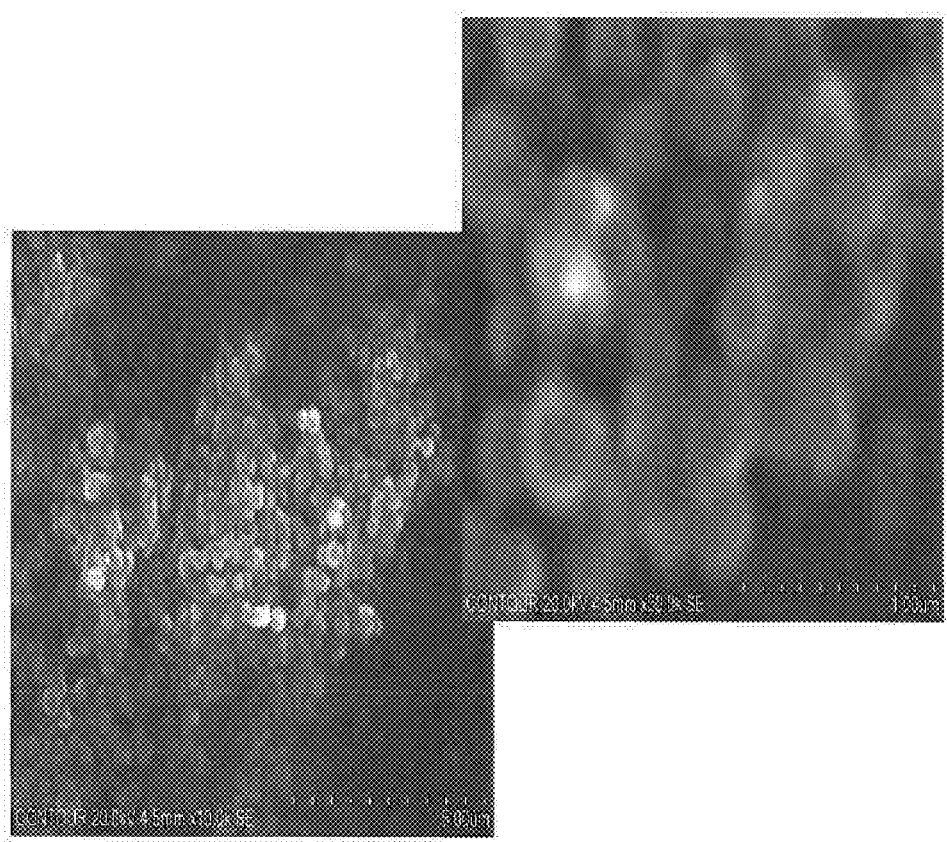

FIG. 54 shows SEM images of carbon obtained as the electrochemical discharge product of fluorinated carbon nanospheres including $CF_{0.96}$ in 0.5 M $LiBF_4$ in PC:DME (2:8).

Figure 55:
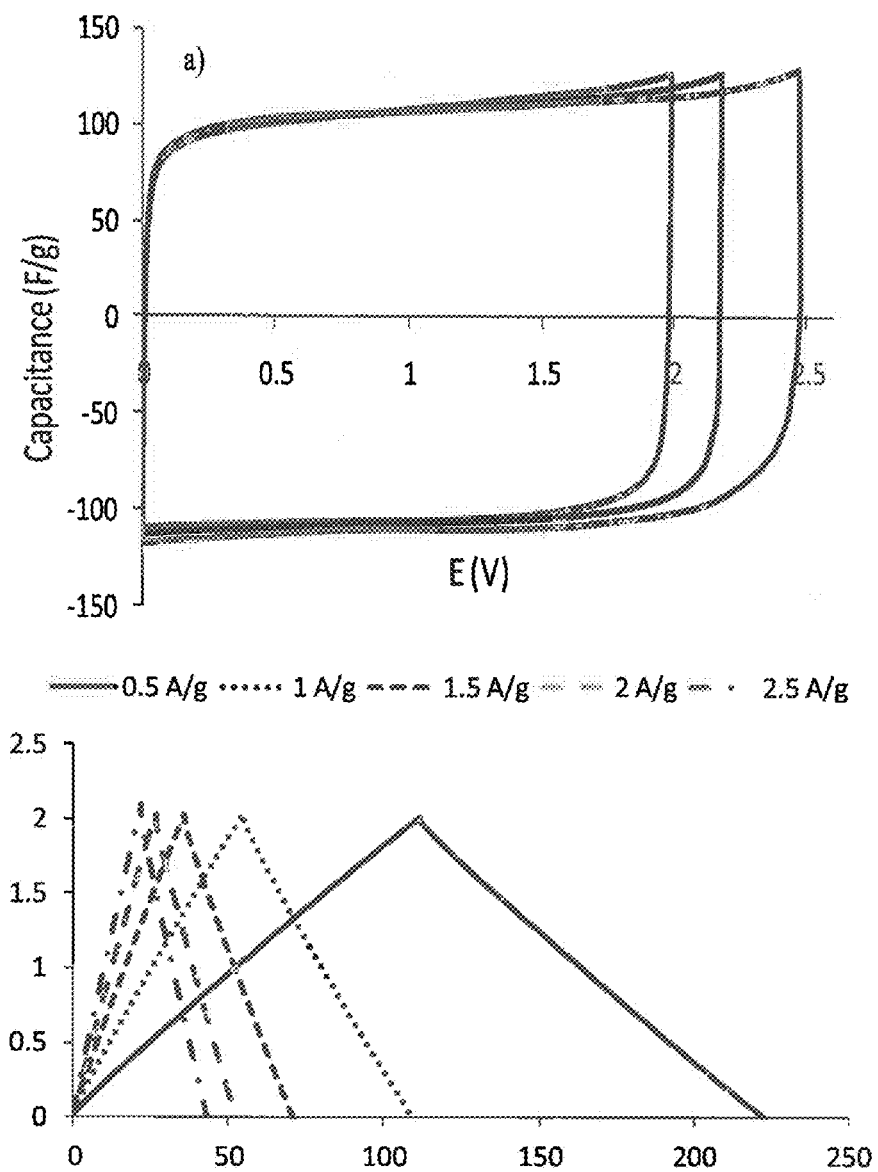

FIG. 55 shows A) a cyclic voltammogram, and B) charge/discharge plots for carbon particles that were subjected to $K_2CO_3+NH_3$ activation.

Figure 56:
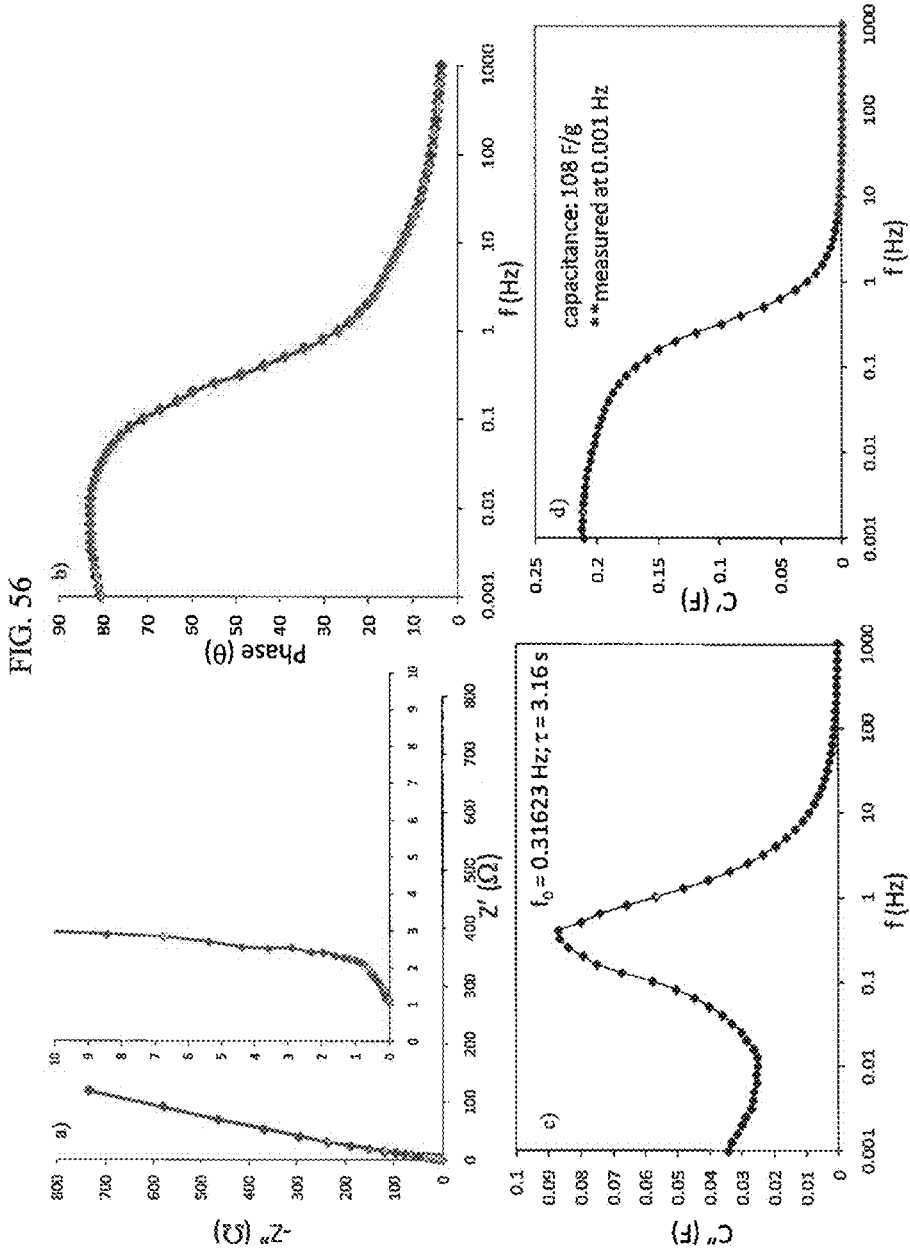

FIG. 56 shows graphs of electrochemical impedance performance of $K_2CO_3+NH_3$ activated carbon particles. FIG. 55a is a Nyquist plot, FIG. 55b is a Bode plot, FIG. 55c is a graph plotting C" vs. frequency, and FIG. 55d is a graph plotting C' vs. frequency.

Figure 57:
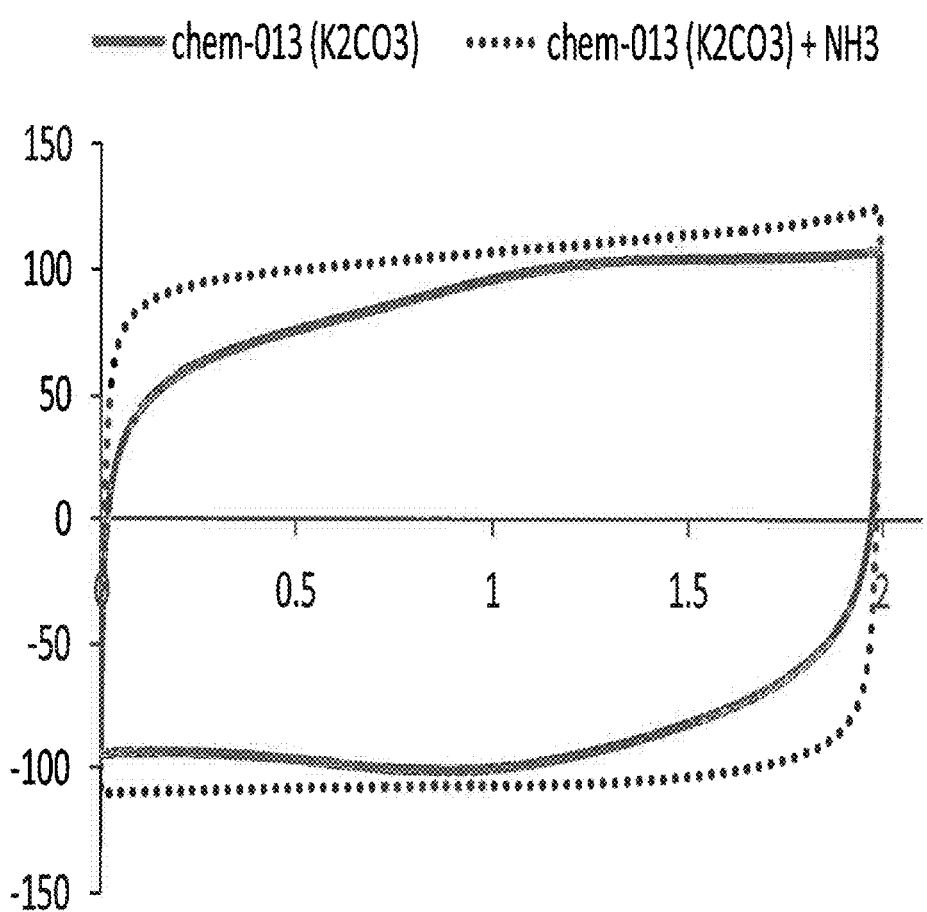

FIG. 57 shows cyclic voltammograms comparing the $K_2CO_3$-activated carbon particles (Chem-013) with the $K_2CO_3+NH_3$ activated carbon particles (Chem-013/NH3).

Figure 58:
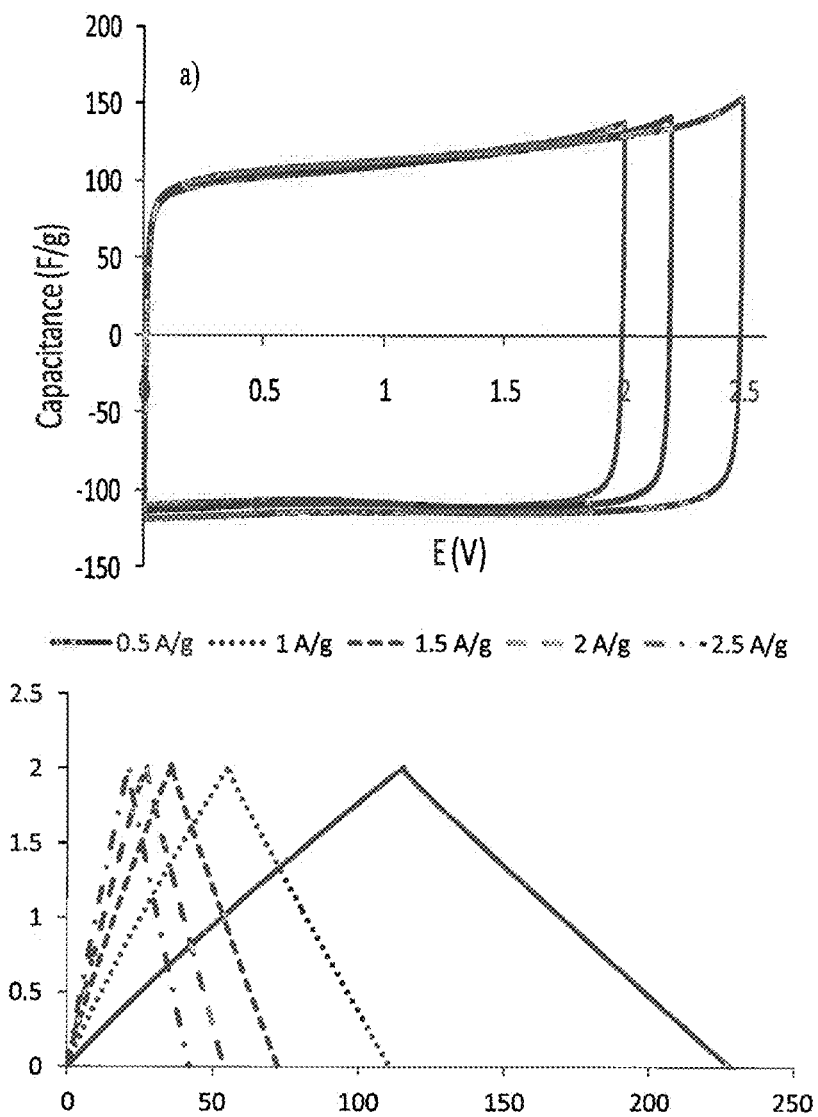

FIG. 58 shows A) cyclic voltammograms, and B) charge/discharge plots for carbon particles that were subjected to $K_2CO_3+NH_4OH$ activation.

Figure 59:
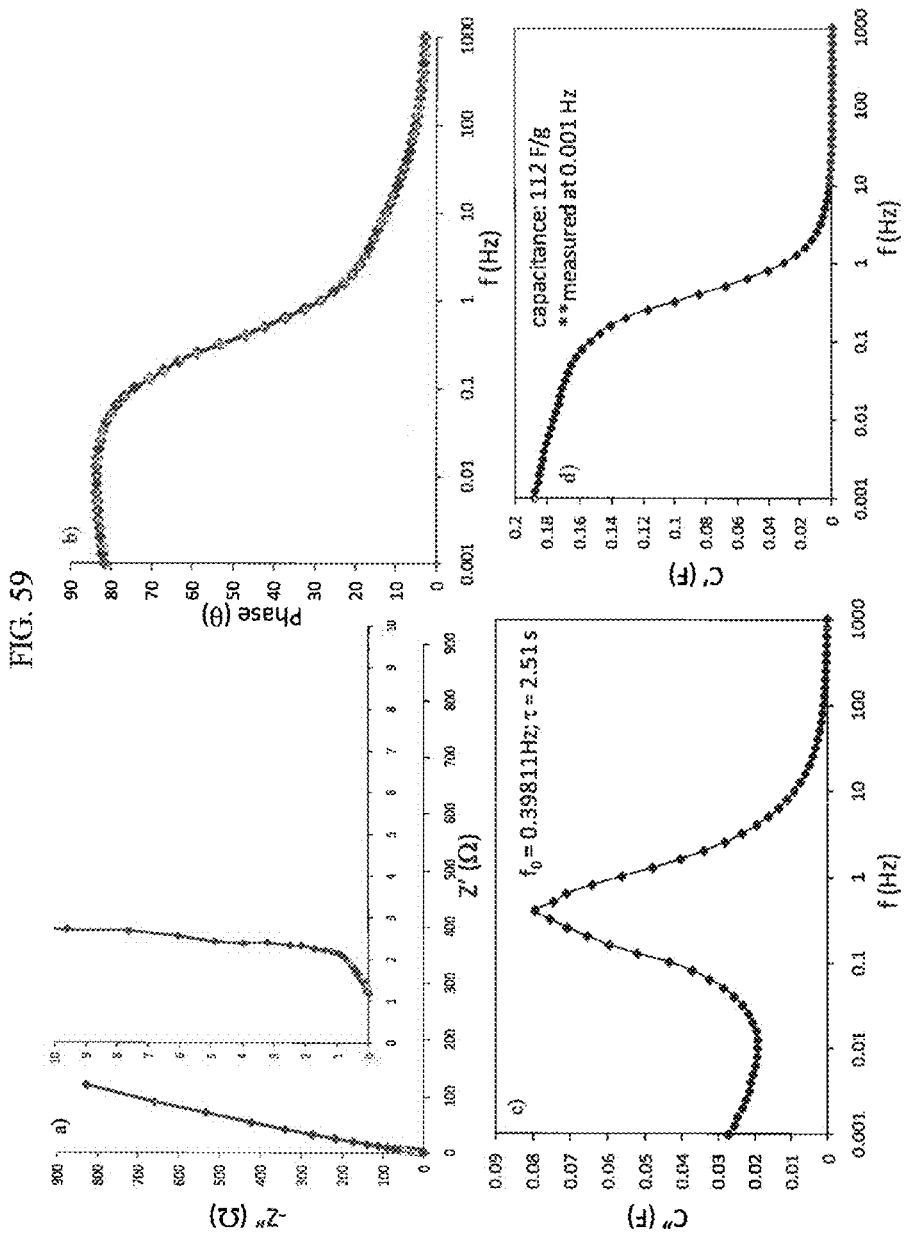

FIG. 59 shows graphs of electrochemical impedance performance of $K_2CO_3+NH_4OH$ activated carbon particles. FIG. 58a is a Nyquist plot, FIG. 58b is a Bode plot, FIG. 58c is a graph plotting C" vs. frequency, and FIG. 58d is a graph plotting C' vs. frequency.

Figure 60:
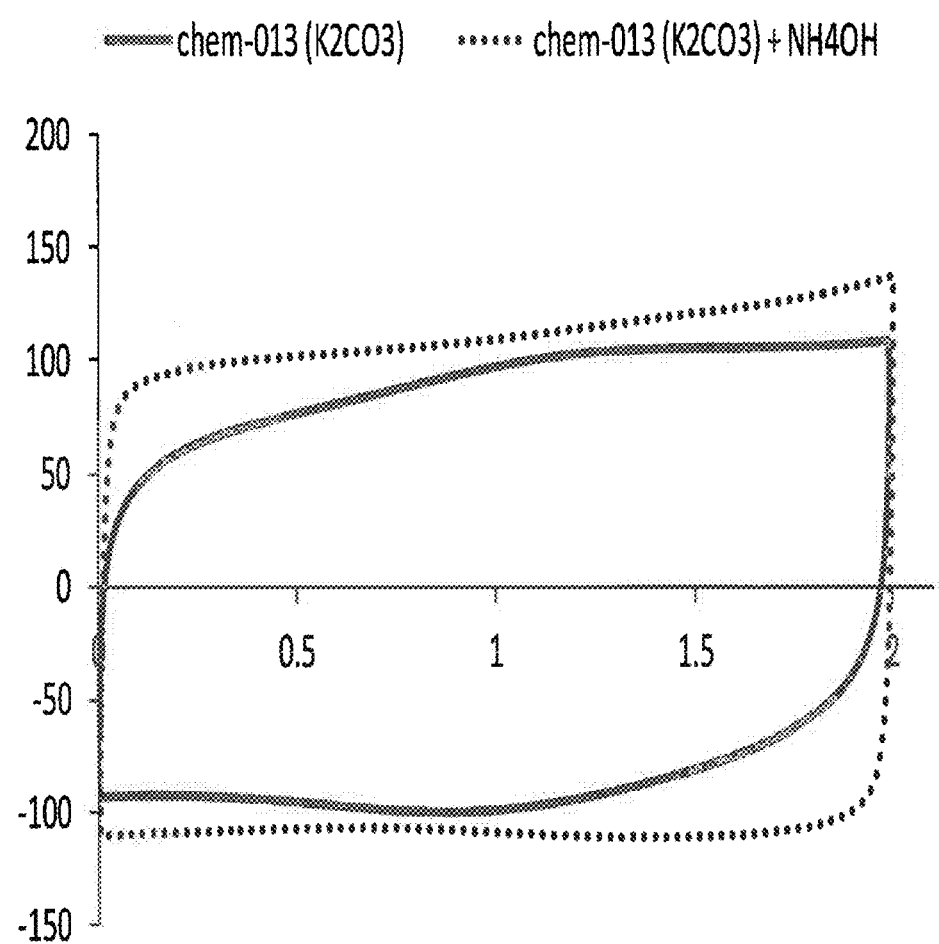

FIG. 60 shows cyclic voltammograms comparing the $K_2CO_3$-activated carbon particles (Chem-013) with the $K_2CO_3+NH_4OH$ activated carbon particles (Chem-013/$NH_4OH$).

Figure 61:
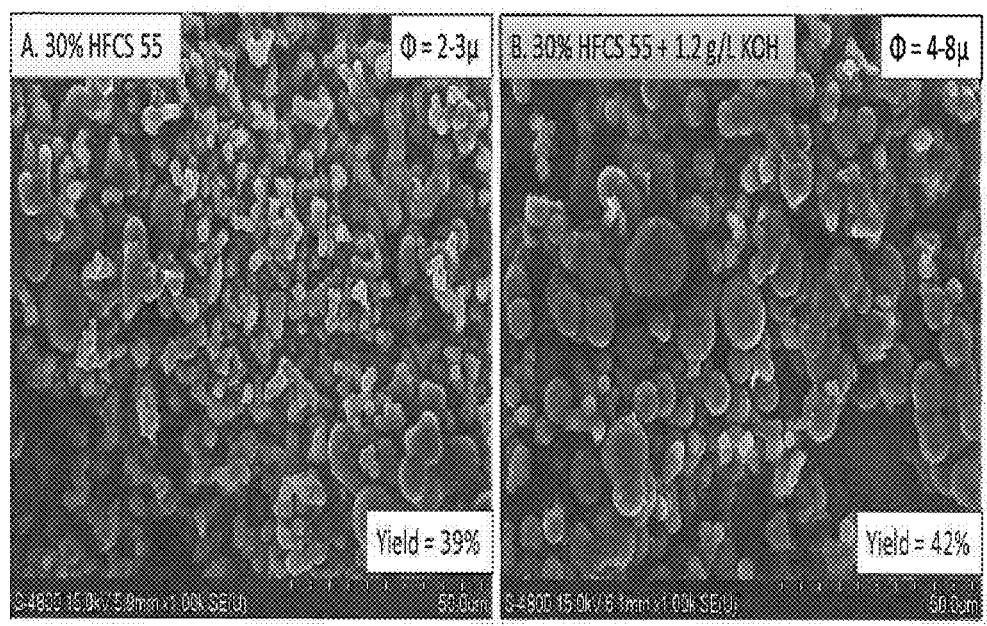

FIG. 61 shows SEM images (low and high magnification) of carbon particles hydrothermally made from (A) 30% HFCS 55, (B) 30% HFCS 55 with 1.2 g/L of KOH.

Figure 62:
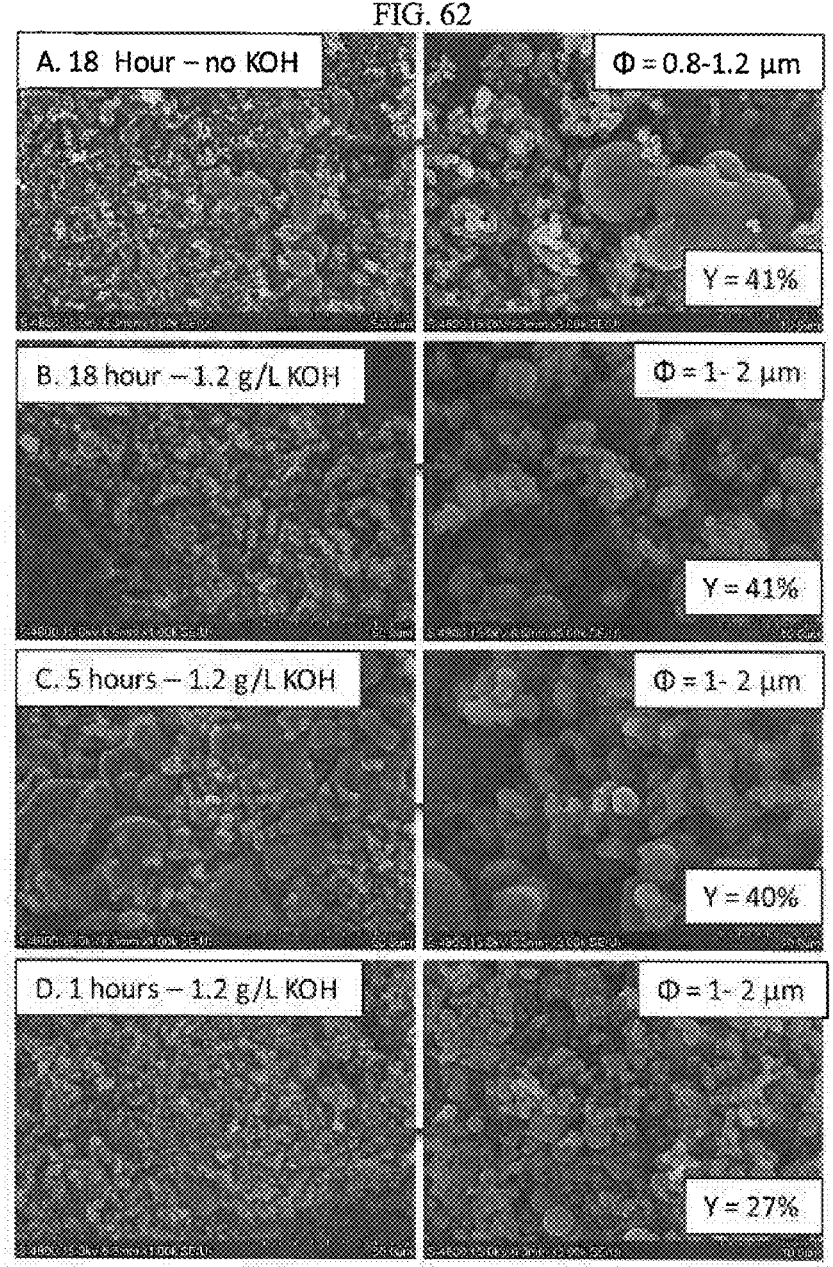

FIG. 62 shows SEM images (low and high magnification) of carbon materials made hydrothermally from (A) 10% HFCS 55, 18 hour dwell, (B) 10% HFCS 55+1.2 g/L KOH, 18 hour dwell, (C) 10% HFCS 55+1.2 g/L KOH, 5 hour dwell, and (D) 10% HFCS 55+1.2 g/L KOH, 1 hour dwell.

Figure 63:
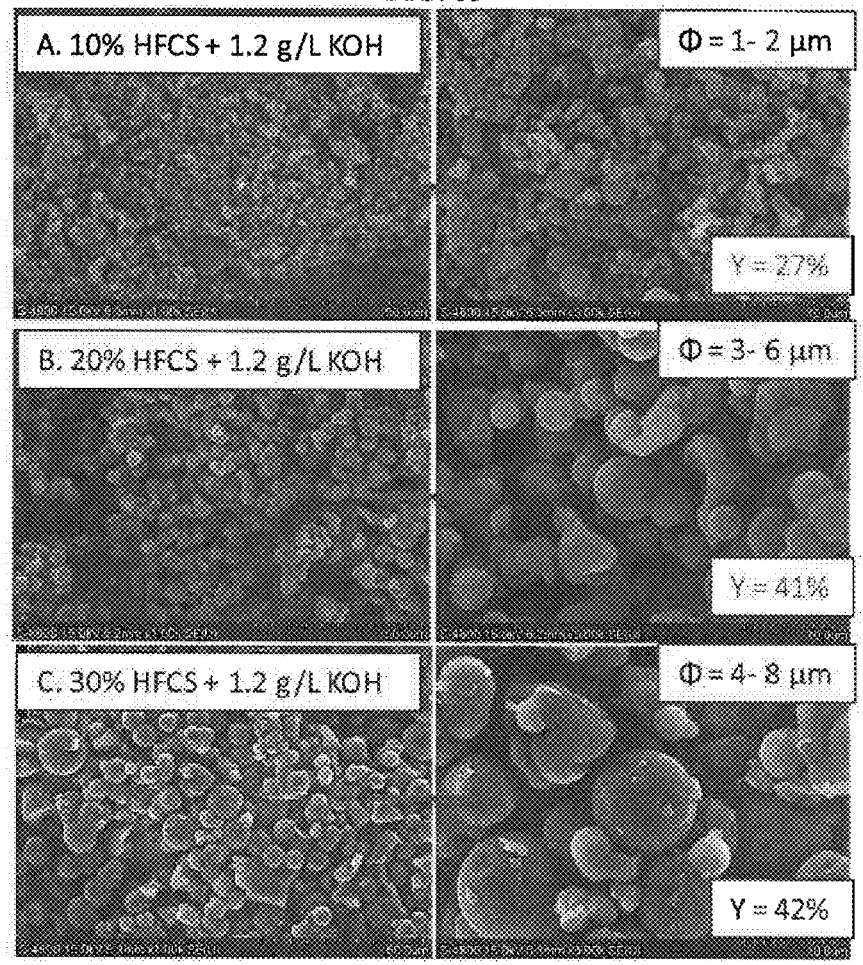

FIG. 63 shows SEM images (low and high magnification) of carbon particles made from (A) 10% HFCS 55+1.2 g/L KOH, (B) 20% HFCS 55+1.2 g/L KOH, and (C) 30% HFCS 55+1.2 g/L KOH.

Figure 64:
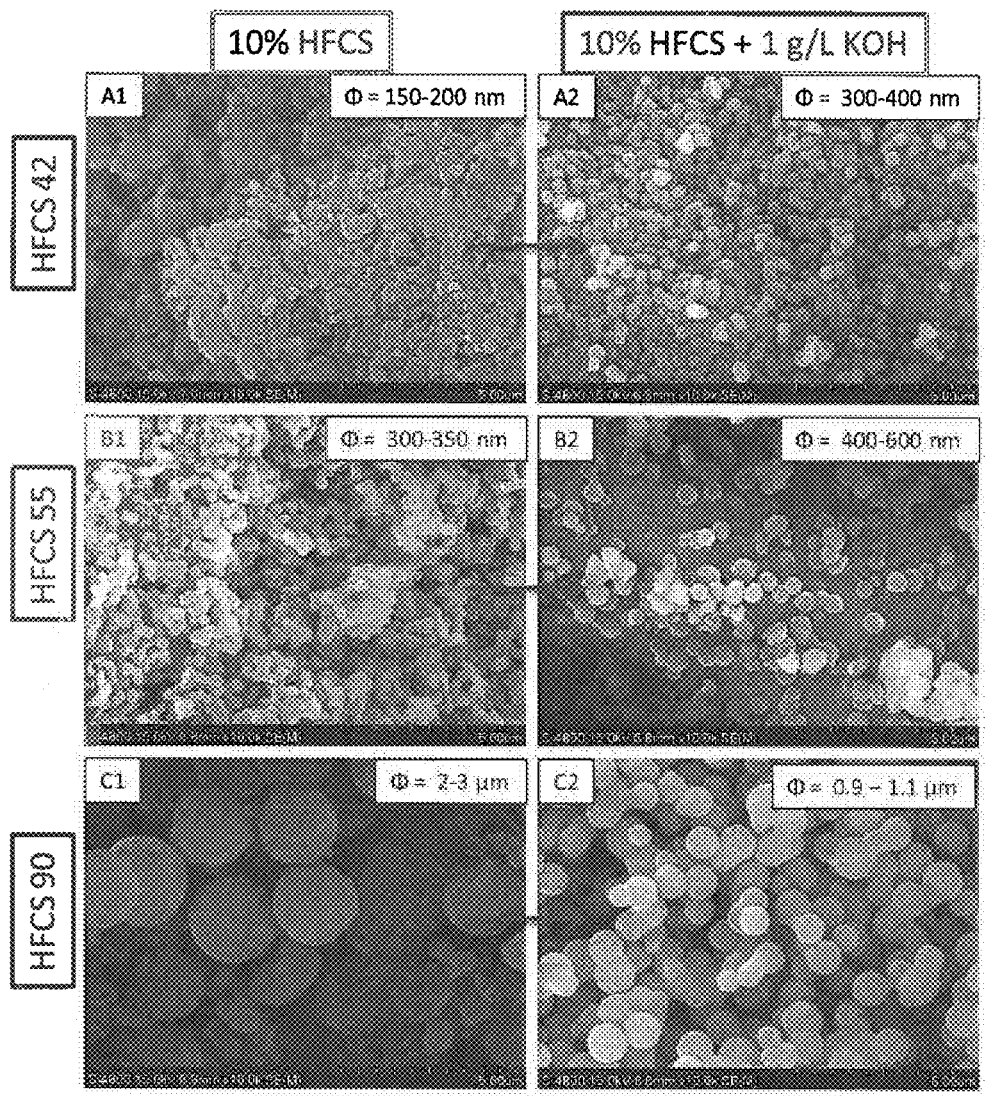

FIG. 64 shows SEM images of carbon particles made from 10% (A) HFCS 42, (B) HFCS 55, and (C) HFCS 90, with (2) and without (1) the addition of 0.1 wt % KOH.

Figure 65:
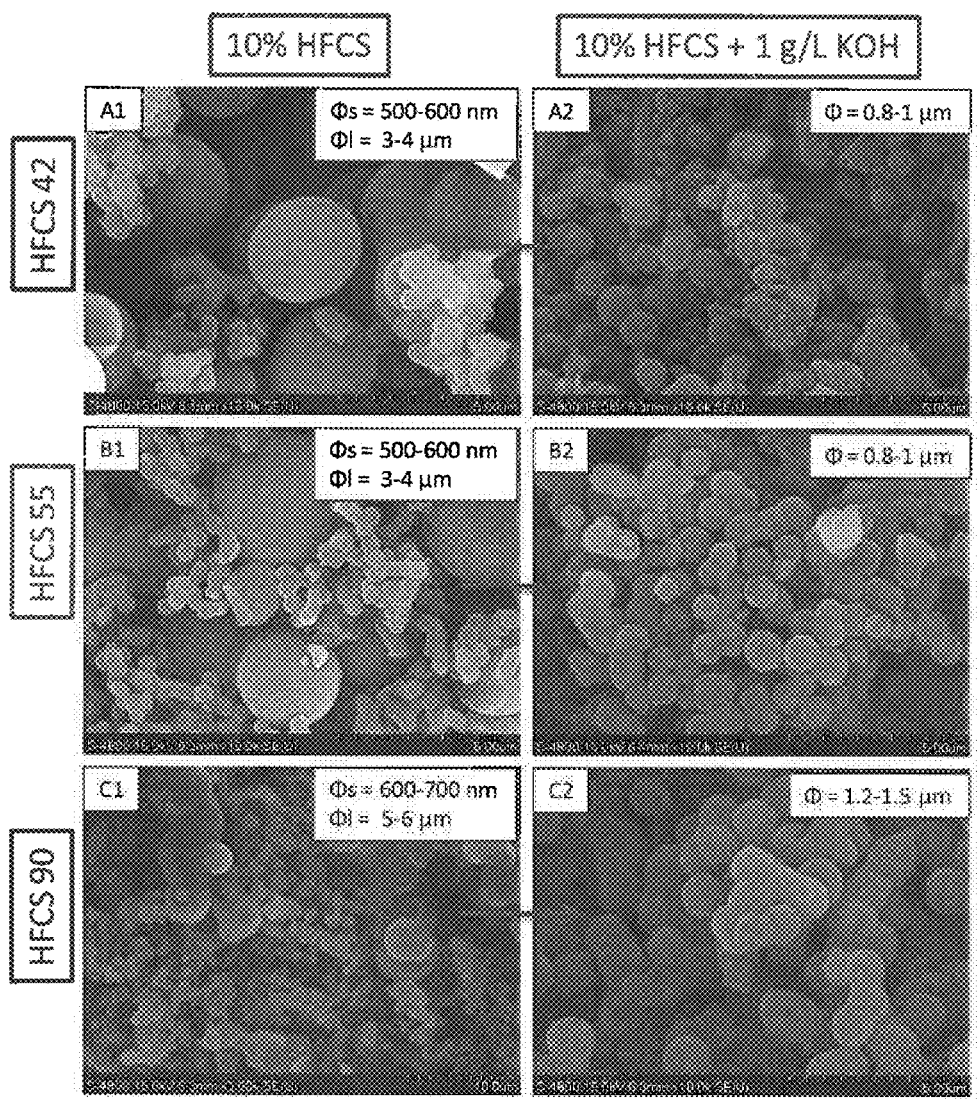

FIG. 65 shows SEM images of carbon particles made from 10% (A) HFCS 42, (B) HFCS 55, and (C) HFCS 90, with (2) and without (1) the addition of 0.1 wt % KOH.

Figure 66:
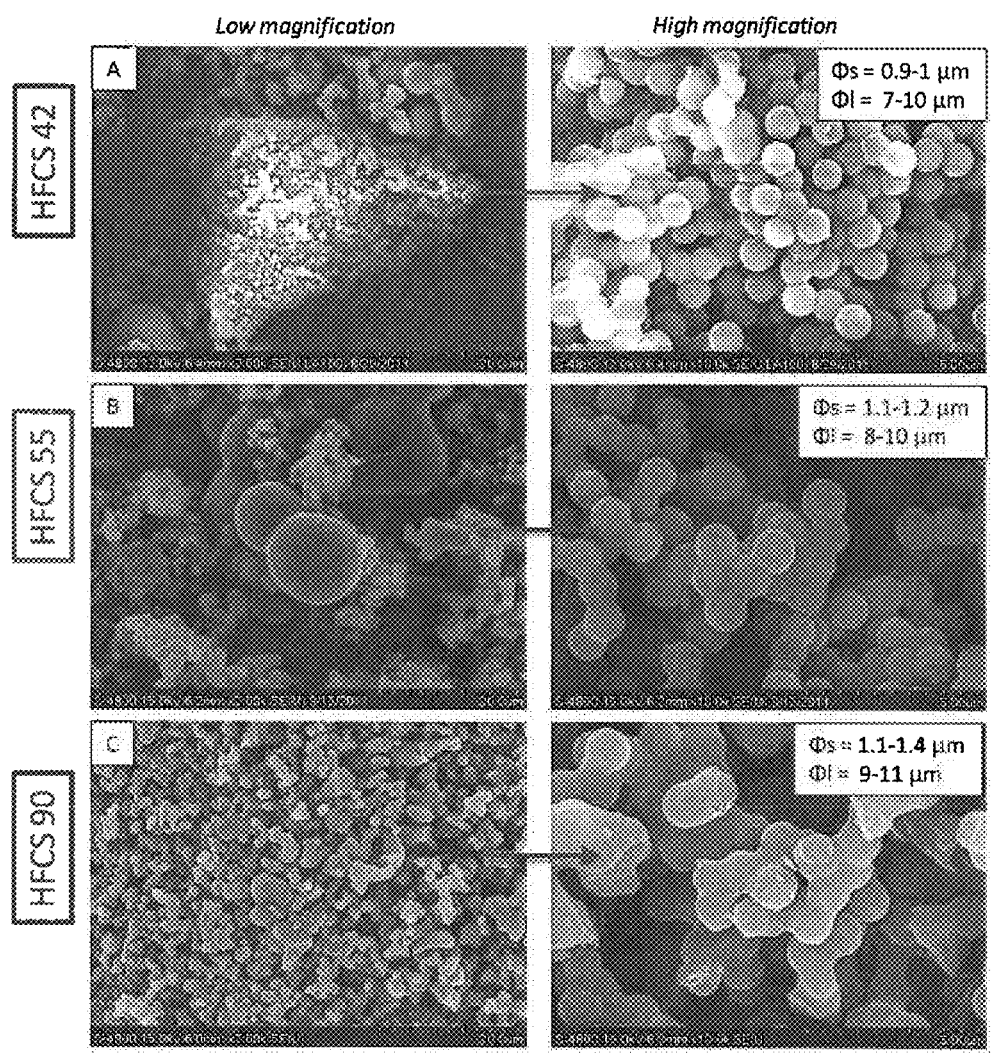

FIG. 66 shows SEM images of carbon particles made from 10% (A) HFCS 42, (B) HFCS 55, and (C) HFCS 90.

Figure 67:
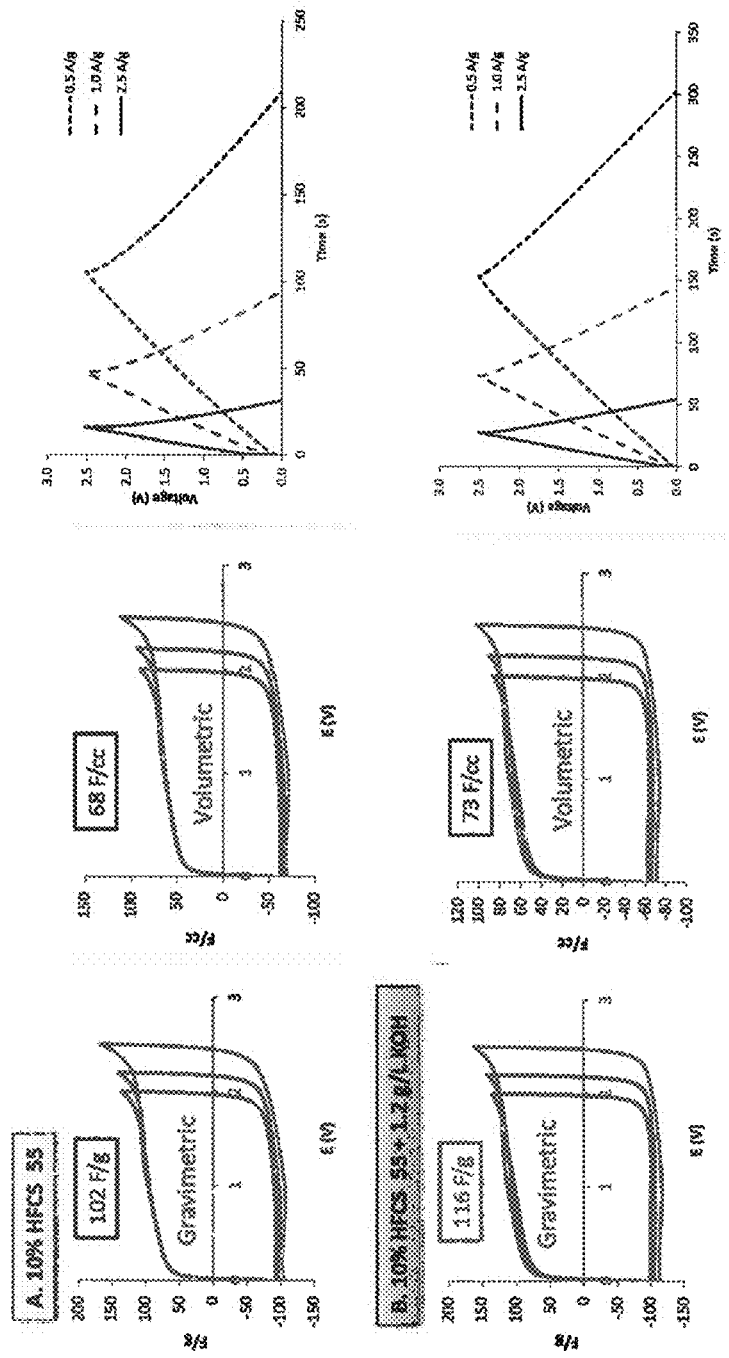

FIG. 67 shows cyclic voltammograms and charge/discharge plots of a supercapacitor cell composed of activated carbons made from (A) 10% HFCS 55 and (B) 10% HFCS 55+1.2 g/L KOH. The cyclic voltammograms were normalized to show gravimetric and volumetric performances.

Figure 68:
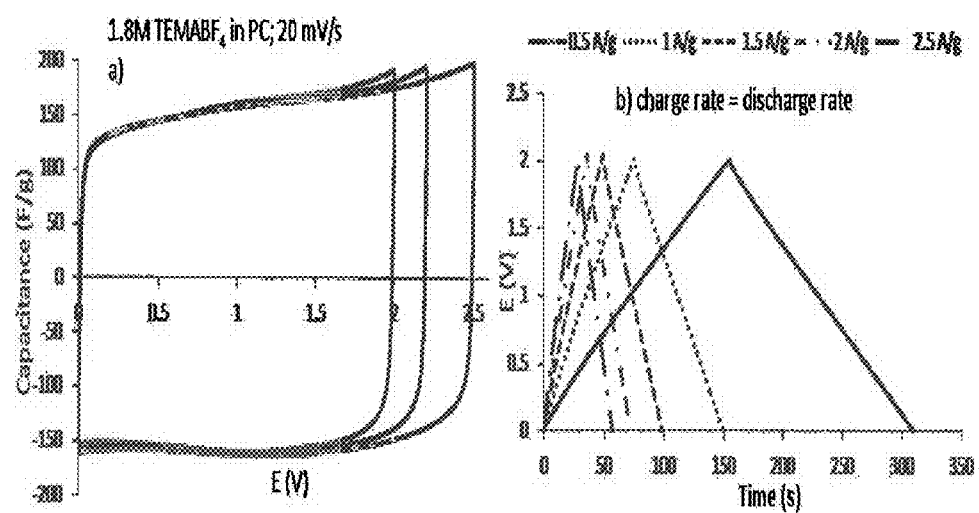

FIG. 68 shows the electrochemical performance of sample Chem-030.

Figure 69:
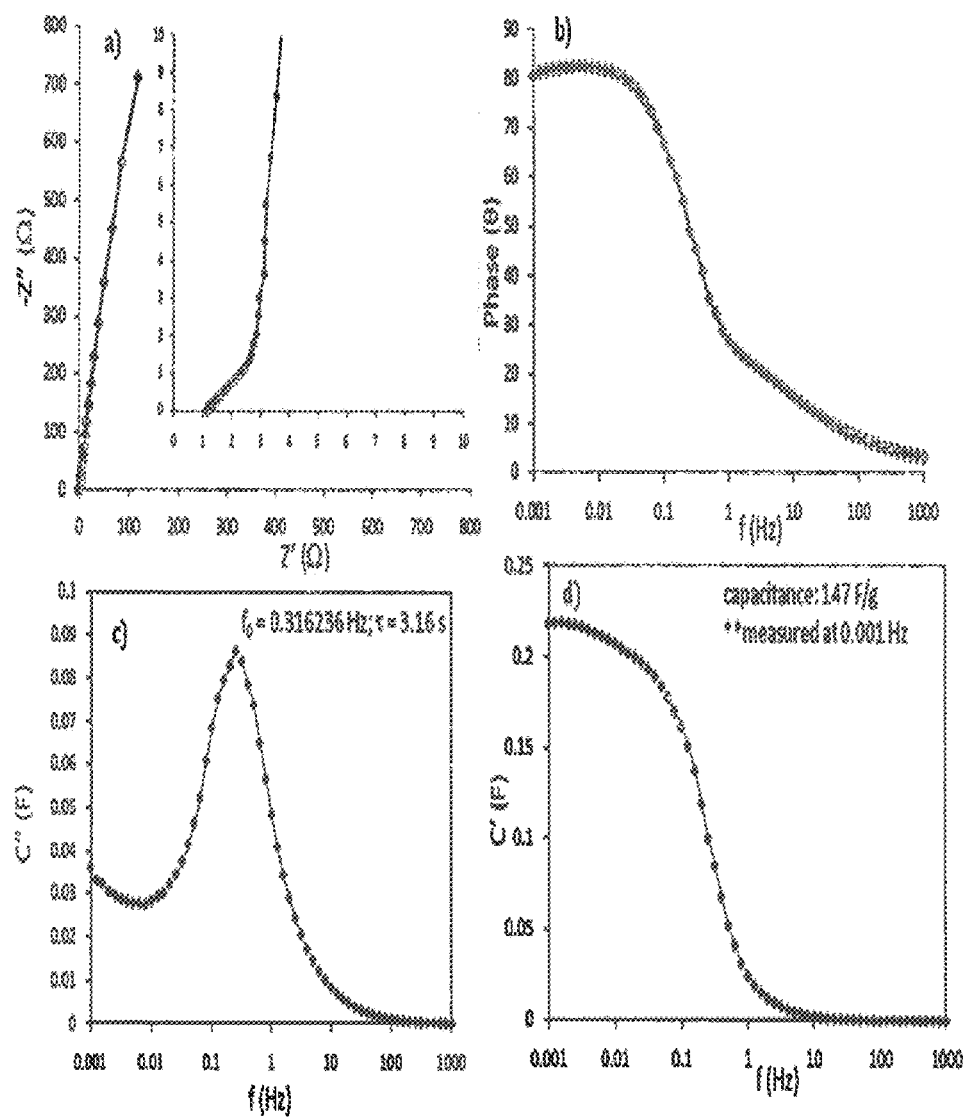

FIG. 69 shows the electrochemical impedance spectroscopy data of sample Chem-030.

Figure 70:
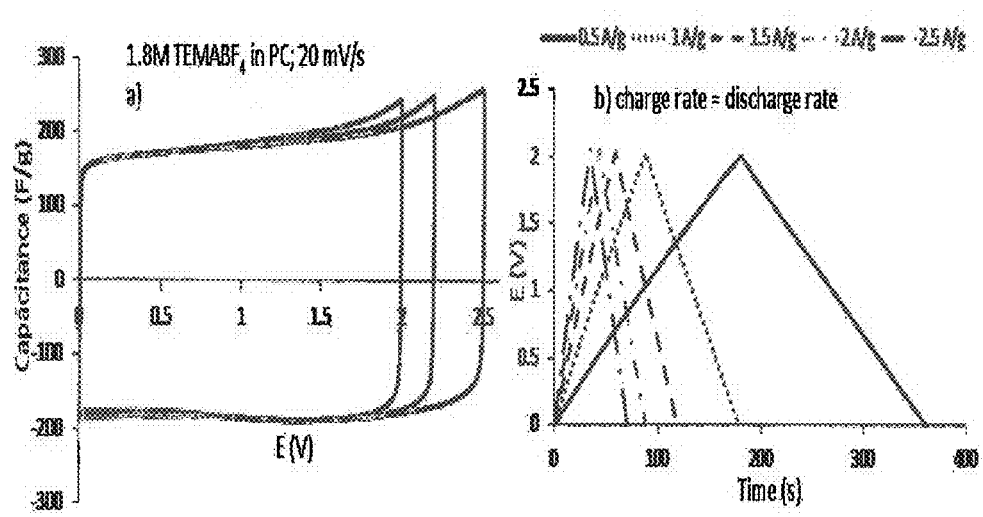

FIG. 70 shows the electrochemical performance of sample Chem-028.

Figure 71:
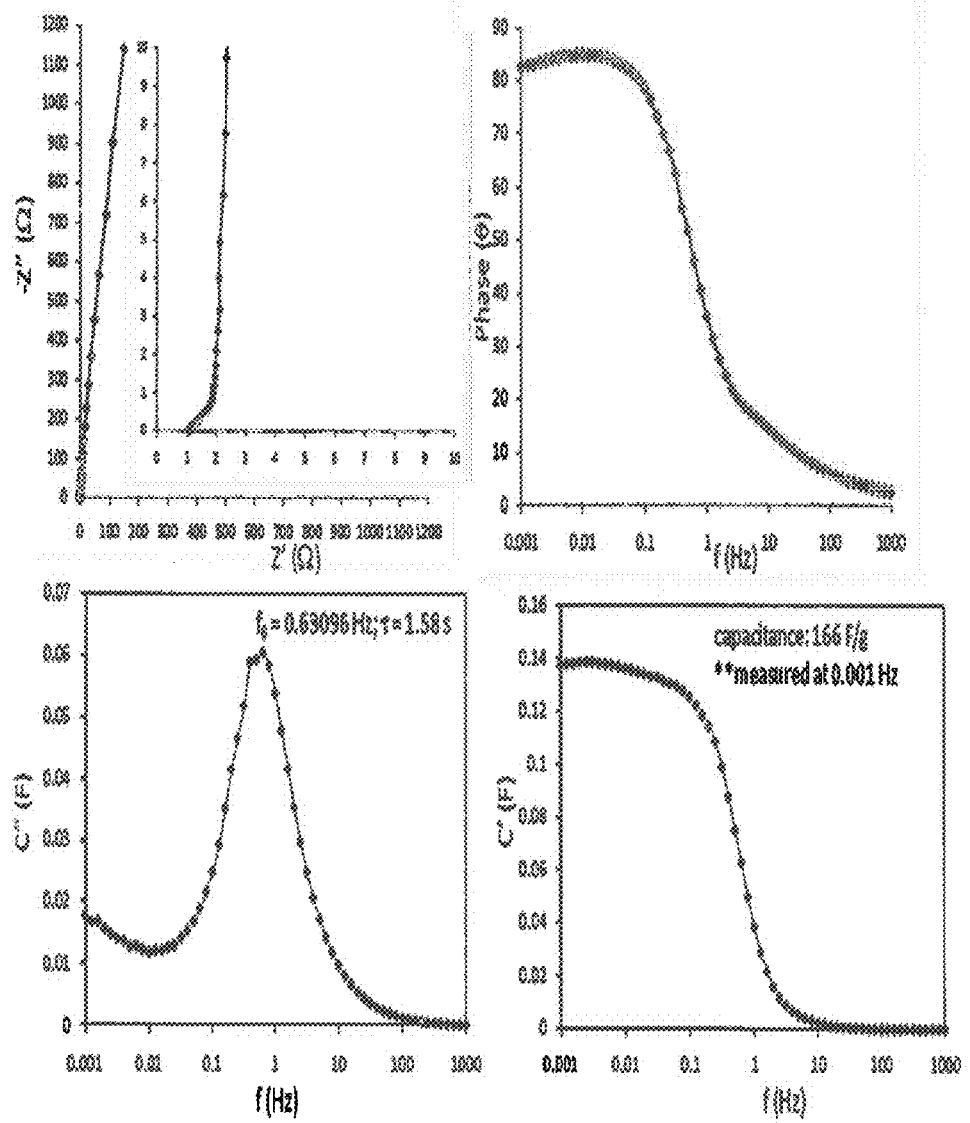

FIG. 71 shows the electrochemical impedance spectroscopy data of sample Chem-028.

Figure 72:
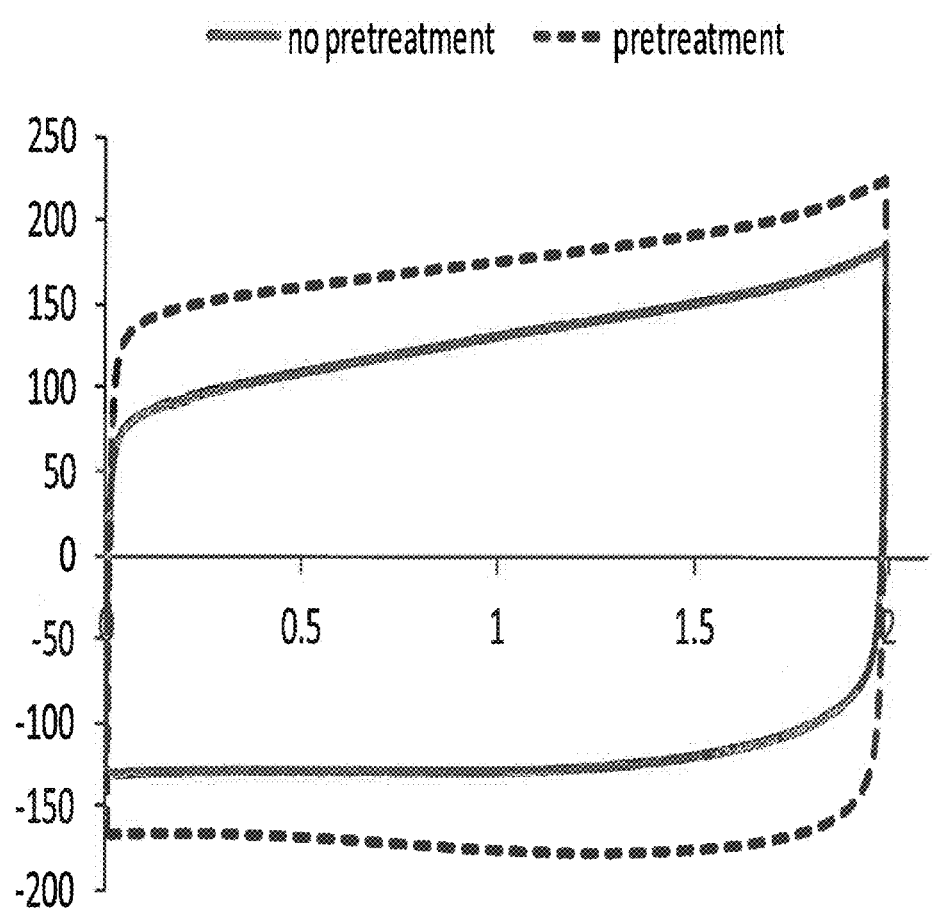

FIG. 72 shows the cyclic voltammetry data for salted and unsalted samples.

Figure 73:
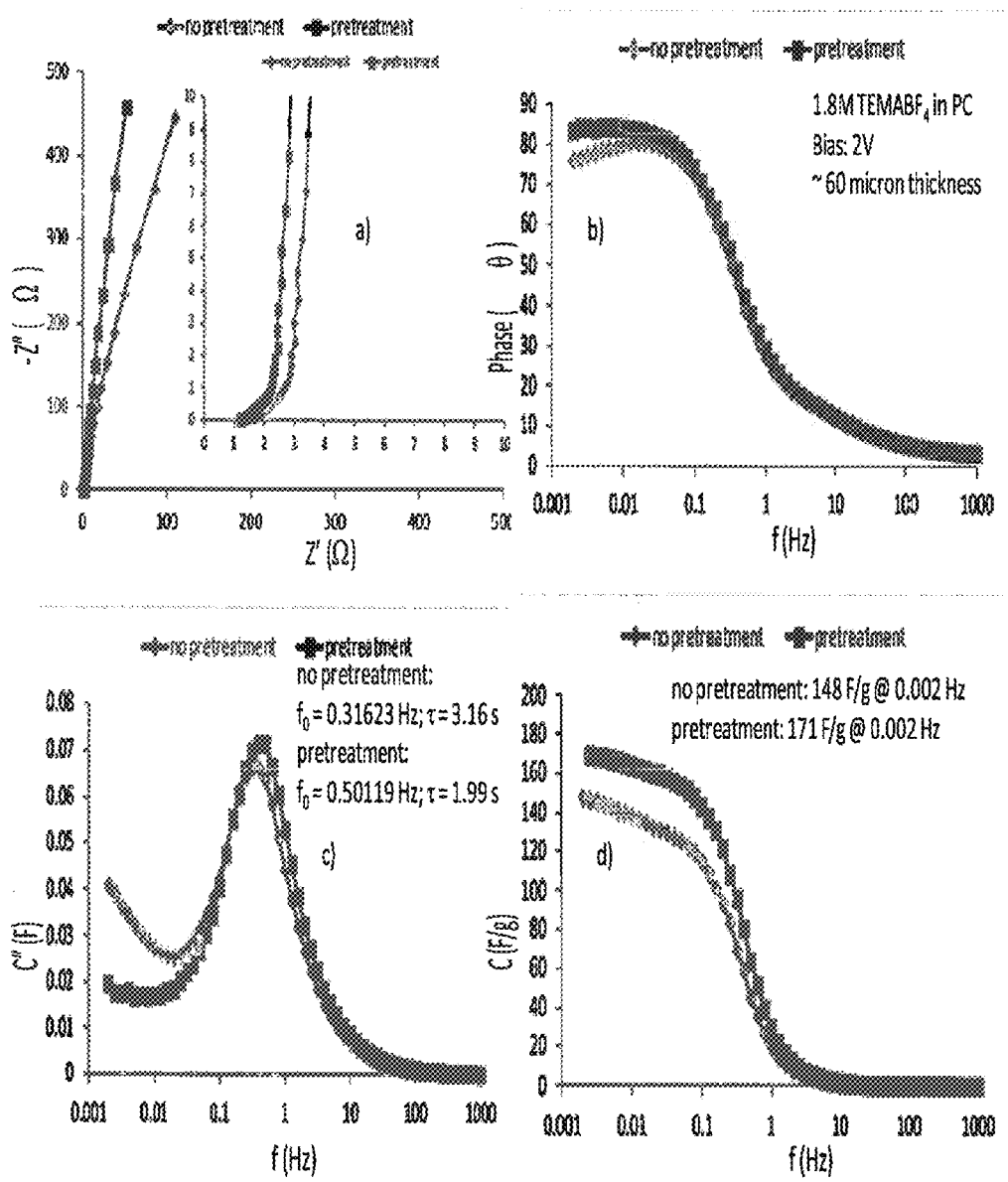

FIG. 73 shows the electrochemical impedance spectroscopy data for salted and unsalted samples.

Figure 74:
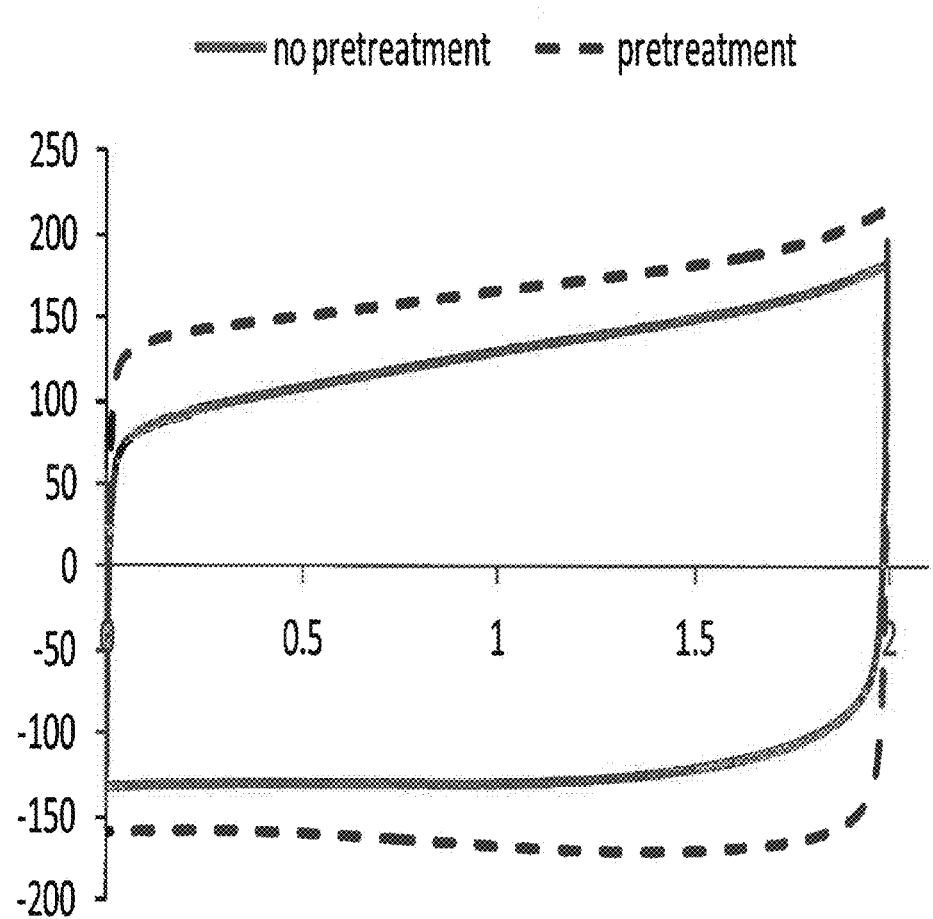

FIG. 74 shows the cyclic voltammetry data for Chem-064 (no pretreatment), and Chem-072 (10% sodium acetate pretreatment).

Figure 75:
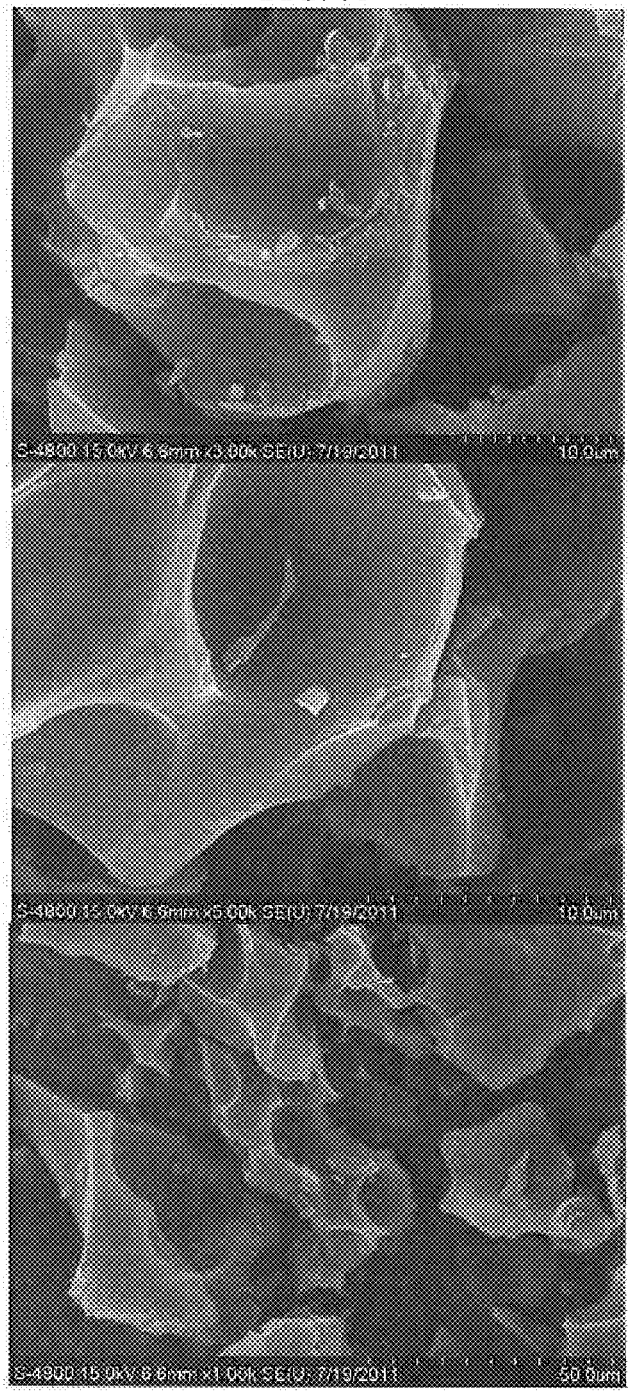

FIG. 75 shows SEM images of uncarbonized carbon particles activated with KOH.

Figure 76:
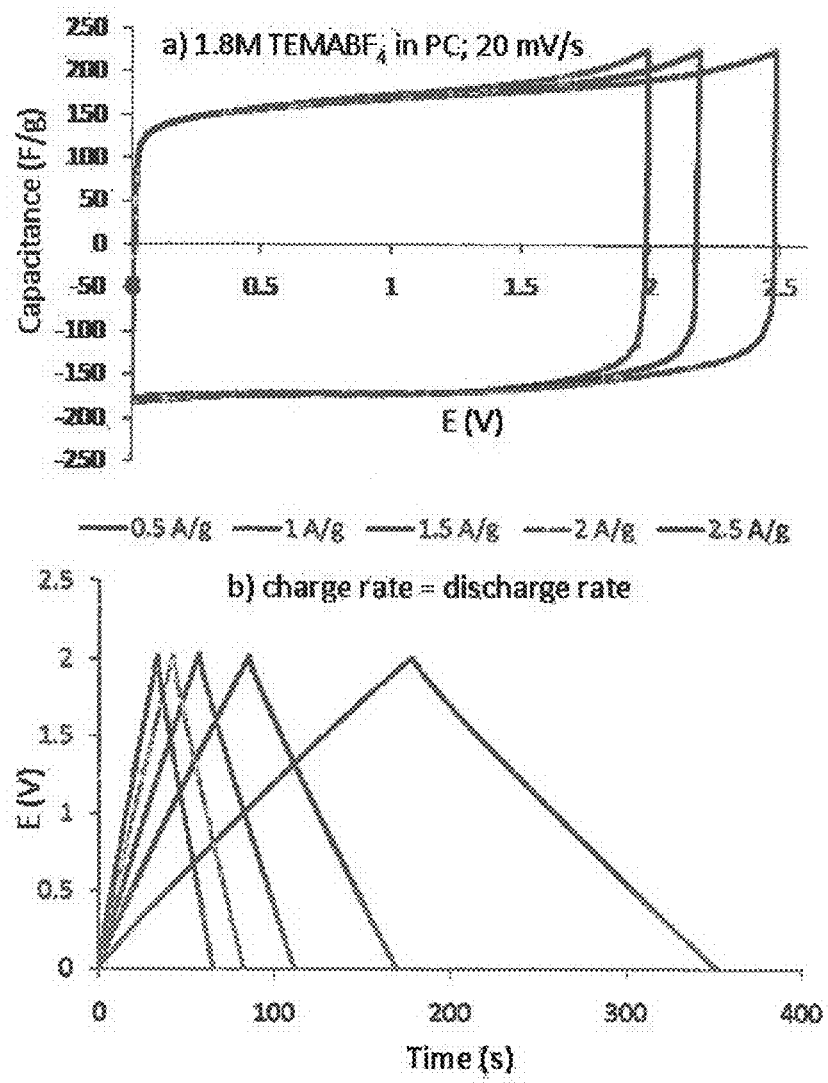

FIG. 76 shows A) a cyclic voltammogram, and B) charge/discharge plots for uncarbonized carbon particles activated with KOH.

Figure 77:
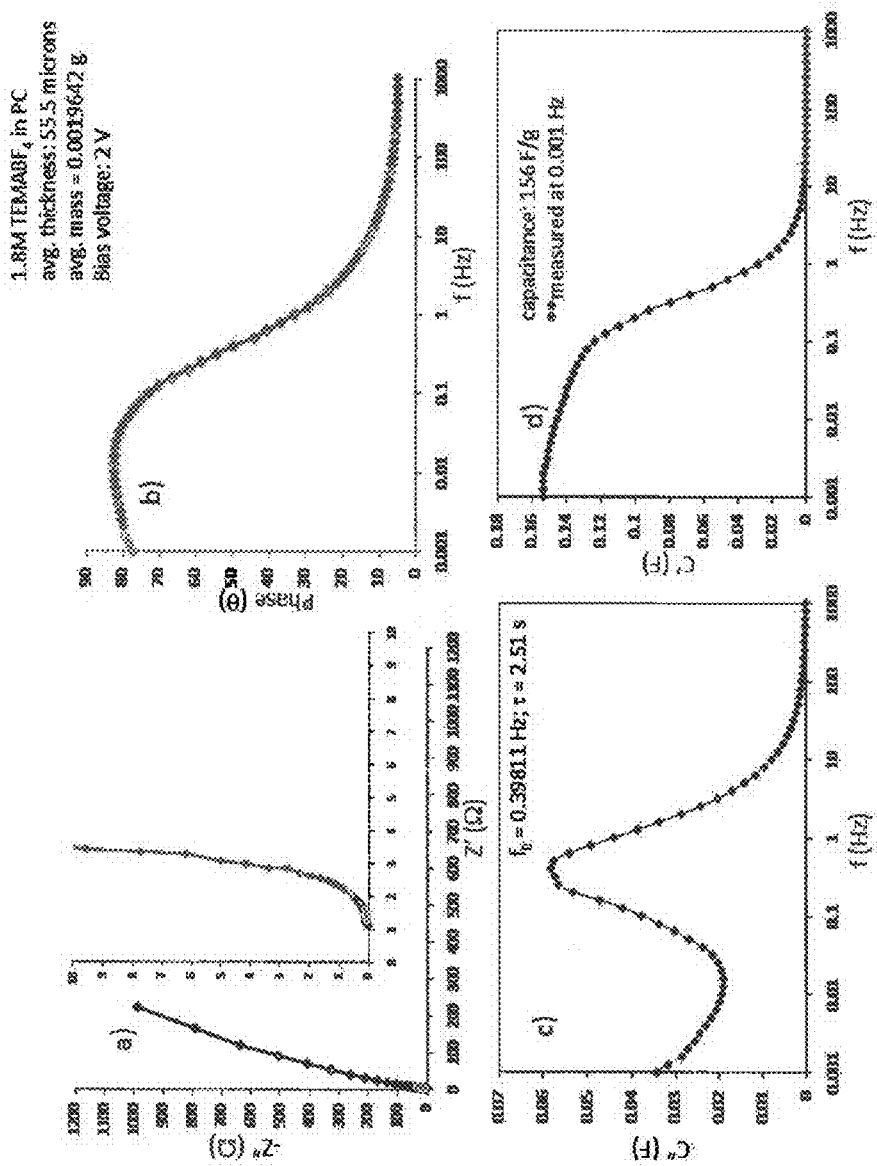

FIG. 77 shows graphs of electrochemical impedance performance of uncarbonized carbon particles activated with KOH. FIG. 77a is a Nyquist plot, FIG. 77b is a Bode plot, FIG. 77c is a graph plotting C" vs. frequency, and FIG. 77d is a graph plotting C' vs. frequency.

Figure 78:
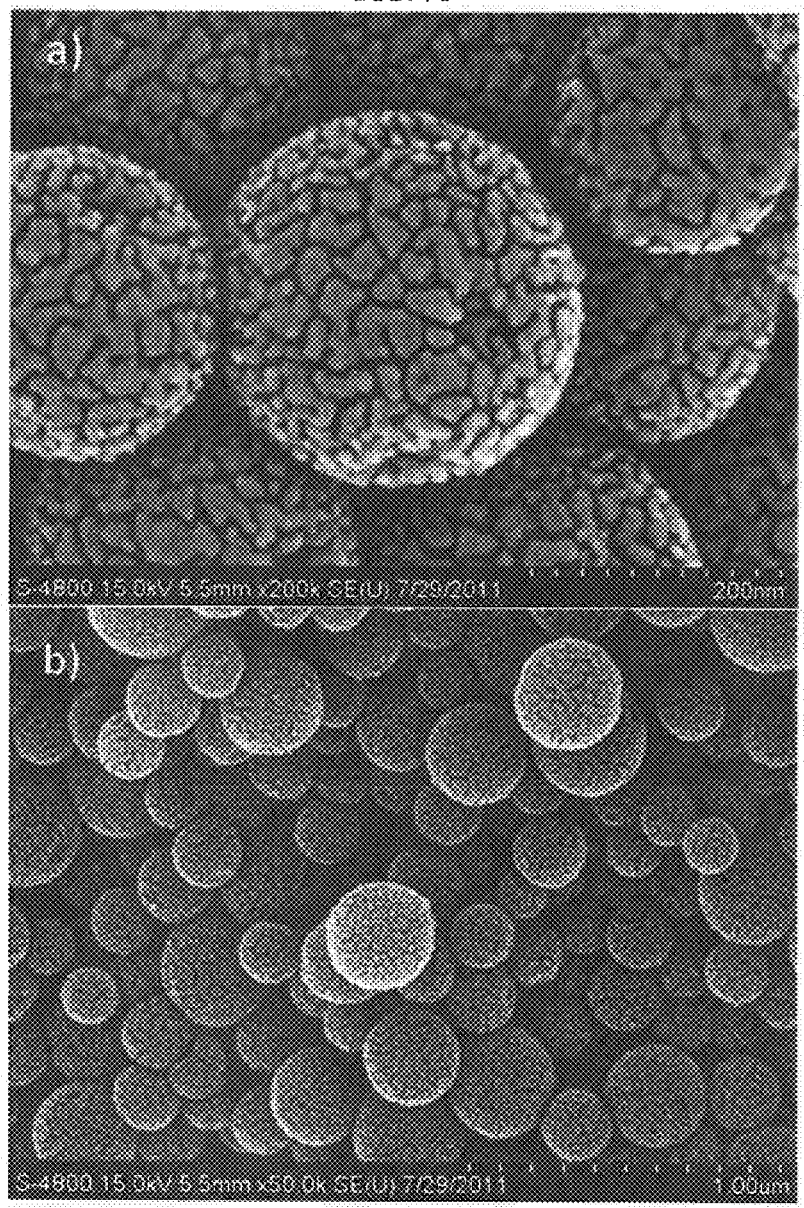

FIG. 78 shows SEM images of carbonized carbon particles activated with KOH.

Figure 79:
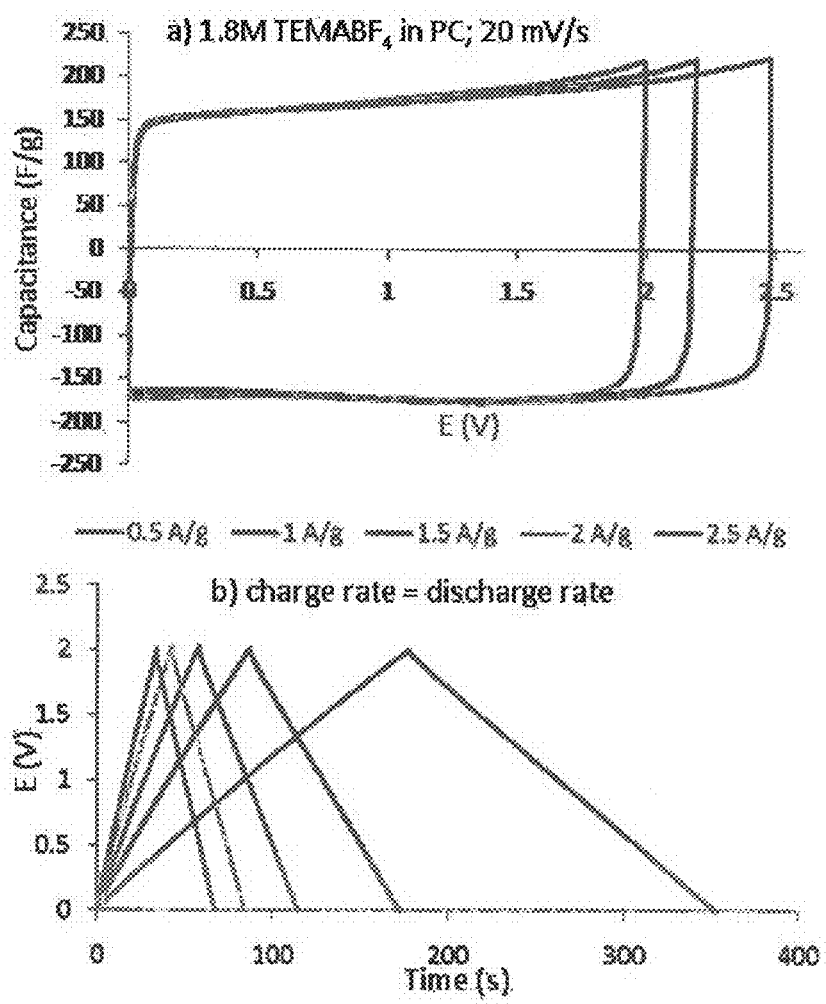

FIG. 79 shows A) a cyclic voltammogram, and B) charge/discharge plots for a composite electrode of spherical and non-spherical carbon particles.

Figure 80:
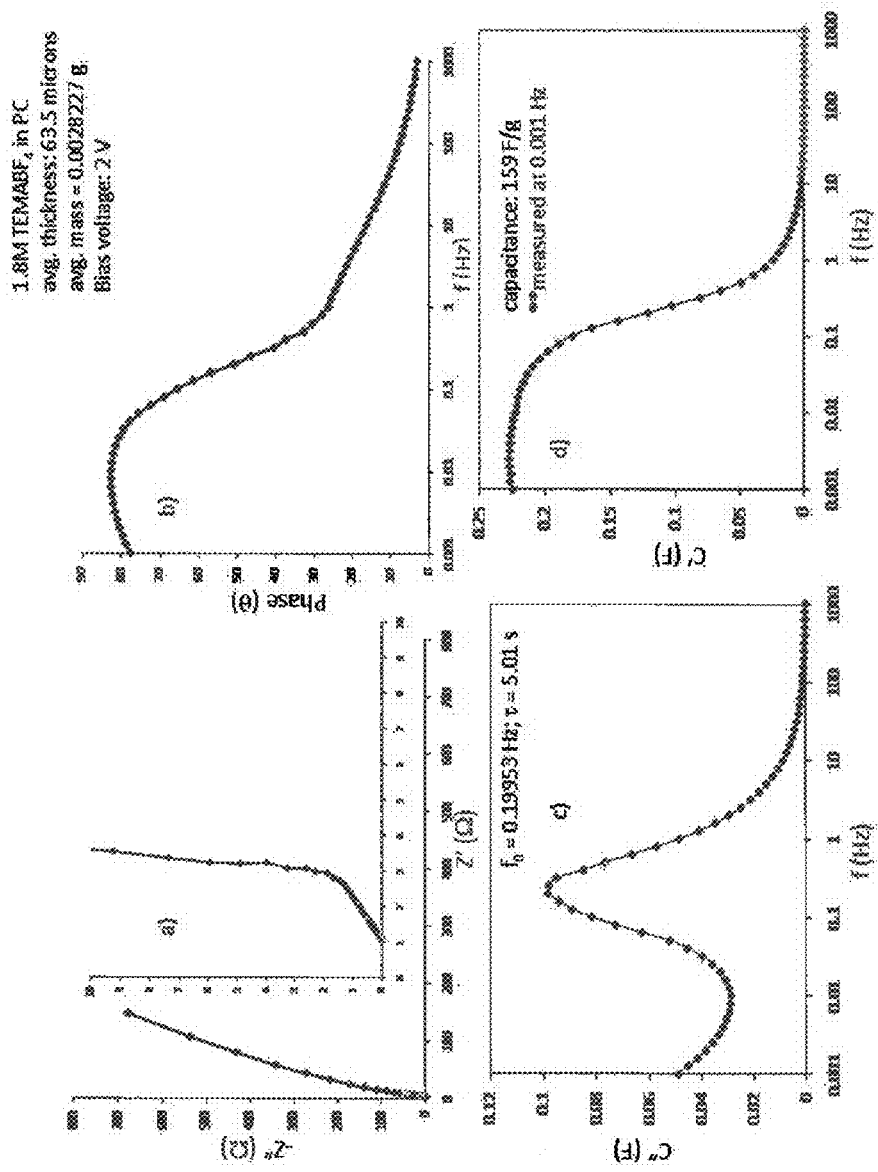

FIG. 80 shows graphs of electrochemical impedance performance of a composite electrode of spherical and non-spherical carbon particles. FIG. 80a is a Nyquist plot, FIG. 80b is a Bode plot, FIG. 80c is a graph plotting C" vs. frequency, and FIG. 80d is a graph plotting C' vs. frequency.

DETAILED DESCRIPTION

The present disclosure is not limited in its disclosure to the specific details of construction, arrangement of components, or method steps set forth herein. The compositions and methods disclosed herein are capable of being made, practiced, used, carried out and/or formed in various ways. The phraseology and terminology used herein is for the purpose of description only and should not be regarded as limiting.

Any recited range described herein is to be understood to encompass and include all values within that range, without the necessity for an explicit recitation. Use of the word "about" to describe a particular recited amount or range of amounts is meant to indicate that values near to the recited amount are included in that amount, such as, but not limited to, values that could or naturally would be accounted for due to instrument and/or human error in forming measurements, and values that do not substantially affect the properties or nature of the disclosed compositions and methods.

As used herein, the terms "carbon nanosphere," "carbon nanoparticle," and "carbon particle" refer to the product of hydrothermal dehydration of a mono-, di-, or polysaccharide, biomass, corn syrup, and/or high-fructose corn syrup.

The terms "hydrothermal dehydration" and "hydrothermal synthesis" ("HTS") are used interchangeably in this disclosure and refer to a method of preparing carbon particles.

As used herein, the phrases "as-grown" or "green" carbon particles refer to those produced by HTS before activation.

The terms "dwell time" and "soak time" are used interchangeably in this disclosure and refer to the length of time a precursor sugar solution is heated in a pressure vessel during HTS at reaction temperature or the length of time as-grown carbon particles undergo carbonization, activation, or graphitization at a certain temperature.

The terms "electrochemical double-layer capacitor," "supercapacitor," and "ultracapacitor" are used interchangeably in this disclosure.

The present disclosure provides methods of preparing carbon nanospheres, carbon nanoparticles, and carbon particles by hydrothermal synthesis. The particles may be prepared from a precursor such as monosaccharides, disaccharides, and/or polysaccharides available from a variety of sources. Moreover, the precursor may include biomass, corn syrup, and/or high-fructose corn syrup available from a variety of sources. The mean diameter of the carbon particles produced may be controlled through choice of precursor, concentration of precursor solution, reaction temperature, reaction pressure, and reaction time.

Carbon particles can be synthesized by various methods, such as, for example, a hydrothermal dehydration process, chemical vapor deposition, pressure carbonization, mixed-valence oxide-catalytic carbonization, and reduction of carbides with metal catalysts. In particular, HTS may be an environmentally benign or "green" approach to the preparation of carbon particles, as HTS may not use toxic organic solvents, initiators, or surfactants that are commonly used for the preparation of polymer micro- or nanospheres. Furthermore, filtered solutions can be reused in subsequent hydrothermal treatments. HTS can be a facile, low-cost process involving the use of inexpensive, readily-available equipment operating at low pressures (e.g., <25 atm). For example, the pressure vessel can be non-stirred and there may be no moving parts in any of the equipment used, resulting in maintenance-free operation. HTS may require low energy input (i.e., low reaction temperatures) and can be carried out using low-cost precursors such as, for example, low-value industrial biomass. HTS can provide good conversion yields (i.e., carbon in/out may be close to 90%), may allow for controllable surface functional groups which can greatly improve hydrophilicity and chemical reactivity of carbon nanospheres, and the process may be scalable for large scale production of spheres by simply using a larger pressure vessel.

The mean diameter of the spheres formed via HTS is dependent on operational conditions. For example, reducing the concentration of sugar solution, the reaction temperature, and the reaction time can reduce the mean diameter of the carbon spheres produced. Under similar operational conditions, the diameter of the carbon spheres may depend on the type of saccharide used, e.g., typically the diameter of carbon spheres of monosaccharides is less than the diameter of carbon spheres of disaccharides, which is commonly less than the diameter of carbon spheres of polysaccharides. This trend may be attributed to the greater number of decomposed species generated in polysaccharides during the hydrothermal treatment compared to di- and monosaccharides (Sevilla M, Fuertes A. Chemical and Structural Properties of Carbonaceous Products Obtained by Hydrothermal Carbonization of Saccharides. Chemistry-A European Journal. 2009; 15(16) (incorporated by reference herein)).

Carbon spheres with a mean diameter of greater than 1 µm can be produced by increasing the concentration of the sugar solution to greater than 3 M, choosing a high reaction temperature (e.g., about 200° C.), and reaction times longer than 24 hours. Carbon nanospheres with a mean diameter of less than 100 nm can be produced by lowering the concentration of the sugar solution, choosing a low reaction temperature (about 150° C.), and short reaction time (Liang et al., "Low-temperature synthesis of nano-sized disordered carbon spheres as an anode material for lithium ion batteries," *Materials Letters,* 2007, 61(19-20):4199-203 (incorporated by reference herein); Antonietti et al., "Hydrothermal carbon from biomass: a comparison of the local structure from poly- to monosaccharides and pentoses/hexoses," *Green Chemistry,* 2008; 10(11):1204-12 (incorporated by reference herein); and Wang et al., "Preparation of carbon sphere from corn starch by a simple method," *Materials Letters,* 2008 (incorporated by reference herein)). At least one disadvantage of this approach, however, is that it may result in yields of carbon nanospheres of less than 3%. In an aspect, the present disclosure provides a method of preparing small spheres (<100 nm) with higher material yield by choosing a monosaccharide, high reaction temperature (about 200° C.), low sugar concentration (<0.05 M), and longer reaction time (>50 hours).

The present disclosure further provides methods of activating carbon particles. Carbon particles may be physically activated by heating in the presence of ammonia gas, ammonium hydroxide vapor, deionized water (steam activation), nitrogen, or carbon dioxide at temperatures from about 600° C. to about 1100° C. and soak times of about zero minutes to about two hours. The carbon particles may also be chemically activated by solid-state mixing with ground-up potassium hydroxide, potassium carbonate, or a mixture thereof, or slurry-based mixtures featuring potassium hydroxide dissolved in deionized water and mixed with the activated carbon precursor, and then placing the resulting mixture in a furnace. The carbon particles may be subjected to chemical activation, physical activation, or both (sequentially or concurrently).

In certain embodiments, the activated carbon nanospheres may be used in preparing a capacitor such as, for example, an asymmetric capacitor or an electrochemical double-layer capacitor. Compositions suitable for electric double-layer capacitor are expected to require a low oxygen content, because a high oxygen content may lead to self-discharge for the device. Masashi Ishikawa, Atsushi Sakamoto, Masayuki Monta, Yoshiharu Matsuda & Koichi Ishida, *Effect of treatment of activated carbon fiber cloth electrodes with cold plasma upon performance of electric double-layer capacitors,* 60(2) Journal of Power Sources 233-38 (incorporated by reference herein). Moreover, high oxygen contents are expected to lead to undesirably reduced conductivity for the material. Perhaps for this reason, carbon particles with a high oxygen content were hitherto not developed. In an aspect, the disclosure provides carbon-particle compositions that include, by weight, about 5% to about 30% oxygen, that are suitable for various applications including the following.

Uses for Carbon Particles

Carbon particles may be used in a variety of applications, such as electrodes in symmetric and asymmetric electrochemical double layer capacitors, electrodes in lithium ion batteries, conductive additive for active materials in lithium ion batteries and other battery chemistries, lubrication, capacitive de-ionization of waste water, electrochemical remediation, water softening, and as a replacement for activated carbon. Carbon particles can also be used as catalyst supports in fuel cells and metal-air batteries. Carbon particles can be fluorinated to make $CF_x$ carbons which may be used as cathodes in primary $Li/CF_x$ batteries.

Electrochemical double layer capacitors: Electrochemical double-layer capacitors may include a symmetric carbon-carbon cell comprising high surface area activated carbon particles. These capacitors may have applications in hybrid electric vehicles, consumer electronics, and grid energy storage.

Energy storage in asymmetric capacitors: The carbon nanospheres can be used as a high-performance negative electrode in, for example, an asymmetric $MnO_2$—C capacitor. In some embodiments, the total capacitance of the asymmetric capacitor may be dictated by the carbon electrode and may improve the performance of the asymmetric capacitor, which can be used in, for example, hybrid electric vehicles, portable electronic devices, and grid energy storage.

Energy storage in lithium ion batteries: Carbon nanospheres may be used as an anode in lithium ion batteries used in, for example, electric vehicles ("EVs") or hybrid electric vehicles ("HEVs"), consumer electronics, and grid energy storage.

Conductive additive for active materials in lithium ion batteries or lead acid batteries: Carbon particles can have high electrical conductivity and may be added to activated carbon or other active materials as a conductive additive to improve the electrochemical performance of, for example, lithium ion and lead acid batteries.

Lubrication: Carbon particles can be added to increase the lubricity of, for example, motor oil, as the carbon particles can withstand the high temperatures that motor oils are subjected to. More than four billion quarts of crankcase oil are used in the United States per year. Currently-available engine oils may include the anti-wear additive zinc dialkyldithiophosphate ("ZDDP"), which contains phosphorous and sulfur. These are elements that poison catalytic converters, causing increased automotive emissions. It is expected that the EPA eventually will mandate the elimination of ZDDP, or allow only extremely low levels in engine oil. In some embodiments, the disclosed carbon particles may contain 100% carbon and no other extraneous materials.

Capacitive de-ionization of waste water: Capacitive deionization technology ("CDT") is a method of desalinating brackish water. In CDT, a brackish water stream flows between pairs of electrodes. In some embodiments, high-surface-area carbon electrodes are made from carbon particles, and held at a potential difference of 1.3 V. The ions and other charged particles (such as microorganisms) may be attracted to and held on the electrode of opposite charge. The negative electrode attracts positively charged ions (cations) such as calcium ($Ca^{+2}$), magnesium ($Mg^{+2}$) and sodium ($Na^+$), while the positively charged electrode attracts negative ions (anions) such as chloride ($Cl^-$), nitrate ($NO_3^-$), sulfate ($SO_4^{2-}$), and phosphate ($PO_4^{3-}$).

Electrochemical remediation: Carbon particles may be used in the removal of pollutants, such as, for example, pharmaceuticals and/or toxic heavy metals from a water supply.

Water softening: Carbon particles can be used in place of ion exchange resins.

Replacement for activated carbon: Carbon particles can be used for purification of gases and liquids for environmental and medical applications that use activated carbon.

Hydrothermal Synthesis ("HTS") of As-Grown ("Green") Carbon Particles

In one aspect the disclosure may provide, among other things, a hydrothermal synthesis ("HTS") method of preparing as-grown ("green") carbon nanospheres that includes placing a starting material in a pressure vessel, heating the pressure vessel, and allowing the starting material to react in the heated pressure vessel for a period of time, i.e., dwell time. Starting materials suitable for HTS preparation of carbon nanospheres may include, without limitation, monosaccharides such as glucose, glucosamine, fructose, and xylose, disaccharides such as sucrose and maltose, polysaccharides such as starch and cellulose, sugar alcohols, such as xylitol, sorbitol, and mannitol, and biomass derivatives such as hydroxymethylfurfural ("HMF") and furfural. Suitable starting materials can also include, for example, a regenerated cellulose fiber or semi-synthetic fiber (e.g., rayon fibers, viscose rayon, art silk, etc.), bamboo rods/fibers, starch found in liquid after rice has been boiled, and recyclable sources of sugar such as bourbon stillage, and starch found in packaging peanuts.

In some embodiments, suitable starting materials can include corn syrup, and/or high-fructose corn syrup: HFCS 42, HFCS 55 or HFCS 90. HFCS 55 contains approximately 55% fructose and 42% glucose; and HFCS 42 contains approximately 42% fructose and 53% glucose and HFCS-90 contains approximately 90% fructose and 10% glucose. In some embodiments, an aqueous precursor solution may be made by dissolving HFCS in deionized water. In some embodiments, the aqueous solution may have a concentration of at least about 10 vol %, at least about 20 vol %, at least about 30 vol %, at least about 40 vol %, at least about 50 vol %, at least about 60 vol %, at least about 70 vol %, at least about 80 vol %, or at least about 90 vol % deionized water. In some embodiments, additives (acidic or caustic or surfactants) may be added to the aqueous solution in order to change the morphology or increase the yield of the resulting carbon materials. In further embodiments, a combination of starting materials may be used.

In some embodiments, the starting material may be provided as an aqueous solution. In some embodiments, the aqueous solution may have a concentration of at least about 0.015 M, at least about 0.02 M, at least about 0.025 M, at least about 0.03 M, at least about 0.035 M, at least about 0.04 M, at least about 0.045 M, at least about 0.05 M, at least about 0.1 M, at least about 0.25 M, at least about 0.5 M, at least about 0.75 M, at least about 1 M, at least about 2 M, or at least about 3 M starting material. The aqueous solution may also comprise less than about 4 M, less than about 3 M, less than about 2 M, less than about 1 M, less than about 0.5 M, less than about 0.4 M, less than about 0.3 M, less than about 0.25 M, less than about 0.2 M, less than about 0.15 M, or less than about 0.1 M starting material. This includes concentrations of about 0.015 M to about 0.5 M, about 0.02 M to about 0.4 M, about 0.025 M to about 0.3 M, about 0.25 M to about 0.2 M, about 0.035 M to about 0.15 M, about 0.04 M to about 0.15 M, and about 0.045 M to about 0.1 M starting material.

In some embodiments, additives are added to the precursor solution, the additives including at least one additive selected from the group consisting of potassium hydroxide, sodium hydroxide, ammonium hydroxide, cysteine, phloroglucinol, ammonium phosphate, ammonium hydroxide, boric acid, lead nitrate, melamine, sodium lauryl sulfate, ammonium tetraborate, methane sulfonic acid, ethylene glycol, hydroquinone, catechol, resorcinol, ammonium bicarbonate, oxalic acid, citric acid, acetic acid, acrylic acid, ammonium chloride, ammonium sulfate, polyethylenimine, and urea.

Figure 1:
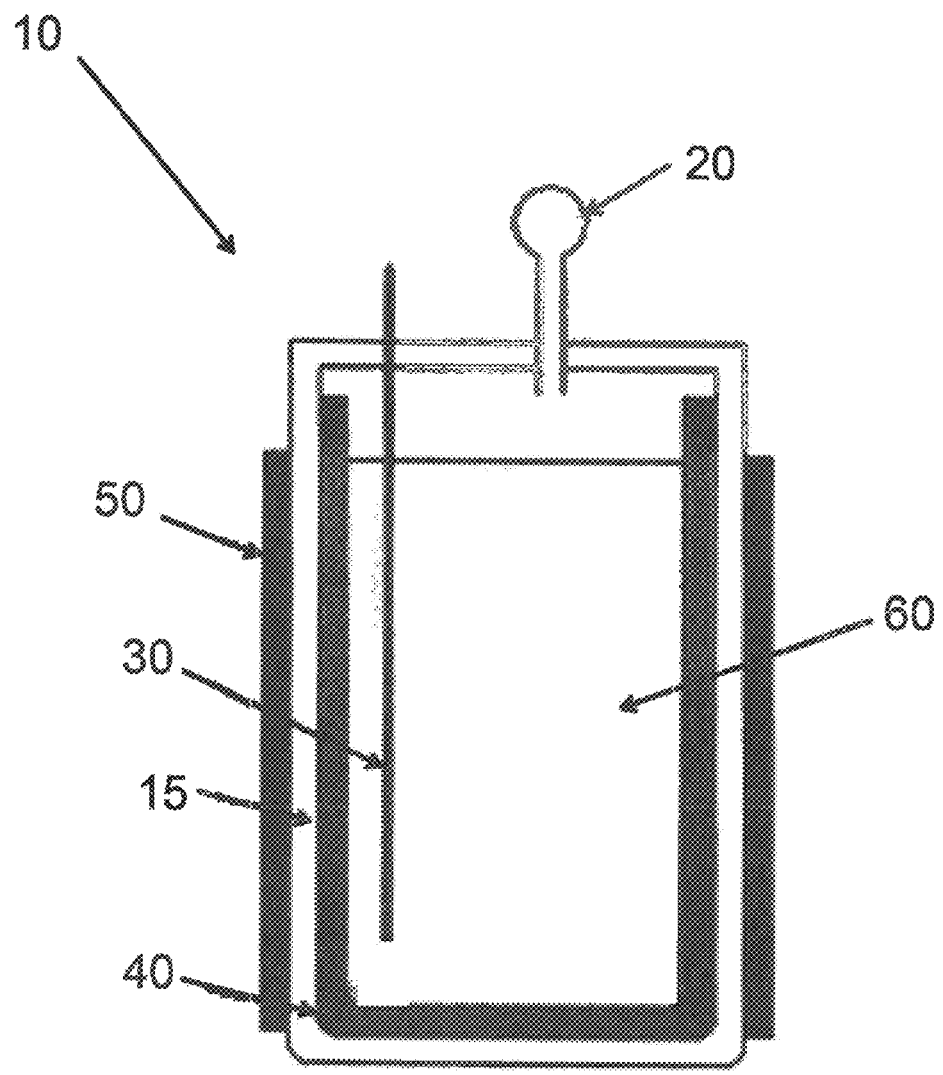
FIG. 1 shows a diagram of a pressure vessel for preparation of as-grown carbon nanospheres hydrothermally or solvothermally.

FIG. 1 shows a pressure vessel assembly 10 suitable for use in embodiments of the present disclosure. Referring to FIG. 1, the pressure vessel assembly 10 includes a pressure vessel 15, gauge 20, a thermal probe 30, a polytetrafluoroethylene ("PTFE") sleeve 40, and a heating element 50. The pressure vessel 15 contains a water-based solution or suspension 60. In some embodiments, the pressure vessel 15 may be a 4601-4622 series pressure vessel (1 L or 2 L capacity), a 4661-4666 series pressure vessel (1 or 2 gallon capacity), or a 4676-4679 series pressure vessel (2.6 or 5 gallon capacity) (Parr Instrument Company, Moline, Ill.).

In some embodiments, the pressure vessel containing the starting material may be heated to at least about 140° C., at least about 150° C., at least about 160° C., or at least about 170° C. The pressure vessel containing the starting material may be heated to less than about 230° C., less than about 225° C., less than about 220° C., or less than about 215° C. This includes heating temperature ranges of about 140° C. to about 230° C., about 150° C. to about 225° C., about 160° C. to about 220° C., and about 170° C. to about 215° C.

In some embodiments, the dwell time may be at least about 5 minutes, at least about 10 minutes, at least about 15 minutes, at least about 30 minutes, at least about 1 hour, at least about 5 hours, or at least about 15 hours. The dwell time may be less than about 150 hours, less than about 120 hours, less than about 90 hours, less than about 80 hours, less than about 70 hours, less than about 60 hours, or less than about 50 hours. This includes dwell times of about 5 minutes to about 150 hours, about 10 minutes to about 120 hours, about 15 minutes to about 90 hours, about 30 minutes to about 80 hours, about 1 hour to about 70 hours, about 5 hours to about 60 hours, and about 15 hours to about 50 hours.

In some embodiments, the maximum pressure in the pressure vessel may be less than about 350 psi, less than about 325 psi, less than about 300 psi, less than about 275 psi, or less than about 250 psi. In some embodiments, the minimum pressure in the pressure vessel may be at least about 70 psi, at least about 80 psi, at least about 90 psi, at least about 100 psi, or at least about 110 psi. This includes pressure ranges from about 70 psi to about 350 psi, about 80 psi to about 325 psi, about 90 psi to about 300 psi, about 100 psi to about 275 psi, and about 110 psi to about 250 psi.

After the dwell time, the pressure vessel may be allowed to cool to room temperature and the contents may be emptied from the pressure vessel and filtered and the residue containing the carbon particles may be dried. In some embodiments, the filtrate may be recycled and added to the starting material in subsequent HTS reactions. In some embodiments, carbon particles remaining in the filtrate may act as nucleation sites for producing new carbon particles. In some embodiments, the residue may be dried in a vacuum oven kept at about 100° C. In some embodiments, the residue may be dried for about 1 hour to about 24 hours.

The % yield can be determined by taking the weight of the material output from the HTS (e.g., the dried carbon spheres) and dividing it by the weight of material input (e.g., the precursor sugar) into the HTS vessel and multiplying the result by 100. The % carbon yield for the HTS can be determined by taking the weight of the carbon in the dried carbon particles and dividing it by the weight of the carbon in the precursor and multiplying it by 100. The % yield of carbon particles produced by HTS according to the present disclosure may be at least about 3%, at least about 4%, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90%.

Figure 2:
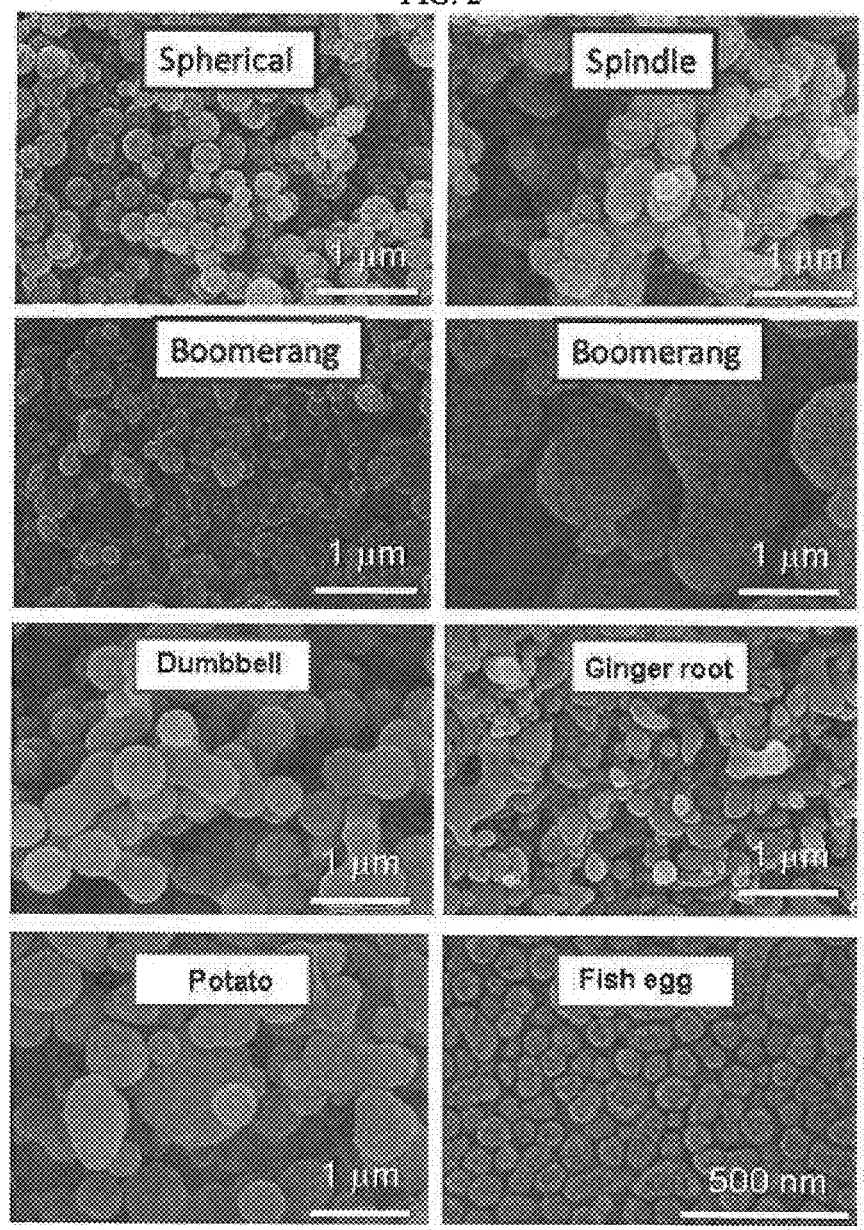
FIG. 2 shows SEM images of carbon nanoparticles of different shapes: spherical, spindles, and boomerangs, dumbbell, ginger root-shaped, potato-shaped, and fish egg-shaped.

As shown in the SEM images of FIG. 2, HTS may produce carbon nanoparticles in various shapes. Carbon nanoparticle shapes may include, for example, spherical, spindle, dumbbell, potato, ginger root, fish egg, boomerang, or a combination thereof. In some embodiments, a carbon nanosphere spindle may have an aspect ratio of about 1:1 to about 5:1. In some embodiments, the carbon nanospheres may be solid, hollow, or a combination thereof. The shape of the nanoparticle may be influenced by many factors such as, for example precursor type (e.g., choice of saccharide). In some embodiments, stirring the pressure vessel during HTS may result in asymmetric (e.g., non-spherical) shaped nanoparticles. In some embodiments, the use of a particular saccharide, such as, for example, glucose or sucrose, and dwell times greater than about 1 hour may result in asymmetric-shaped nanoparticles. In some embodiments, the use of a particular saccharide, such as, for example, sucrose and a reaction temperature greater than about 200° C. may result in asymmetric shaped nanoparticles. In some embodiments, the sudden release of pressure when the pressure vessel is at reaction temperature may affect the shape of the nanoparticles and may result in the formation of asymmetric-shaped nanoparticles.

Carbon nanospheres prepared according to methods of the present disclosure may have an average diameter of from about 10 nm to about 200 μm. In some embodiments, the carbon nanospheres may have average diameters of at least about 10 nm, at least about 20 nm, at least about 30 nm, at least about 40 nm, at least about 50 nm, at least about 60 nm, at least about 70 nm, at least about 80 nm, at least about 90 nm, at least about 100 nm, at least about 125 nm, at least about 150 nm, at least about 175 nm, at least about 200 nm, at least about 250 nm, at least about 300 nm, at least about 350 nm, or at least about 400 nm. In some embodiments, the carbon nanospheres may have average diameters of less than about 200 μm, less than about 100 μm, less than about 50 μm, less than about 20 μm, less than about 10 μm, less than about 5 μm, less than about 1 μm, less than about 900 nm, less than about 800 nm, less than about 700 nm, less than about 600 nm, and less than about 500 nm. In some embodiments, the carbon nanospheres may have diameters in the range of about 10 nm to about 600 nm, about 15 nm to about 300 nm, about 20 nm to about 150 nm, about 25 nm to about 100 nm, or about 30 nm to about 70 nm. In some embodiments, the carbon nanospheres may be monodisperse, having an average diameter of about 10 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, about 220 nm, about 240 nm, about 260 nm, about 280 nm, about 300 nm, about 350 nm, about 400 nm, or about 500 nm. In some embodiments, the carbon nanospheres may have diameters in the range of about 40 nm to about 100 nm, about 100 nm to about 200 nm, about 200 nm to about 300 nm, about 300 nm to about 400 nm, about 400 nm to about 500 nm, about 500 nm to about 600 nm, about 600 nm to about 700 nm, about 700 nm to about 800 nm, about 800 nm to about 900 nm, about 900 nm to about 1,000 nm, about 1,000 nm to about 1,100 nm, about 1,100 nm to about 1,200 nm, about 1,200 nm to about 1,300 nm, or about 5 μm to about 10 μM.

$N_2$ BET analysis may be used to measure the surface area and pore size distribution of as-grown and activated carbon spheres. In some embodiments, surface areas for as-grown carbon nanospheres determined by BET analysis may be at least about 2 $m^2/g$, at least about 4 $m^2/g$, or at least about 6 $m^2/g$. In some embodiments, surface areas for as-grown carbon nanospheres determined by BET analysis may be less than about 40 $m^2/g$, less than about 30 $m^2/g$, or less than about 20 $m^2/g$. In some embodiments, surface areas for as-grown carbon nanospheres determined by BET analysis may be from about 2 $m^2/g$ to about 40 $m^2/g$, about 4 $m^2/g$ to about 30 $m^2/g$, or about 6 $m^2/g$ to about 20 $m^2/g$.

In some embodiments, the as-grown or carbonized particles can be doped with dopant atoms selected from the group consisting of oxygen, nitrogen, phosphorus, boron, sulfur, and selenium. The doping may improve the lithium intercalation capacity of an electrode fabricated of the carbon particles, as will be explained further below.

Activation of Carbon Particles

Figure 3:
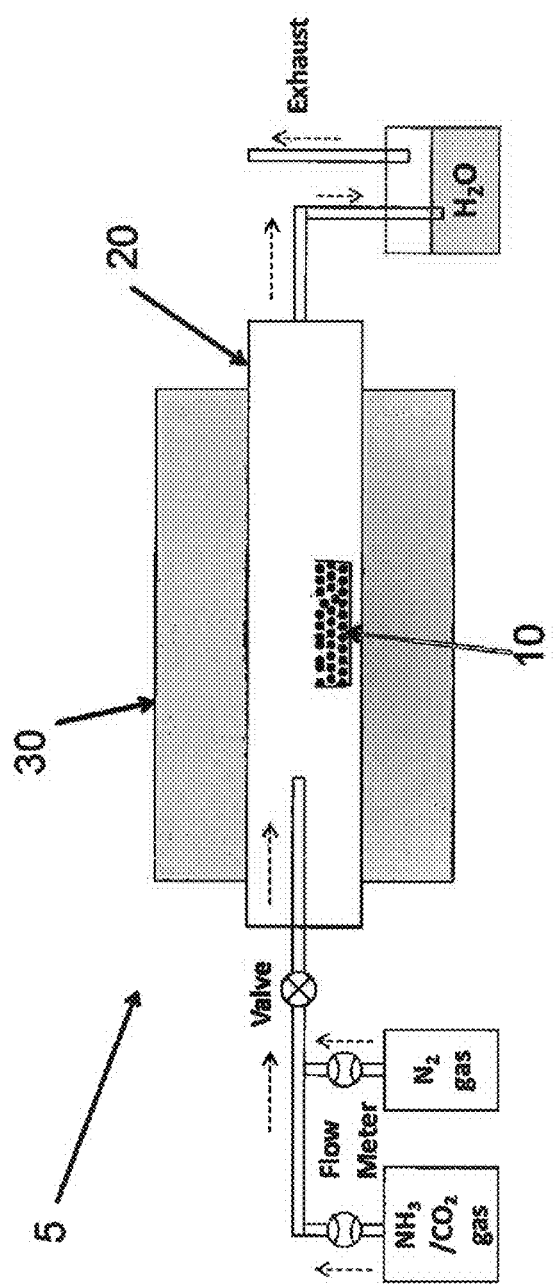
FIG. 3 shows an experimental set-up for activation of hydrothermally-grown carbon particles with ammonia or $CO_2$.

In another aspect, carbon particles may be subjected to chemical activation, physical activation, or both (sequentially or concurrently). Carbon particles may be chemically activated by solid-state mixing with ground-up potassium hydroxide, potassium carbonate, or a mixture thereof, or slurry-based mixtures consisting of potassium hydroxide dissolved in deionized water, and mixed with the activated carbon precursor, and then placing the resulting mixture in a furnace. The carbon particles may also be physically activated using a device 5 as shown in FIG. 3. Referring to FIG. 3, carbon particles 10 may be placed in a tube 20 surrounded by a heating source 30. In some embodiments, the tube 20 may be a ceramic tube 20 or a quartz tube 20. The heating source 30 may be, for example, a furnace. The furnace may be, for example, a THERMOLYNE® 79300 tube furnace or a THERMOLYNE® 21100 tube furnace (Thermo Fischer Scientific, Inc., Waltham, Mass.). The carbon particles 10 in the tube 20 may be subject to heat treatment under a flow of a gas. In some embodiments, the gas may comprise ammonia, carbon dioxide, nitrogen, or a combination thereof. In some embodiments, the flow rate of the gas may be at least about 200 cc/min, at least about 300 cc/min, at least about 400 cc/min, at least about 500 cc/min, at least about 600 cc/min, at least about 700 cc/min, at least about 800 cc/min, at least about 900 cc/min, or at least about 1,000 cc/min.

In some embodiments, the temperature inside the tube 20 may be increased at a rate of about 5° C./min, about 10° C./min, about 15° C./min, or about 20° C./min until the activation temperature is reached. In some embodiments, the activation temperature may be at least about 600° C., at least about 700° C., at least about 750° C., or at least about 800° C. In some embodiments, the activation temperature may be less than about 1,100° C., less than about 1,000° C., less than about 950° C., or less than about 900° C. In some embodiments, the activation temperature may be from about 600° C. to about 1,100° C., about 700° C. to about 1,000° C., about 750° C. to about 900° C., or from about 800° C. to about 900° C.

In some embodiments, the soak time may be about 0 minutes, at least about 5 minutes, at least about 10 minutes, at least about 15 minutes, at least about 30 minutes, at least about 45 minutes, at least about 60 minutes, or at least about 75 minutes. In some embodiments, the soak time may be less than about 90 minutes, less than about 80 minutes, less than about 70 minutes, less than about 60 minutes, less than about 50 minutes, less than about 40 minutes, less than about 30 minutes, less than about 20 minutes, less than about 15 minutes, less than about 10 minutes, or less than about 5 minutes. In some embodiments, the soak time may be about 0 minutes to about 90 minutes, about 5 minutes to about 80 minutes, or about 10 minutes to about 70 minutes.

The % yield for the activated carbon nanospheres can be determined by comparing the weight of the as-grown carbon nanospheres to that of the activated carbon nanospheres. The % yield of activated carbon nanospheres produced according to the methods of the present disclosure may be at least about 3%, at least about 4%, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, or at least about 90%.

Figure 4:
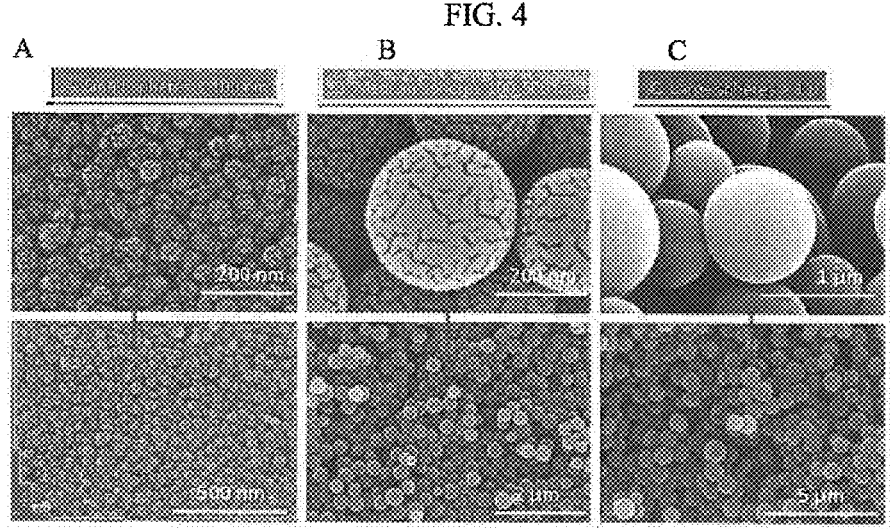
FIG. 4 shows SEM images of hydrothermally-grown carbon spheres activated using ammonia taken at high and low magnifications: A) small (<100 nm), B) medium (100-500 nm), and C) large spheres (>1 μm).

FIG. 4 shows SEM images of hydrothermally-grown carbon spheres activated using ammonia taken at high and low magnifications: A) small (<100 nm), B) medium (100-500 nm), and C) large spheres (>1 μm). A number of fissures and grooves were observed as a result of activation. The surface area of the activated carbon nanospheres, as measured by BET, may be at least about 20 $m^2/g$, at least about 30 $m^2/g$, at least about 40 $m^2/g$, at least about 50 $m^2/g$, at least about 60 $m^2/g$, at least about 70 $m^2/g$, at least about 80 $m^2/g$, at least about 90 $m^2/g$, at least about 100 $m^2/g$, at least about 200 $m^2/g$, at least about 300 $m^2/g$, at least about 400 $m^2/g$, at least about 500 $m^2/g$, at least about 600 $m^2/g$, at least about 700 $m^2/g$, at least about 800 $m^2/g$, at least about 900 $m^2/g$, at least about 1,100 $m^2/g$, at least about 1,200 $m^2/g$, at least about 1,300 $m^2/g$, at least about 1,400 $m^2/g$, at least about 1,500 $m^2/g$, at least about 1,600 $m^2/g$, at least about 1,700 $m^2/g$, at least about 1,800 $m^2/g$, at least about 1,900 $m^2/g$, or at least about 2000 $m^2/g$.

Activated carbon particles prepared according to methods of the present disclosure may have total pore volumes of about 0.01 $cm^3/g$ to about 1.6 $cm^3/g$, about 0.05 $cm^3/g$ to about 0.9 $cm^3/g$, or about 0.1 $cm^3/g$ to about 0.8 $cm^3/g$. In some embodiments, the total pore volume may be at least about 0.01 $cm^3/g$, at least about 0.05 $cm^3/g$, or at least about 0.1 $cm^3/g$. In some embodiments, the total pore volume may be less than about 1 $cm^3/g$, less than about 0.9 $cm^3/g$, or less than about 0.8 $cm^3/g$.

Activated carbon nanospheres prepared according to methods of the present disclosure may have capacitive performance of about 35 F/cc to about 90 F/cc and about 60 F/g to about 130 F/g in 1.8M $Et_3MeNBF_4$ (TEMABF$_4$ in PC) at 1.5V. Activated carbon nanospheres prepared according to methods of the present disclosure may have capacitive performance of about 90 F/cc to about 200 F/cc and about 170 F/g to about 210 F/g in 38 wt % $H_2SO_4$ at 0.5V.

Activated carbon nanospheres prepared according to methods of the present disclosure may have packing densities of about 0.4 $g/cm^3$ to about 1.6 $g/cm^3$. In some embodiments, activated carbon nanospheres prepared according to methods of the present disclosure may have packing densities of about 1 $g/cm^3$.

In some embodiments, activated carbon nanospheres may have $Li^+$ intercalation capacities of about 100 mAh/g to about 300 mAh/g, about 125 mAh/g to about 275 mAh/g, or about 150 mAh/g to about 250 mAh/g. In some embodiments, activated carbon nanospheres may have $Li^+$ intercalation capacities of at least about 100 mAh/g, at least about 125 mAh/g, or at least about 150 mAh/g. In some embodiments, the $Li^+$ intercalation capacity may be less than about 300 mAh/g, less than about 275 mAh/g, or less than about 250 mAh/g.

Activated carbon nanospheres prepared according to methods of the present disclosure may have anion intercalation capacities of about 10 mAh/g to about 60 mAh/g, about 15 mAh/g to about 55 mAh/g, or about 20 mAh/g to about 50 mAh/g. In some embodiments, the anion intercalation capacity may be at least about 10 mAh/g, at least about 15 mAh/g, or at least about 20 mAh/g. In some embodiments, the anion intercalation capacity may be less than about 60 mAh/g, less than about 55 mAh/g, or less than about 50 mAh/g.

Electrochemical Double-Layer Capacitor Cell Construction

Figure 5:
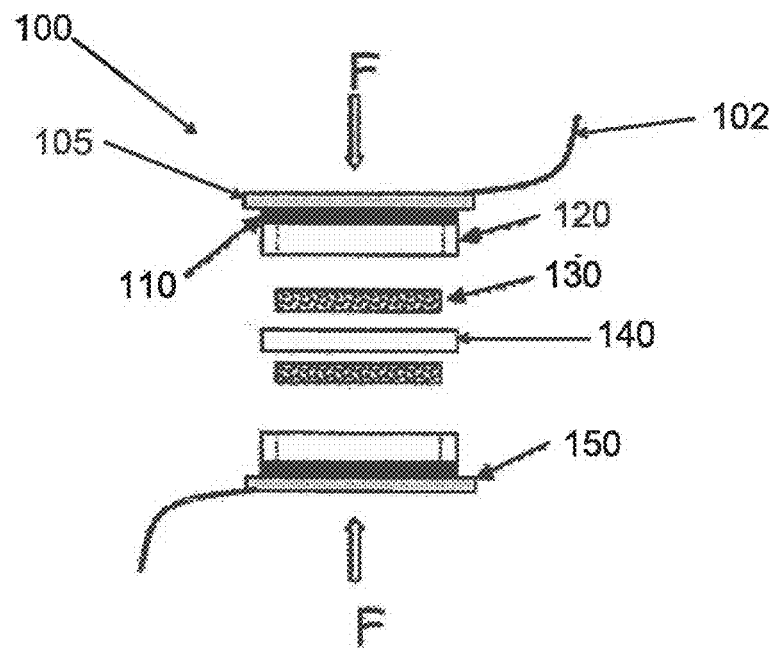
FIG. 5 shows an electrochemical cell set-up used for testing the performance of activated carbon nanospheres as an electrochemical double-layer capacitor.

In another aspect, an electrochemical cell 100 comprising activated carbon nanospheres, as shown in FIG. 5, may be assembled. Referring to FIG. 5, a wire lead 102 is attached to a plate 105, and the plate 105 is attached to a carbon current collector 110. In some embodiments, the carbon current collector 110 may be about 24 mm thick. The carbon current collector 110 may be in contact with a MYLAR® film 120. In some embodiments, the MYLAR® film 120 may be about 68 µm thick. The MYLAR® film 120 may be in contact with a layer of carbon/3% PTFE 130. In some embodiments, the layer of carbon/3% PTFE 130 may be about 12 mm in diameter and about 50 µm thick. The layer of carbon/3% PTFE 130 may be in contact with a porous separator 140. The porous separator 140 may be in contact with an end plate 150. The end plate 150 can be, for example, a stainless steel plate or a brass plate. In some embodiments, the electrode may be prepared by mixing activated carbon nanospheres with 3% PTFE, heating the mixture in an oven kept at about 120° C., pressing the mixture using a mortar and pestle into a dough, rolling the dough into a thin sheet, and then making circular discs using a 12 mm diameter punch.

Non-Aqueous Asymmetric Capacitor

In another aspect, the disclosure relates to a non-aqueous asymmetric capacitor that includes a negative electrode made from lithium titanate nanosphere, a positive electrode made from activated carbon particles, a porous separator, and a non-aqueous battery electrolyte. Suitable non-aqueous battery electrolytes may include lithium salts, for example, 1M $LiPF_6$ EC:DMC 1:1, 1M $LiClO_4$ EC:DMC 1:1, and 1M $LiBF_4$ EC:DMC 1:2.

In some embodiments, at least one of the electrodes may include about 3% to about 10% of a binder. In some embodiments, the binder may include, for example, carboxymethyl cellulose binder, polyvinyl alcohol binder, polyvinylidene fluoride binder, or PTFE binder. In some embodiments, the electrode material may further include about 5% carbon black conductive additive, and a solvent. In some embodiments, the solvent may include, for example, water or N-methylpyrrolidone. In some embodiments, the active material may be painted onto a current collector. Suitable current collectors can include, for example, copper, aluminum, titanium, nickel, or carbon coated polymer.

Electrochemical Cell

In another aspect, the disclosure relates to an electrochemical cell that includes an electrode including carbon particles and a binder, an opposing electrode, and an electrolyte including a lithium salt. In some embodiments, the opposing electrode includes a metal element selected from the group consisting of Group 1 elements and Group 2 elements of the periodic table.

EXAMPLES

Illustrative embodiments of the compositions and methods are described in greater detail below.

Example 1

Preparation of Carbon Nanospheres with Tunable Diameter

Large-scale production of carbon nanospheres with diameter of <200 nm with high material yield was achieved by choosing a monosaccharide such as xylose (monosaccharide are known to produce smaller spheres compared to di- or polysaccharides), xylose concentration of less than 0.05 M, reaction temperature of 200° C., and dwell times of over 50 hours.

Xylose ($C_5H_{10}O_5$), or wood sugar, is an aldopentose—a monosaccharide containing five carbon atoms and including an aldehyde functional group. Xylose is found in the embryos of most edible plants. Xylose has a molecular weight of 150.13 g/mol and a melting point between 144-145° C. Commercially-available xylose was used as the starting material to produce carbon spheres without further purification.

The hydrothermal process has good conversion yields (C in/out is close to 90%), which were calculated as follows: C Yield %=weight of carbon in green spheres*100/weight of carbon in precursor. Weight of carbon in green spheres is determined based on dry weight of green spheres multiplied by carbon % in green spheres calculated using chemical analysis (see Table 9). The weight of carbon in the precursor is determined by the weight of precursor multiplied by the calculated carbon % in precursor. The carbon spheres have controllable surface functional groups which can greatly improve hydrophilicity and chemical reactivity.

Experimental Procedure

Xylose was dissolved in deionized water to prepare xylose solutions of the following concentrations: 0.025 M, 0.075 M, 0.1 M, 0.5 M, 1.5 M, and 3 M. For each trial, xylose solution (800 mL) was placed inside a 1 L unstirred pressure vessel, as shown in FIG. 1. The pressure vessel was heated to reaction temperature and the solution was allowed to dwell for a period of time that varied from about five to about seventy hours. The reaction temperatures tested were: 150° C., 170° C., 180° C., 190° C., and 200° C. The pressure vessel reached a maximum of about 250 psi at 200° C. After the dwell time, the reactor was allowed to cool to room temperature. The contents were emptied from the vessel and filtered. The solid residue containing the spheres was dried in an oven kept at 100° C. The dried residue was weighed. Results of trials at different xylose solution concentrations, pressure vessel temperatures, and dwell times are summarized in Table 1. BET surface area measurements on the as-grown carbon nanospheres in the diameter range of about 200 nm to about 300 nm provided a value of about 5 $m^2/g$ to about 30 $m^2/g$.

TABLE 1

Experimental Conditions and Effect of Temperature, Xylose Concentration, and Dwell Time on Carbon Nanosphere Yield and Carbon Nanosphere Diameter

| Trial Number | Temp. °C. | Time Hours | Conc. mol/L | Yield xylose % | Yield carbon C % | Average Sphere Diameter nm |
|---|---|---|---|---|---|---|
| Effect of Temperature (Bomb) | | | | | | |
| 1 | 150 | 50 | 0.05 | 1.6 | 2.8 | 253 |
| 2 | 170 | 50 | 0.05 | 14.3 | 25.0 | 262 |
| 3 | 180 | 50 | 0.05 | 16.5 | 28.8 | 257 |
| 4 | 190 | 50 | 0.05 | 18.8 | 33.0 | 240 |
| 5 | 200 | 50 | 0.05 | 25.3 | 44.7 | 258 |
| Effect of Concentration (2 L Parr reactor) | | | | | | |
| 6 | 200 | 30 | 0.025 | 17.4 | 30.0 | 40 |
| 7 | 200 | 30 | 0.075 | 32.1 | 56.2 | 82 |
| 8 | 200 | 30 | 0.5 | 36.6 | 64.1 | 350 |
| 9 | 200 | 30 | 1.5 | 48.5 | 84.8 | 735 |
| 10 | 200 | 30 | 3.0 | 51.4 | 89.9 | 1235 |
| Effect of Dwell Time (Bomb) | | | | | | |
| 11 | 200 | 5 | 0.05 | 4.9 | 8.5 | 55 |
| 12 | 200 | 25 | 0.05 | 13.8 | 24.1 | 230 |
| 13 | 200 | 50 | 0.05 | 25.5 | 44.7 | 258 |
| 14 | 200 | 70 | 0.05 | 27.4 | 48.0 | 340 |

Effect of Temperature on Diameter and Yield of Carbon Nanospheres

Figure 6:
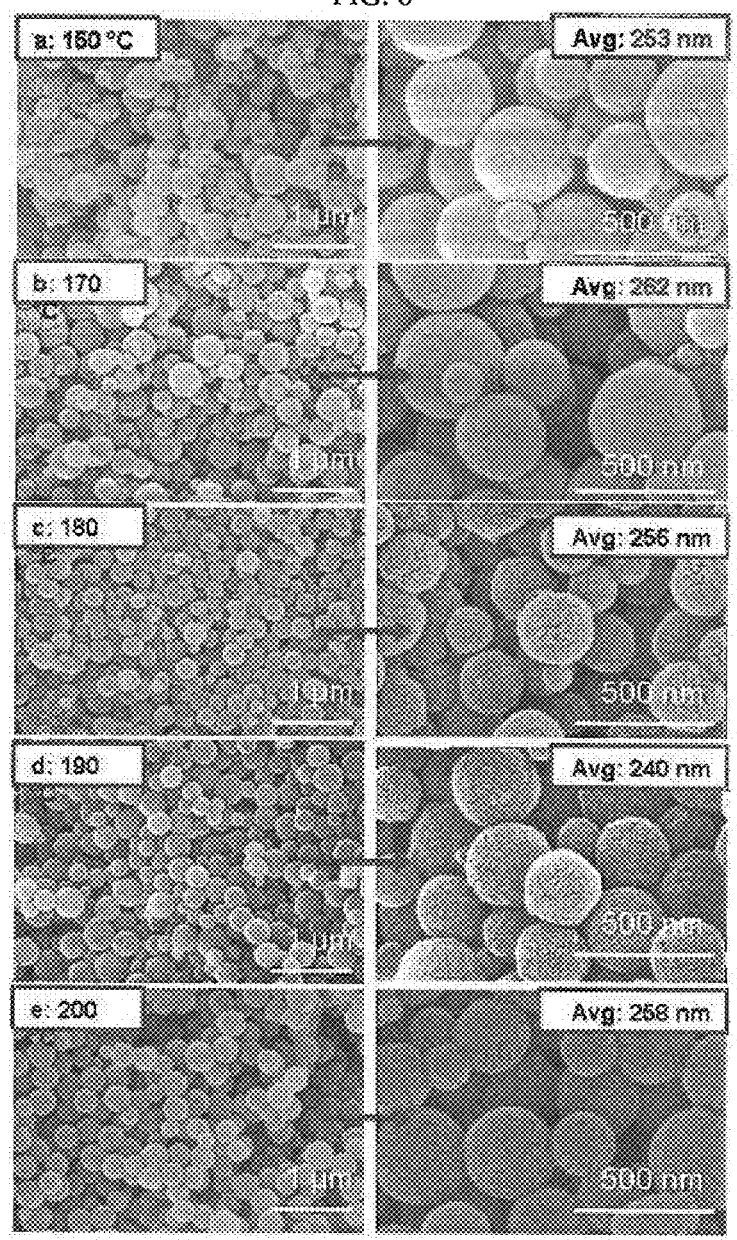
FIG. 6 shows SEM images (30 k magnification (left) and 100 k magnification (right)) of xylose-derived carbon nanospheres synthesized at different temperatures: (A) 150° C., (B) 170° C., (C) 180° C., (D) 190° C., and (E) 200° C. Initial xylose concentration=0.05 mol/L, and dwell time=50 hours were kept constant.

The sphere diameter was substantially unaffected by the increase in the temperature at long dwell times but the material yield increased significantly as the temperature was increased from 150° C. to 200° C. FIG. 6 shows the SEM images of xylose-derived carbon nanospheres synthesized at different temperatures: (A) 150° C., (B) 170° C., (C) 180° C., (D) 190° C., and (E) 200° C. (Table 1, Trial Numbers 1-5). The concentration of xylose used in the reactor was 0.05 M and the reactor dwell time at reaction temperature was 50 hours. The lower magnification SEM images reveal that the spheres were uniform with a narrow diameter distribution and no sign of fused/agglomerated spheres was found. The higher magnification images show evidence of fissures/cracks on the surface of the spheres. The SEM images show that at a long dwell time (i.e., 50 hours), the reaction temperature had minimal effect on the average diameter of the spheres. The average diameter of the spheres was measured from the scanning electron microscopy images taken at different locations of the sample.

Figure 7:
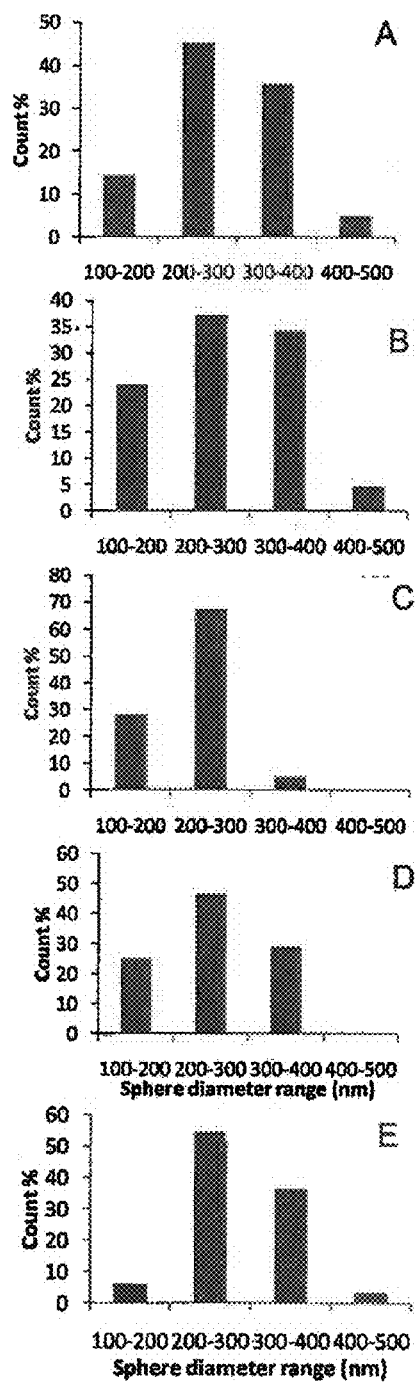
FIG. 7 shows histograms of diameter distribution of xylose-derived carbon nanospheres synthesized at different temperatures: (A) 150° C., (B) 170° C., (C) 180° C., (D) 190° C., and (E) 200° C. Initial xylose concentration of 0.05 mol/L, and dwell time of 50 hours were kept constant.

Referring to FIG. 7, histograms of the diameter distributions for carbon nanospheres synthesized at different temperatures ((A) 150° C., (B) 170° C., (C) 180° C., (D) 190° C., and (E) 200° C.; Table 1, Trial Numbers 1-5) show that the majority of the spheres had a diameter distribution of 200-300 nm.

Figure 8:
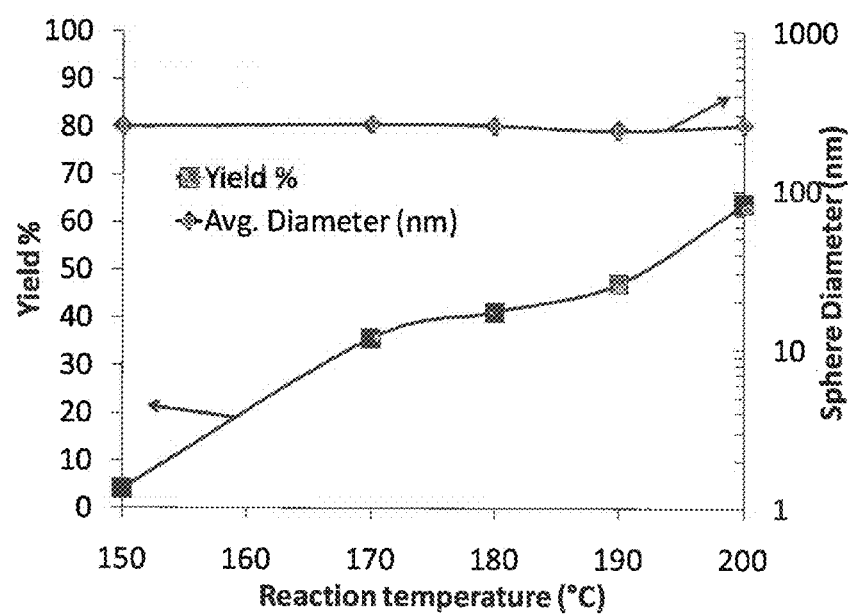
FIG. 8 is a graph showing the effect of temperature on the yield (carbon wt %) and diameter of the carbon particles. Initial xylose concentration of 0.05 mol/L, and dwell time of 50 hours were kept constant.

FIG. 8 shows the change in the diameter and the yield (carbon wt %) with respect to change in the reaction temperature. The average sphere diameter was about 250 nm as the temperature was increased from 150° C. to 200° C. but the yield increased from 4% at 150° C. to almost 64% at 200° C.

Figure 9:
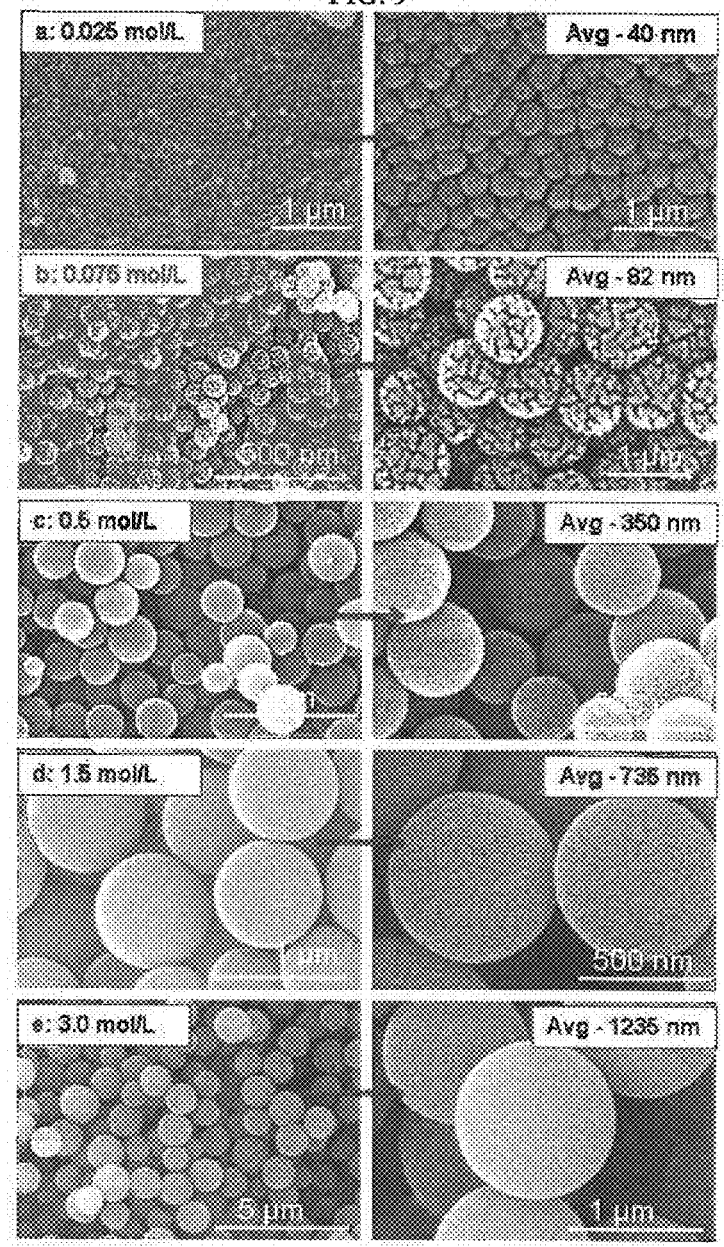
FIG. 9 shows SEM images (30 k magnification (left) and 100 k magnification (right)) of xylose-derived carbon nanospheres synthesized at different xylose solution concentrations: (A) 0.025 M, (B) 0.075 M, (C) 0.5 M, (D) 1.5 M and (E) 3 M. Reaction temperature of 200° C., and dwell time of 30 hours were kept constant.

Effect of Xylose Solution Concentration on Diameter and Yield of Carbon Nanospheres At a constant reaction temperature and dwell time, the sphere diameter and the yield increased as the initial concentration of xylose was increased, as summarized in Table 1. FIG. 9 shows the SEM images of carbon nanospheres synthesized at different xylose solution concentrations: (A) 0.025 M, (B) 0.075 M, (C) 0.5 M, (D) 1.5 M, and (E) 3 M. (Table 1, Trial Numbers 6-10). The reaction temperature (200° C.) and the dwell time (50 hours) were kept constant. The SEM images show that at a constant temperature and dwell time, the sphere diameter increased from 40 nm to 1235 nm as the concentration of xylose was increased from 0.025 M to 3 M. Beyond 3 M, the solubility of xylose in deionized water decreased and further data were unavailable. The carbon yield % also increased from 30% to 90% as the concentration of xylose was increased from 0.025 M to 3 M.

Figure 10:
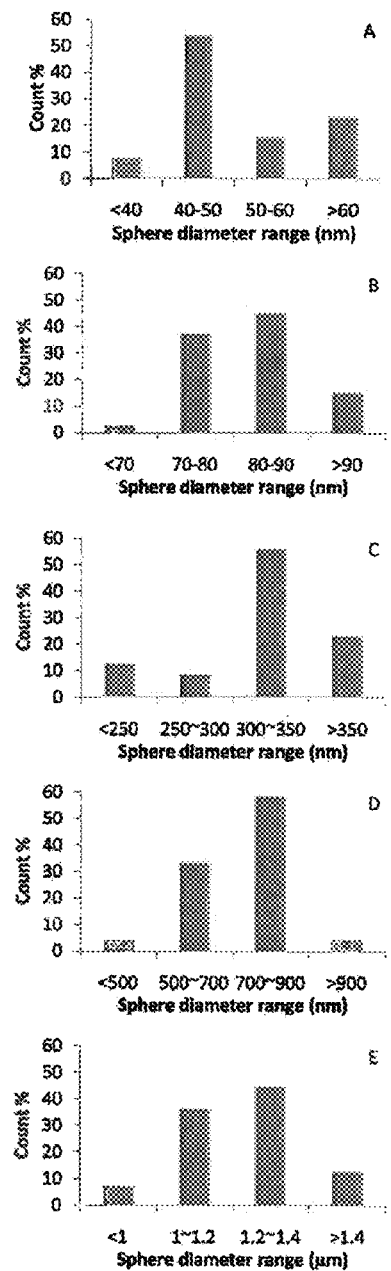
FIG. 10 shows histograms of diameter distribution of xylose-derived carbon nanospheres synthesized at different xylose solution concentrations: (A) 0.025 M, (B) 0.075 M, (C) 0.5 M, (D) 1.5 M and (E) 3 M. Reaction temperature of 200° C., and dwell time of 50 hours were kept constant.

Referring to FIG. 10, histograms of the diameter distributions for carbon nanospheres synthesized at different xylose solution concentrations ((A) 0.025 M, (B) 0.075 M, (C) 0.5 M, (D) 1.5 M, and (E) 3 M.; Table 1, Trial Numbers 6-10) show that the spheres synthesized with 0.025 M xylose had a diameter range of 40-50 nm. The spheres were not fully developed at this stage and spherical morphology was not well defined. The spheres consisted of aggregates of smaller colloidal spheres that were not fused. The spheres synthesized with 0.075 M xylose had well defined spherical morphology and the colloidal structures appeared to have fused to form solid carbon nanospheres.

Figure 11:
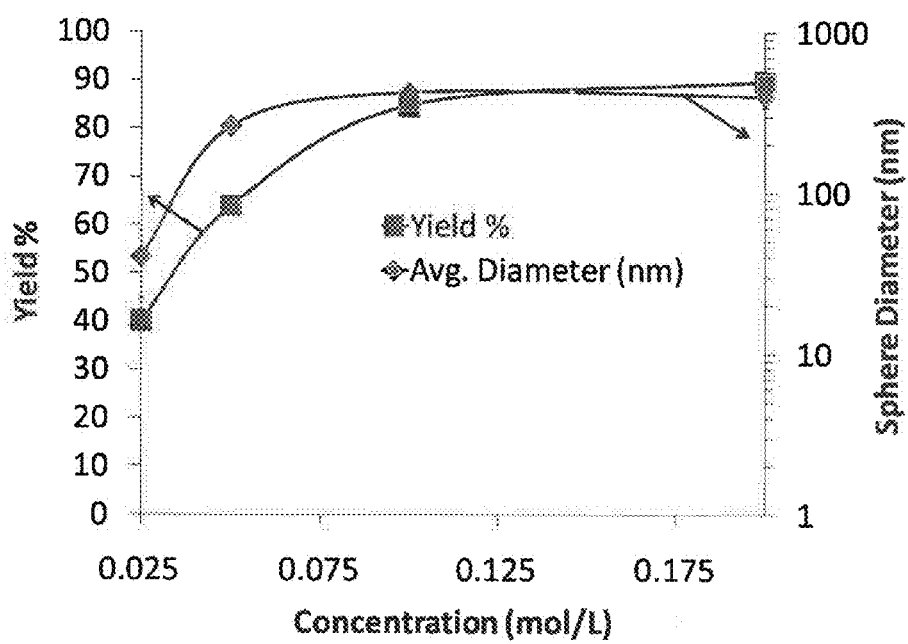
FIG. 11 is a graph showing the effect of xylose solution concentration on carbon nanosphere yield (carbon wt %) and diameter. Reaction temperature of 200° C., and dwell time of 50 hours were kept constant.

FIG. 11 shows that as the initial concentration of xylose was increased, the average sphere diameter and the yield increased simultaneously. The average sphere diameter increased from 40 nm at 0.025 M xylose to almost 1,235 nm at 3 M xylose. The carbon yield increased from 30% to almost 90% as the concentration was increased from 0.025 M xylose to 3 M xylose, respectively.

Effect of Dwell Time on Diameter and Yield of Carbon Nanospheres

Figure 12:
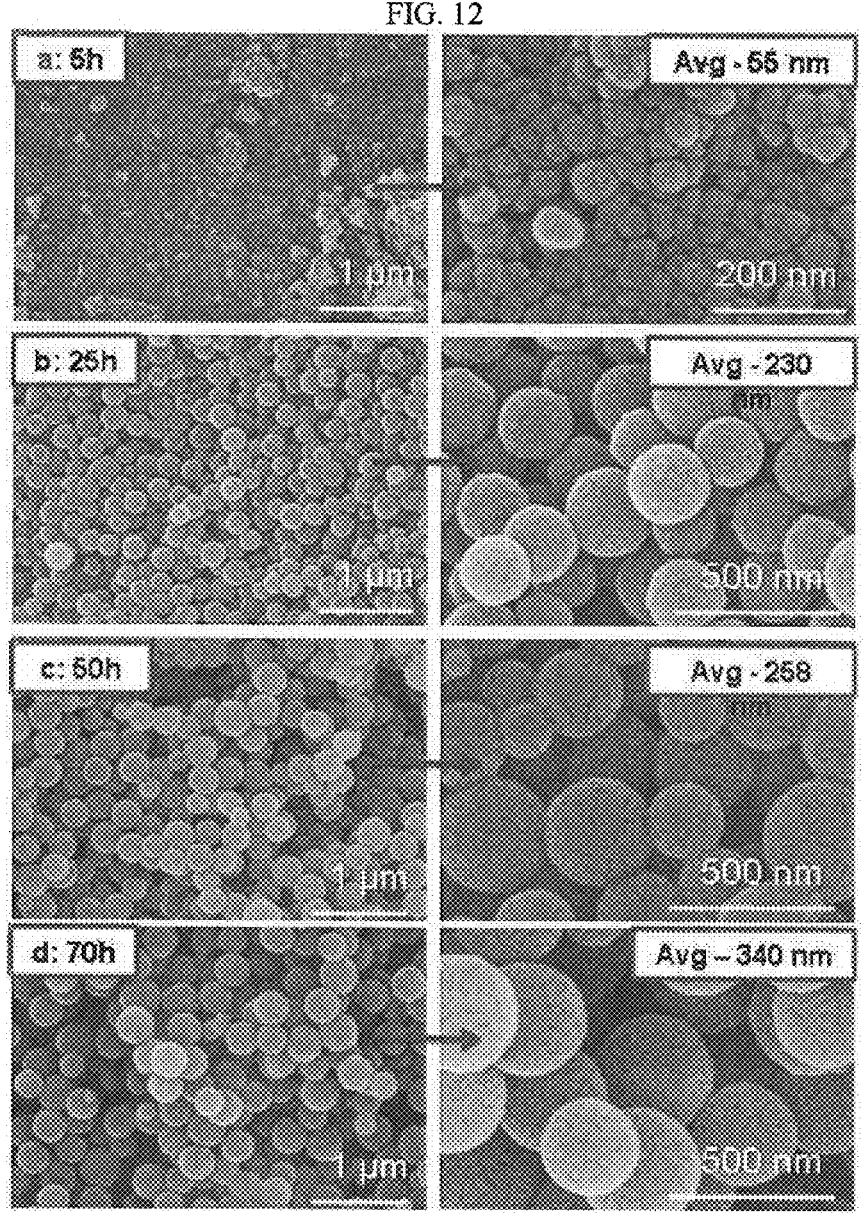
FIG. 12 shows SEM images (30 k magnification (left) and 100 k magnification (right)) of xylose-derived carbon nanospheres synthesized at different dwell times: (A) 5 hours, (B) 25 hours, (C) 50 hours, and (D) 70 hours. Reaction temperature of 200° C. and xylose concentration of 0.05 mol/L were kept constant.

Longer dwell times led to an increase in the material yield without significant increase in the sphere diameter, as summarized in Table 1. FIG. 12 shows the SEM images of xylose-derived carbon nanospheres synthesized at different dwell times: (A) 5 hours, (B) 25 hours, (C) 50 hours, and (C) 70 hours (Table 1, Trial Numbers 11-14). Other experimental parameters such as the reaction temperature (200° C.) and xylose concentration (0.05 M) were kept constant. The SEM images at shorter dwell times showed particles with a diameter range of 50-60 nm which consisted of agglomerated colloidal spheres. The spherical morphology of the carbon nanospheres was not well defined at this stage of the growth. The spherical nature of the carbon spheres was well defined at a dwell time of 25 hours. The sphere diameter increased rapidly as the dwell time was increased from 5 hours to 25 hours and eventually slowed down to 2 nm/hour from 25 to 70 hours. While not wishing to be bound by a particular theory, this may be due to the rapid consumption of sugar solution during the initial period and the depletion of sugar solution or reduction of active surface functional groups at longer dwell times.

Figure 13:
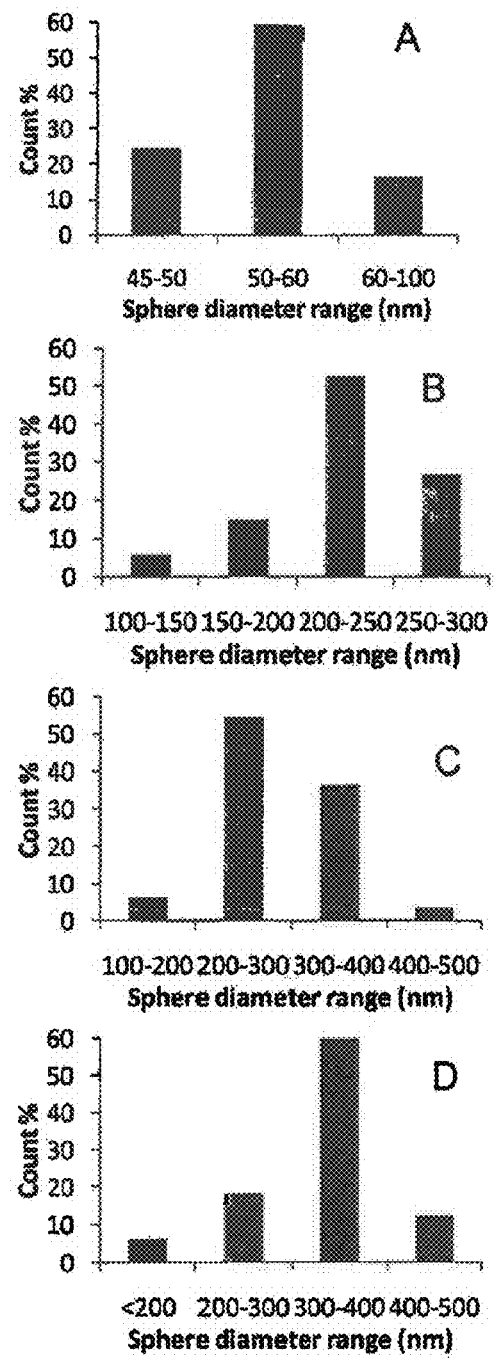
FIG. 13 shows histograms of diameter distribution of xylose-derived carbon nanospheres synthesized at different dwell times: (A) 5 hours, (B) 25 hours, (C) 50 hours, and (D)

Referring to FIG. 13, histograms of the diameter distributions for carbon nanospheres synthesized at different dwell times ((A) 5 hours, (B) 25 hours, (C) 50 hours, and (C) 70 hours; Table 1, Trial Numbers 11-14)) show well-dispersed carbon spheres with a diameter range of 200-250 nm at a dwell time of 25 hours.

FIG. 14 shows the change in the yield and average sphere diameter as a function of dwell time. At a constant reaction temperature and concentration, the yield and sphere diameter increased rapidly at shorter dwell times of less than 25 hours. The yield increased rapidly from 12% to almost 65% as the dwell time was increased from 5 hours to 50 hours, respectively, and then slowed down at dwell times longer than 50 hours.
Method of Increasing Carbon Nanospheres Diameter—Method of Making Microspheres Larger diameter spheres were obtained by the addition of various additives to the precursor sugar solution. The effect of changing the amount of additive or the xylose concentration on the sphere diameter/morphology was studied. The concentration of xylose, amount of additive used, pH of the solution before and after the hydrothermal run, sphere diameter and their morphology are shown in Table 2 for certain selective runs.

(1-3 microns) but they were partially fused. The addition of 5% boric acid to 0.5 M xylose solution resulted in a slight increase in the sphere diameter from 300-400 nm to 500-700 nm with a negligible increase in the material yield. The addition of surfactant sodium lauryl sulfate (SLS) to 0.5M xylose solution resulted in increase in the sphere diameter. With 0.4 g/L of SLS addition monodispersed spheres with a diameter of 700-900 nm were produced. With 0.8 g/L of SLS addition monodispersed spheres with a diameter of 1-2 microns were produced. As the amount of SLS was increased to 1.2 g/L partially fused spheres with a diameter of 4-6 microns were produced. The material yield increased from 21% to 43% as the amount of SLS was increased from

TABLE 2

Effect of additives on the sphere morphology and diameter

| Additive | Amount | Xylose concentration (M) | pH before HTS run | pH after HTS run | Sphere diameter | Sphere morphology |
|---|---|---|---|---|---|---|
| No additive | | 2 | 6.5 | 2.6 | 1-1.2μ | spherical |
| Diammonium phosphate | 1 wt % | 1 | 8.1 | 2.1 | 3-5μ | Partly fused |
| Melamine | 0.8 g/L | 0.5 | 7.4 | 2.6 | 1-3μ | Spherical, Isolated |
| Potassium hydroxide | 1 g/L | 2 | 10.1 | 2.9 | 5-7μ | Spherical, Isolated |
| Ammonium hydroxide | 1 g/L | 1 | 10 | 2.6 | 2-5μ | Spherical, Isolated |
| Sodium hydroxide | 1 g/L | 1 | 10.4 | 3.0 | 1-3μ | Partly fused |
| Sodium lauryl sulfate | 0.8 g/L | 0.5 | 6.7 | 2.4 | 1-2μ | Spherical, Isolated |
| Ammonium tetra borate | 1 wt % | 0.5 | 5.4 | 2.5 | 1-4μ | Spherical, Isolated |
| Boric acid | 5 wt % | 0.5 | 3.2 | 2.4 | 500-700 nm | Spherical, Isolated |
| Methane sulfonic acid | 5 wt % | 0.5 | 1.4 | 1.5 | 3-7μ | Partly fused |

Representative SEM images of carbon spheres made with different additives added to a certain initial concentration of xylose solution are shown in FIG. 15 (*a-i*). The spheres made with the addition of diammonium phosphate (DAP) to 1 mol/L xylose solution were partly fused and had a diameter range of 2-4 microns. The amount of DAP added to the xylose solution was increased from 1% to 10% but it had minimal effect on increasing the diameter beyond 2-4 microns. The amount of melamine added to 0.5 M xylose was varied between 0.4 g/L to 1.2 g/L. The addition of melamine to 0.5 M xylose solution produced monodispersed 1-2 micron diameter spheres up to a concentration of 0.8 g/L. The spheres were fused and random-sized beyond 0.8 g/L addition of melamine. The addition of ammonium hydroxide resulted in a significant increase in the sphere diameter. The spheres increased from 400-600 nm to 2-5 microns with the addition of 1 g/L of ammonium hydroxide to 1M xylose solution. The increase in the concentration of xylose to 2M with 1 g/L addition of ammonium hydroxide also resulted in 2-5 micron spheres. Also, the material yield increased from 38% to 44% as the xylose concentration was increased from 1M to 2M. The addition of sodium hydroxide to 1M and 2M xylose solutions resulted in larger spheres 0.4 g/L to 1.2 g/L. The addition of ammonium tetra borate to 1M xylose solution produced small and large spheres in the diameter range 1-4 microns. The addition of 5% methane sulfonic acid to 1 M xylose solution produced 3-7 micron spheres that were partially fused.

SEM images of carbon spheres made using different amounts of potassium hydroxide (1 g/L, 3 g/L, and 5 g/L) added to 2M xylose solution are shown in FIG. 16. The spheres increased in diameter from 1 micron to 5-7 microns with 1 g/L KOH addition. There was minimal increase in the material yield with the addition of KOH: the yield increased from 44% to 46%. The increase in the amount of KOH beyond 1 g/L of KOH produced irregular-shaped structures that appeared fused. There was minimal increase in the material yield as the amount of KOH was increased: the material yield increased from 49% to 51% as the concentration of KOH was increased from 1 g/L to 5 g/L.

FIG. 17 shows SEM images of carbon spheres made with different xylose concentrations (0.5M, 1.5M, 2M, and 3M) with and without addition of KOH, which was kept constant at 1 g/L. Table 3 shows effect of changing xylose concentration on pH, sphere morphology, diameter, and yield with and without KOH addition.

TABLE 3

Effect of changing xylose concentration on pH, sphere morphology, diameter, and yield with and without KOH addition

| Xylose (M) | Additives | pH before | Dwell | pH after | Yield % | Sphere morphology/ dispersion | Sphere Diameter |
|---|---|---|---|---|---|---|---|
| 0.50 | none | 6.50 | 12 h | 2.60 | 31% | spherical | 300-400 nm |
| 1.00 | none | 6.50 | 12 h | 2.30 | 38% | spherical | 400-600 nm |
| 1.50 | none | 6.40 | 12 h | 2.07 | 40% | spherical | 600-900 nm |
| 2.00 | none | 6.10 | 12 h | 1.87 | 44% | spherical | 1-1.2μ |
| 3.00 | none | 5.09 | 12 h | 1.88 | 49% | spherical | 1-1.5μ |
| 0.50 | 1 g/L KOH | 10.1 | 12 h | 3.50 | 38% | spherical | 1-2μ |
| 1.00 | 1 g/L KOH | 10.5 | 12 h | 3.06 | 42% | spherical | 1-3μ |
| 1.50 | 1 g/L KOH | 10.0 | 12 h | 3.04 | 45% | spherical | 2-3μ |
| 2.00 | 1 g/L KOH | 10.2 | 12 h | 2.90 | 47% | spherical | 5-7μ |
| 3.00 | 1 g/L KOH | 10.0 | 12 h | 2.86 | 49% | spherical | 3-6μ |

All the runs were conducted at 200° C. for 12 hours. The concentration of xylose, amount of KOH used, pH of the solution before and after the hydrothermal run, sphere diameter and their morphology are shown in Table 3. At 0.5M, the sphere diameter increased from 300-400 nm to 1-2 microns with the addition of KOH. At 1.5M, the sphere diameter increased from 600-900 nm to 2-3 microns with the addition of KOH. The particles maintained their sphericity. At 2M, the sphere diameter increased from 1-1.2 μm to 5-7 μm with the addition of KOH. The particles maintained their sphericity but in some places they appeared to have chipped off of the spheres. At 3M, the sphere diameter increased from 1-1.5 μm to 3-6 μm with the addition of KOH. The particles were spherical but they appeared to be flaked in the majority of the spheres. One could achieve larger diameter spheres of a certain diameter by increasing the concentration of xylose while using low amounts of KOH. FIG. 18a shows that as the concentration of xylose was increased, the material yield increased. The addition of KOH improved the yield at lower xylose concentration. The improvement in yield at higher concentration was minimal. FIG. 18b showed that the pH of the filtrate solution after the hydrothermal run decreased as the concentration was increased. The pH of the filtrate solution with KOH addition was lower than the one without any KOH additive. In another study, the dwell time was varied between 30 minutes to 18 hours and the xylose concentration (2M) and the amount of KOH (1.2 g/L) were held constant. The material yield increased from 27% to almost 50% as the dwell time was increased from 30 minutes to 18 hours. The sphere diameter remained constant at 2-4 microns at different dwell times. Overall, the additives altered the pH of the precursor sugar solution as shown in Table 2. The pH-value decreased after hydrothermal dehydration of xylose, consistent with previous studies. The pH-values of the filtrate recovered from different additives were slightly acidic (see Table 2).

Effect of DAP on carbon sphere diameter: Xylose solution with a concentration of 1M was used. To one aliquot of xylose solution, diammonium phosphate ("DAP") was added (to achieve 13% DAP in xylose solution) and stirred for 15 minutes. The hydrothermal run was carried out on a 2 L Parr pressure vessel at 200° C. for a dwell time of 24 hours for xylose solutions with and without added DAP. Without the addition of DAP, carbon nanospheres with a diameter range of about 500 nm to about 600 nm were obtained. With the addition of DAP, carbon spheres with a diameter range of about 1 μm to about 5 μm were obtained, as shown in FIG. 19. While not wishing to be bound by a particular theory, addition of DAP changed the pH of the solution (more basic, pH=8-9) which may have accelerated the formation of spheres. DAP also acts as a dehydrating agent, which may have promoted the formation of spheres and their growth. Using a disaccharide or a polysaccharide with the addition of DAP is expected to increase the sphere diameter further, since disaccharides/polysaccharides can yield larger diameter spheres than the monosaccharides.

Recycling Filtrate Solutions from Hydrothermal Runs

The filtrate recovered from the hydrothermal runs can be recycled and used in whole or part in subsequent hydrothermal runs. Different ratios of water to filtrate solution (50:0, 30:20, 20:30, 0:50) were used in the hydrothermal runs (see Table 4). The total volume of the solvent used was 50 mL in all the runs. The amount of xylose was kept constant so that the starting concentration is 0.3 mol/L. The temperature was kept constant at 200° C. and the dwell time was held constant at 24 hours. FIG. 20 shows that the sphericity of the carbons was maintained at different water to filtrate ratio. The carbons made from 100% filtrate had some elongated structures but they were mostly spherical. Table 4 shows that diameter of the spheres did not change much as the ratio of water to filtrate was increased. The spheres had an average diameter range of 200-300 nm without the addition of any filtrate. With the addition of filtrate, the average diameter of the spheres dropped to 200-250 nm. Though not wishing to be bound by a particular theory, this could be due to the presence of organic acids in the filtrate that made the precursor solution acidic. The change in the yield with increase in the filtrate concentration could be attributed to experimental error rather than effect of changing water to filtrate ratio.

TABLE 4

Recycling filtrate from hydrothermal runs

| Run | Mass of xylose (g) | DI water (mL) | Filtrate (mL) | Material yield (g) | Yield % | Sphere size (nm) |
|---|---|---|---|---|---|---|
| 1 | 2.25 | 50 | 0 | 0.7313 | 32.5 | 200-300 |
| 2 | 2.25 | 30 | 20 | 0.8480 | 37.7 | 200-250 |
| 3 | 2.25 | 20 | 30 | 0.9505 | 42.2 | 200-250 |
| 4 | 2.25 | 0 | 50 | 0.8202 | 36.5 | 200~250 |

Example 2

Electrochemical Capacitor

An electrochemical capacitor ("EC"), also known as, "super capacitor," "double-layer capacitor," or "ultra-capacitor," is an energy storage device with long cycle life, low internal resistance, fast charging rate, and high power density. Due to these advantages ECs have drawn much attention recently and have been applied in electric/hybrid vehicles, heavy-construction equipments, electronics, and utility grid storage. Conventional electrode materials for ECs are activated carbons with nano-porosity and high surface area. Other materials include metal oxides, graphene, carbon nanotubes, carbon aerogels, and conductive polymers. Although some of these materials show high performance, the cost may be high or the synthesis may involve using toxic or corrosive chemicals. In some embodiments of the invention, carbon materials for ECs were hydrothermally synthesized from a variety of low cost precursors such as recyclable materials and bio-waste.

The precursors chosen for HTS included packaging peanuts, cellulose, rayon fibers, pure starch, rice starch, and bourbon waste. Water-based solutions or suspensions were sealed in a Teflon lined pressure vessel, and then heated to 200° C. for 50 hours. After the reactor cooled down, the as-synthesized carbons were harvested by filtration and dried in an oven at 120° C. overnight. The morphology of the as-synthesized carbons was characterized by scanning electron microscope (SEM). For packaging peanuts, rice starch, and bourbon waste, micron-size spheres were formed and mixed with sub-micron-size irregularly-shaped particles. Though not wishing to be bound by a particular theory, this was possibly due to the complex chemical compositions of the precursors. For rayon fibers, uniform carbon microspheres grew on the surface of the fibers. The cellulose and pure starch gave irregularly-shaped nanoparticles. The as-synthesized carbon particles went through an activation process to increase surface area and porosity.

Example 3

Preparation of Symmetric Carbon-Carbon Cell

A symmetric carbon-carbon cell was constructed with a separator wetted with electrolyte sandwiched between symmetric carbon electrodes. Standard heat sealed cells were fabricated for a number of active materials using symmetric cell configurations. A symmetric carbon-carbon electrochemical double-layer capacitor was constructed with CELGARD® separator (3501).

The electrode were prepared by mixing activated carbon nanospheres with 3% TEFLON®, heating the mixture in an oven kept at about 120° C., pressing the mixture using a mortar and pestle into a dough, rolling the dough into a thin sheet, and then making circular discs using a 12 mm diameter punch. For cell construction, 1.8M $Et_3MeNBF_4$ (PC) was used as the electrolyte, CELGARD® 3501 was used as the separator, and carbon coated polymer was used as the current collector. An electrochemical cell comprising activated carbon nanospheres, as shown in FIG. 5, was prepared. Referring to FIG. 5, a wire lead 100 was attached to a plate 105, and the plate 105 was attached to a carbon current collector 110. The carbon current collector 110 was about 24 mm thick. The carbon current collector 110 was in contact with a MYLAR® film 120. The MYLAR® film 120 was about 68 μm thick. The MYLAR® film 120 was in contact with a layer of carbon/3% PTFE 130. The layer of carbon/3% PTFE 130 was about 12 mm in diameter and about 50 μm thick. The layer of carbon/3% PTFE 130 was in contact with a porous separator 140. The porous separator 140 was in contact with an end plate 150.

Cyclic voltammetry and galvanostatic charge-discharge tests were conducted on these cells to study the electrochemical performance. FIG. 32 shows normalized cyclic voltammograms of the activated carbons derived from the different precursors (a) packaging peanuts, b) cellulose, c) rayon fibers, d) pure starch, e) rice starch, and f) bourbon waste) showing both gravimetric and volumetric performance. Referring to FIG. 32, most of the materials showed rectangle-shaped CV curves and a very fast charge-discharge rate characteristic of good capacitive behavior. The specific capacitance of these materials was very high, for example, cellulose and rice starch derived activated carbons showed gravimetric capacitance of over 100 F/g and volumetric capacitance of over 50 F/cc.

Example 4

One-Step Ammonia Activation of Carbon Nanospheres

As-grown carbon nanospheres were activated with ammonia as described below. Referring to FIG. 3, the reactor in which activation was achieved consists of a ceramic tube 75 cm long and with an inner diameter of 5 cm. Green carbon spheres were prepared as described in Example 1. The green carbon spheres can be any type of carbon spheres prepared using the methods described in Example 1. For example, they can be small, medium, or large spheres or carbon particles of other shapes prepared from the various disclosed precursors via hydrothermal dehydration process. The spherical shape of the activated carbon spheres enables them to have high packing densities of close to 1 g/cc.

The green carbon spheres (about 1 to 20 g), were placed in a ceramic boat and inserted into the ceramic tube such that the boat was in the middle of the furnace heating zone. Ammonia gas was pumped into the reactor from a gas tank. The flow rate of ammonia (about 750 cc/min) was controlled by a flow meter. The exhaust gases were flushed through water to capture particulate matter as shown in FIG. 3. The as-grown spheres were subject to heat treatment under a flow of ammonia gas. The temperature was ramped up at 5° C./min to activation temperature (about 800° C. to about 1100° C.) under ammonia gas flow for a certain soak time and then ramped down at 20° C./min to 25° C. under $N_2$. The following soak times were studied: 0, 15, 30, 45, and 60 minutes.

FIG. 21 shows a graph of mass loss and density vs. dwell time. The mass loss of the material increased linearly with soak time. The material was slightly grayish at 0 min soak time and black at 60 minutes, indicative of the extent of activation on the material. The packing density decreased from 0.63 g/cc to 0.44 g/cc as the dwell time was increased from 0 to 60 minutes. FIG. 22 shows a graph of capacitance (F/g) and mass loss vs. dwell time. Also shown in Table 5, the electrochemical performance increased with increase in dwell time from 0 minutes to 30 minutes and then dropped as the dwell time was increased from 30 minutes to 60 minutes. Conventional methods for making activated carbons include carbonization/stabilization step (mass loss around 60%) and then an activation step (mass loss around 70%). The total mass loss of the conventional method is around 90-95%. In the present method through ammonia activation, since there is no carbonization step before activation, the total mass loss for this one-step activation process is less than 55% for 0 min soak and 60%-70% for 30 min soak and about 80% for 60 min soak. As a result, this process can give a relatively higher yield (30%-50%) compared to other activation methods (6%). Moreover, the activation process was carried out in a short duration (0 min-60 min) which may lead to additional cost savings. Conventional methods can require soak times of 2-5 hours. Activation time will generally scale with the amount of material being processed.

As shown in FIG. 32, the activated carbon nanospheres showed excellent capacitive performance in 1.8M $Et_3MeNBF_4(PC)$ (120 F/g, 70 F/cc) and 38 wt % $H_2SO_4$ (200 F/g, 150 F/cc). Only 3% binder was used to make the electrodes. This is much lower than the amount used commercially, which is typically about 10-20%. For the cyclic voltammetry, the cell was scanned at a certain voltage rate (dV/dt=20 mV/s) between two voltage limits and the corresponding current (I) was recorded. The lower voltage limit was 0 V and the upper voltage limit was 2-2.5V for organic electrolytes and 1-1.5V for aqueous electrolytes. The capacitance was calculated by C=I/dV/dt. The capacitance can be normalized by weight to get gravimetric capacitance (F/g) or normalized by the volume of the electrodes to get volumetric capacitance. The total capacitance of the cell is the sum of the series capacitance of electrode 1 and 2: $1/C_T=1/C_1+1/C_2$. Assuming that the capacitance of the electrodes are the same, the total capacitance $C_T=C_1/2$.

Figure 30:
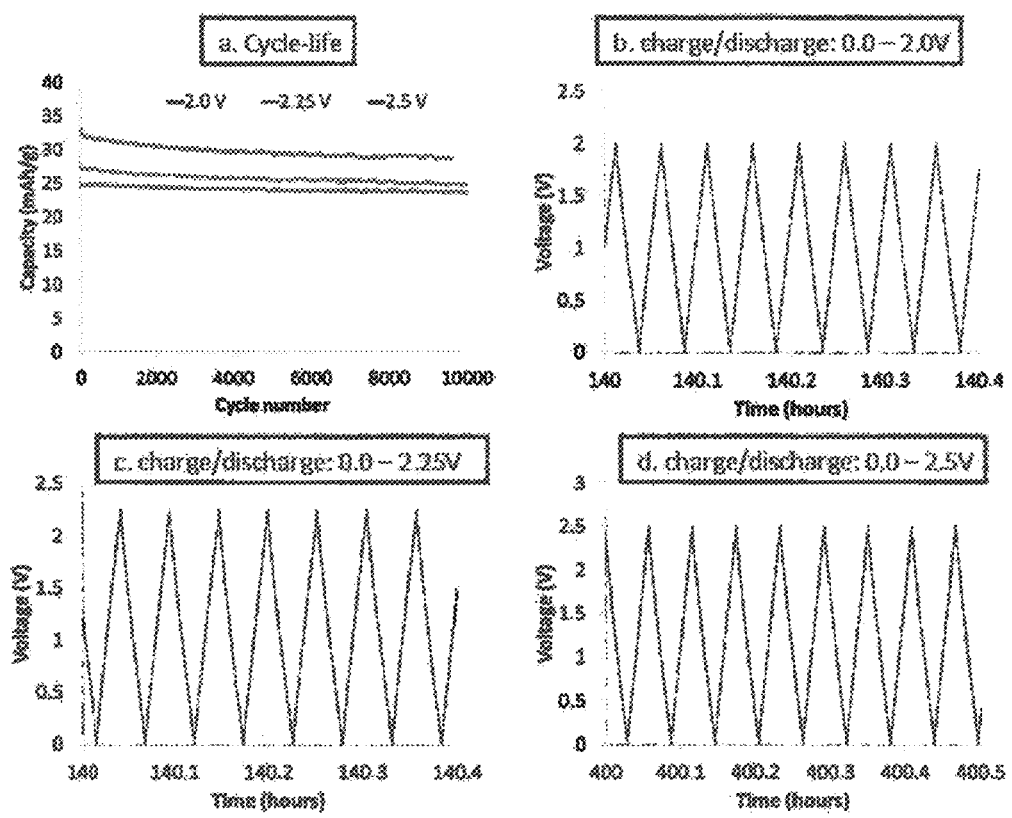

DC electrical performance is shown in FIG. 27, impedance is shown in FIGS. 28 and 29, and cycle life performance is shown in FIG. 30. FIG. 27 shows constant current charge/discharge profiles at different current densities. For measuring the DC performance, constant positive current density (mA/g) was applied during charge, constant negative current density (mA/g) was applied during discharge, and the corresponding voltage response was recorded. The voltage was restricted between 0 V and 2-2.5V for organic electrolytes and between 0 V and 1.0-1.5 V for aqueous electrolytes. The DC profiles in both aqueous (B) and organic electrolytes (A) showed capacitor-type behavior. The IR drop was very low. FIGS. 28 and 29 show impedance data, and demonstrate low impedance. FIG. 30 shows the cycle life performance of a symmetric cell and demonstrates excellent cycle life even after 10,000 cycles. There was very little drop in the capacitance. The cell was cycled between 0-2.0V, 0-2.25V, and 0-2.5V. The capacitance increased as the voltage window was increased.

TABLE 5

Effect of Dwell Time on Electrochemical Performance

| Dwell minutes | Mass Loss % | Density g/cc | BET $m^2$/g | Capacitance F/g | Capacitance F/cc |
|---|---|---|---|---|---|
| 0 | 56 | 0.63 | 795 | 94 | 59 |
| 15 | 64 | 0.6 | 968 | 109 | 66 |
| 30 | 72 | 0.58 | 1280 | 121 | 70 |
| 40 | 81 | 0.47 | 1354 | 110 | 53 |
| 60 | 88 | 0.44 | 1600 | 111 | 49 |

Conductive additives like graphite are normally added (about 5 wt %) to the active material when making electrodes for super capacitors. Because the activated carbon nanospheres showed a high conductivity, however, no conductive additive was added. This can add value to the carbon and also increase the amount of active material packed into the electrode structure.

The following activation temperatures were studied: 700 to 1000° C. (see Table 6). The best activation temperature, in terms of mass loss (72%) and electrochemical performance (121 F/g, 71 F/cc in 1.8M $Et_3MeNBF_4(PC)$), was determined to be approximately 850° C. As shown in Table 6, the packing density decreased with an increase in the activation temperature and the mass loss increased as the activation temperature was increased.

TABLE 6

Effect of Dwell Temperature on Electrochemical Performance, Packing Density, and Mass Loss

| Dwell Temperature ° C. | Capacitance F/g | Capacitance F/cc | Packing Density g/cc | Mass Loss % |
|---|---|---|---|---|
| 700 | 3 | 3 | 0.73 | 35 |
| 800 | 26 | 19 | 0.7 | 50 |
| 825 | 76 | 48 | 0.63 | 57 |
| 850 | 120 | 71 | 0.58 | 72 |
| 875 | 111 | 68 | 0.62 | 71 |
| 900 | 110 | 60 | 0.55 | 71 |
| 925 | 105 | 54 | 0.52 | 81 |
| 950 | 119 | 54 | 0.45 | 86 |
| 1000 | 113 | 42 | 0.38 | 88 |

Table 7 shows the optimal activation conditions and electrochemical performance of small, medium and large carbon nanospheres activated in $NH_3$ gas and tested in electrolytes 1.8 M TEMA $BF_4$ in PC and 38 wt % $H_2SO_4$.

TABLE 7

| | Activation: $NH_3$ gas | | | | | | | | | | |
|---|---|---|---|---|---|---|---|---|---|---|---|
| | Electrolyte: 1.8M TEMA $BF_4$ in PC | | | | | Electrolyte: 38 wt % $H_2SO_4$ | | | | | |
| | Run # | ° C. | min | % Mass Loss | F/g | F/cc | Run # | ° C. | min | % Mass Loss | F/g | F/cc |
| Small | 1 | 850 | 30 | 69 | 111 | 64 | 4 | 850 | 0 | 47 | 191 | 153 |
| Medium | 2 | 900 | 60 | 60 | 115 | 77 | 5 | 850 | 0 | 59 | 205 | 144 |
| Large | 3 | 875 | 60 | 79 | 98 | 58 | 6 | 850 | 0 | 47 | 143 | 129 |

Under similar carbonization conditions, switching from $N_2$ to $NH_3$ showed a significant improvement in the electrochemical performance of the xylose-derived carbon nanospheres in a super capacitor cell. 4 F/g and 3 F/cc for $N_2$ treated sample and 120 F/g and 70 F/cc for a $NH_3$ treated sample in 1.8M $Et_3MeNBF_4$(PC) electrolyte. The specific and volumetric capacitances in 38 wt % $H_2SO_4$ were 200 F/g and 200 F/cc, respectively. A packing density of 1 g/cc was observed from a sample not treated with ammonia. A packing density of 0.7 g/cc was observed for a 30 min ammonia-treated sample. This could be further improved by inter-mixing small and large spheres, whereby the interstices could be filled up, resulting in increased in packing density and volumetric electrochemical performance.

FIG. 26 shows the capacitive performance of xylose-derived carbon nanospheres in (A) 1.8 M $Et_3MeNBF_4$ and (B) 38 wt % $H_2SO_4$. The slight bumps/peaks seen in FIG. 26(A) on the top half (oxidation peak) and the bottom half (reduction peak) are referred to as the "pseudocapacitive peaks." Though not wishing to be bound by a particular theory, these bumps/peaks may be due to the role played by ammonia in the activation. Ammonia may have introduced nitrogen surface groups, extended the microporosity and modified the distribution of surface oxygen groups. Ammonia-treated carbon spheres looked very black compared to $N_2$ carbonized material, which could imply an increase in activation of the material.

The carbon nanospheres retained their shape after activation. The number of fissures and grooves increased as a result of activation. There was a small reduction in the size of the spheres after activation (about 10-20%). XRD patterns in FIG. 24A revealed an amorphous structure for the as-grown and activated carbon materials.

$N_2$ BET analysis was used to measure the surface area and pore size distribution of as-grown and activated carbon spheres. BET showed low surface area for as-grown and carbonized spheres ranging from 10-30 $m^2/g$. Ammonia activation resulted in an increase in surface area from 10 $m^2/g$ to almost 2000 $m^2/g$ after activation. Increasing the soak time increased the surface area. FIG. 25 shows the pore size distribution of as-grown and activated carbon nanospheres. Table 8 shows BET surface area and total pore volumes for as-grown and activated carbon nanospheres.

TABLE 8

BET Surface Area, Total Pore Volume, and Pore Size Distribution of Green Spheres, Carbonized Spheres, and Spheres Activated under $NH_3$ at Different Dwell Times.

| Activation Scheme | BET ($m^2/g$) | Total Pore Vol. ($cm^3/g$) | Pore Size Distribution % | | |
|---|---|---|---|---|---|
| | | | <2 nm | 2 nm-50 nm | >50 nm |
| Green spheres | 8.8 | 0.00606 | — | — | — |
| $N_2$, 850° C. | 371 | 0.2227 | 64 | 9.1 | 26.9 |
| 0 min dwell, $NH_3$, 850° C. | 795 | 0.4367 | 69.5 | 4.9 | 25.6 |
| 15 min, $NH_3$, 850° C. | 968 | 0.46718 | 79 | 5.6 | 15.4 |
| 30 min, $NH_3$, 850° C. | 1280 | 0.77653 | 59 | 10.5 | 30.5 |
| 40 min, $NH_3$, 850° C. | 1354 | 0.62996 | 72.5 | 17.8 | 9.7 |
| 60 min, $NH_3$, 850° C. | 1600 | 0.79706 | 55.6 | 29.2 | 15.2 |

Chemical analyses of the ammonia activated xylose-derived carbon nanospheres prepared at different soak times are shown in Table 9. The as-grown carbon nanospheres had a very high carbon content of almost 70%. The as-grown spheres also had a high oxygen content of 27%. The activated spheres also had very high carbon content of about 70%. The nitrogen content of the spheres increased from 0.02% to 6% as a result of activation. The oxygen content decreased from ~27% to ~23% as a result of activation and further decreased from 23% to 15% as the activation soak time was increased from 0 minutes to 30 minutes. The oxygen content was further increased by thermally treating the activated spheres at 400° C. for one hour in the presence of $Ar/H_2$. The oxygen content in the 30 min $NH_3$ treated sample decreased from 15% to 7% as a result of heat treatment. Chemical reduction of the activated spheres using mild acids is another way of reducing the oxygen content in the spheres. The oxygen content in the activated spheres decreased from 15% to 6% as a result of chemical reduction. The carbon content in the chemically reduced spheres was almost 80%. The overall ash content increased as a result of activation and further increased with an increase in the activation dwell time. Trace metals were not detected in the as-grown and activated carbon spheres.

TABLE 9

Chemical Analysis of Activated Carbon Nanospheres

| Comment | % Ash | % Hydrogen | % Carbon | % Nitrogen | % Oxygen | % S |
|---|---|---|---|---|---|---|
| As grown green spheres | 0.1 | 3.63 | 69.61 | 0.02 | 26.74 | <0.01 |
| 0 min dwell $NH_3$ xylose Carbon nanospheres | 0.8 | 2.19 | 68.26 | 6.07 | 22.68 | <0.01 |
| 30 min dwell $NH_3$ xylose carbon nanospheres | 1.31 | 2.2 | 75.2 | 6.07 | 15.22 | <0.01 |
| 0 dwell $NH_3$ xylose Carbon nanospheres - Heated 400° C., 1 h, Ar, $H_2$ | 0.81 | 1.16 | 69.85 | 7.21 | 20.97 | <0.01 |
| 30 min dwell $NH_3$ xylose carbon nanospheres - Heated 400° C., 1 h, Ar, $H_2$ | 1.71 | 1.34 | 82.1 | 7.99 | 6.86 | <0.01 |
| 30 min dwell $NH_3$ xylose carbon nanospheres - Chemical Reduction | 1.42 | 2.01 | 79.76 | 6.16 | 10.65 | <0.02 |

The electrodes made from activated carbon nanospheres wet well with both aqueous and non-aqueous electrolytes, which significantly increases the performance of the electrochemical cell. This may allow for the electrolyte to reach the solid electrode interface and increase the build-up of charge on the electrode surface.

Example 5

One-Step Ammonium Hydroxide Activation of Carbon Nanospheres

As-grown carbon nanospheres were activated with ammonium hydroxide as described below. Referring to FIG.

23, the reactor in which activation was achieved consists of a ceramic tube 75 cm long and with an inner diameter of 5 cm. The carbon precursor was placed in a ceramic boat and inserted into the ceramic tube such that the boat was in the middle of the furnace heating zone. The furnace was first heated to a certain temperature at which ammonium hydroxide liquid was pumped into the reactor by means of a syringe pump. The injection rate of ammonium hydroxide was controlled by the syringe pump. Nitrogen was used as a carrier gas to carry the ammonium hydroxide vapor through the reactor. Ammonium hydroxide vaporizes as it reaches the hot zone of the reactor and produces ammonia gas and steam. The exhaust gases were flushed through water to capture particulate matter as shown in FIG. 23.

Ammonium hydroxide activation introduces nitrogen surface groups and extends microporosity and modifies the distribution of surface oxygen groups of carbon nanospheres. The as-grown spheres were subject to ammonia and steam activation by pumping an aqueous solution of ammonium hydroxide (20-30% ammonia) into the reactor during activation. Ammonium hydroxide is also known as ammonia water. Initially, the temperature was ramped up at 10° C./min to 600° C. under a flow of $N_2$. Ammonium hydroxide injection was started at 600° C. and $N_2$ acted as the carrier gas. Different injection rates were examined: 0.1, 0.2, 0.5, and 1 cc/min, with the 1 cc/min injection rate producing the best-performing material. The temperature was ramped up at 10° C./min from 600° C. to a certain activation temperature after which ammonium hydroxide injection was turned off. The temperature was ramped down 20° C./min to 25° C. under $N_2$. The activation temperature ranged from 700° C. to 1000° C. The soak time ranged from 0 to 60 min. The overall mass loss was between 50 and 60%. Different injection temperatures were also studied: 400° C., 600° C., 700° C., and 850° C. Ammonia was injected in liquid form rather than gas form, eliminating the use of gas tanks and regulators and safety issues associated with them.

This activation process allows for both ammonia and steam activation in one step. The one-step activation procedure can lead to lower mass loss and higher carbon yield. Low-cost precursors were used in this activation. The activation times were short (0-60 min). Only 3% binder was used to make the electrodes, which is much less than the amount used commercially (about 10-20%). The electrodes made out of activated carbon nanospheres wet well with both aqueous and non-aqueous electrolytes, which significantly increases the performance of the electrochemical cell. This may allow for the electrolyte to reach the solid electrode interface and increase the build-up of charge on the electrode surface.

The activated spheres showed a high conductivity; therefore no conductive additive was added when the activated spheres are used in various applications, which adds value to the carbon. The activated spheres showed excellent electrochemical performance in both aqueous and non-aqueous electrolytes, for example, 1.8M $Et_3MeNBF_4$(PC): 121 F/g, 67 F/cc and 38 wt % $H_2SO_4$: 172 F/g and 137 F/cc. Table 10 shows the optimal activation conditions and electrochemical performance of small, medium and large carbon nanospheres activated in $NH_4OH$ and tested in electrolytes 1.8 M TEMA $BF_4$ in PC and 38 wt % $H_2SO_4$.

TABLE 10

| | | Activation: $NH_4OH$ | | | | | | | | |
|---|---|---|---|---|---|---|---|---|---|---|
| | | Electrolyte: 1.8M TEMA $BF_4$ in PC | | | | | Electrolyte: 38 wt % $H_2SO_4$ | | | |
| | Run # | Temp (° C.) | Dwell (min) | % Mass Loss | F/g | F/cc | Run # | Temp (° C.) | Dwell (min) | % Mass Loss | F/g | F/cc |
| Small | 1 | 850 | 30 | 74 | 121 | 67 | 4 | 850 | 0 | 48 | 151 | 115 |
| Medium | 2 | 850 | 30 | 76 | 120 | 61 | 5 | 850 | 0 | 50 | 172 | 137 |
| Large | 3 | 850 | 30 | 73 | 103 | 66 | 6 | 850 | 0 | 50 | 132 | 106 |

$CO_2$ Activation of Carbon Nanospheres

As-grown carbon nanospheres were directly subject to $CO_2$ activation in an experimental apparatus as shown in FIG. 3. The temperature ramp-up was 10° C./min to 600° C. under $N_2$, $CO_2$ turned ON at 600° C., 10° C./min to 850° C. under $N_2$, soak under $CO_2$ turned off, temperature ramp down was 20° C./min to 25° C. under $N_2$. Soak time: 0-60 min. Mass Loss: 0-60%. The carbon nanospheres activated according to the procedure described above had excellent electrochemical performance in aqueous electrolytes, for example, in 38 wt % $H_2SO_4$, the gravimetric and volumetric capacitances were 112 F/g, 75 F/cc, respectively.

Steam Activation of Carbon Nanospheres

The as-grown spheres were subject to steam activation. Steam activation was carried out in an experimental apparatus as shown in FIG. 23. The temperature ramp-up was 10° C./min to 600° C. under $N_2$, steam turned on at 600° C., 10° C./min to 850° C. under $N_2$, soak under $N_2$, and steam turned off after the appropriate dwell time. Temperature ramp down was 20° C./min to 25° C. under $N_2$. Soak time: 0-60 min. Mass Loss: 50-60%.

The carbon nanospheres activated according to the procedure described above had excellent electrochemical performance in both aqueous and non-aqueous electrolytes, for example, in 1.8M $Et_3MeNBF_4$(PC): 100 F/g, 53 F/cc.

Two-Step Activations

The activations described above were also done in two-steps: green carbon spheres to carbonized spheres to activated spheres. Carbonized carbon nanospheres were used as precursors for activation instead of using as-grown spheres. The following experiments were carried out: ammonia activation, $CO_2$ activation, ammonium hydroxide activation, and steam activation. The performance of ammonia activation in 1.8M $Et_3MeNBF_4$(PC) was 87 F/g, 61 F/cc.

Example 6

Half-Cell Measurements

Half-cell measurements were conducted in a flooded aqueous electrolyte using graphite as the counter electrode and saturated calomel electrode as a reference electrode. 5% carbon black or graphite and 3% Teflon were added to the activated carbon nanospheres and rolled into electrode sheets. 12 mm electrodes were punched out from the electrode sheet and pressed onto titanium mesh (Dexmet Corp., Wallingford, Conn.). The mesh was masked using plater's tape to expose only the carbon electrode.

Electrolytes used to evaluate the activated carbons included 1.8M $Et_3MeNBF_4$(PC), 1M $TEABF_4$ in AN, 38 wt % $H_2SO_4$, 0.1M $MgNO_3$, 0.1M $NaNO_3$, 0.1M $KNO_3$, 0.1M $LiNO_3$, 0.1M $RbNO_3$, 0.1M $CaNO_3$, 0.1M $LiSO_4$, 0.1M $CaSO_4$, 0.1M $MgSO_4$, 0.1M $MgSO_4$ in 38 wt % $H_2SO_4$. Half-cell measurements showed that 38 wt % $H_2SO_4$, 0.1M $CaNO_3$, 0.1M $RbNO_3$, 0.1M $NaNO_3$, 2M $LiSO_4$, and 2M $LiNO_3$ worked well at high negative potentials of −1.5V vs. SCE.

Electrode Materials Prepared from Other Precursors

Similar to xylose, other precursors such as sucrose, packaging peanuts, and rice water were hydrothermally treated at various temperatures and pressures to convert to carbon nanoparticles. The as-grown materials were activated in $NH_3$ at 850° C. for 30 min. The activated carbon was bound with 3% Teflon to make a symmetric capacitor cell. The cells were tested in both 1.8M $Et_3MeNBF_4$ (PC) and 38 wt % $H_2SO_4$ electrolytes.

Sucrose carbon spheres agglomerated under the same time conditions as used for xylose: concentration=0.1 M, dwell temperature=200° C., dwell time=50 hours. To obtain spherical carbon particles, the concentration of sucrose, temperature and dwell time were reduced from 50 hours to 1 hour. The yield of carbon under this dwell time was 20%, which was lower than the 80% of xylose. The size of the spheres was in the range of 250-350 nm. The $NH_3$ activation process was similar to xylose: ramp rate=5° C./min, dwell time=30 min, dwell temperature=850 C, $NH_3$ flow rate=750 cc/min. The best performance was 181 F/g, 107 F/cc in 38% $H_2SO_4$ and 84 F/g, 52 F/cc in 1.8M $Et_3MeNBF_4$ in PC.

Packaging peanuts (10 g) were mixed with 1.25 L of deionized water to form a very thick suspension. The mixture was hydrothermally treated at 200° C. for 25 hours. As-grown carbon (3.18 g) was collected after the hydrothermal synthesis. The as-grown carbon consisted of a mixture of large carbon spheres (about 2 µm), small carbon spheres (about 300 nm) and irregularly-shaped carbon nanoparticles. The as-grown carbon was activated in $NH_3$. The best performance in 38% $H_2SO_4$ was 183 F/g and 90 F/cc for a sample that was not soaked. For 1.8M Et3MeNBF4 (PC), a 30 min soak sample gave 95 F/g, 47 F/cc.

Rice (20 g) was added to of deionized water (1.25 L) and boiled for 20 minutes at about 100° C. The remaining solid rice was removed by filtration, and the resulting rice starch mixture was hydrothermally treated at 200° C. for 50 hours. Carbon (4.5 g) was retrieved. Most of the carbon was in the form of spheres within a range of 2-4 µm, with a small amount of irregularly-shape carbon. The as-grown carbon spheres were activated in $NH_3$: ramp rate=5° C./min, dwell temperature=850° C., dwell time=30 min, $NH_3$ flow rate=750 cc/min. The best performance in $H_2SO_4$ was 178 F/g and 102 F/cc, and the best performance in PC was 108 F/g, 67 F/cc.

A summary of hydrothermal synthesis conditions for various industrial and bio-precursors is provided in Table 11. "N/A" indicates that data are not available.

TABLE 11

Summary of Hydrothermal Synthesis Conditions for Precursors

| Precursor | Concentration (mol/L) | Temperature (° C.) | Dwell time (hour) | Materials yield (%) | Morphology |
|---|---|---|---|---|---|
| Xylose | 0.025~3 | 150~200 | 5~90 | 1.6~46.5 | Spheres (40 nm~1.5 µm) increase with concentration |
| Sucrose | 0.075 | 160~200 | 0.5~20 | 14.3~48.8 | Spheres (800 nm) for short dwell time and low temperatures Fused spheres for Long dwell time and high temperatures |
| Xylose Sucrose mixed solution | Xylose 0.1 Sucrose 0.075 | 180~200 | 0.5~2 | 3.5~27.8 | Spheres (200 nm) |
| Glucose | 0.05~0.2 | 180~200 | 5~50 | 2.2~24.8 | Spheres (100 nm) for short dwell time and low temperatures Fused spheres for Long dwell time and high temperatures |
| Fructose | 0.05~0.1 | 180~200 | 10~50 | 13.8~17.8 | Fused spheres |
| Maltose | 0.025 | 190 | 50 | 21.5 | Fused spheres |
| Glucosamine | 0.05~0.2 | 180~200 | 12~50 | 4.5~20.3 | Irregular shape particles |
| Rayon fiber | N/A | 200 | 1~5 | N/A | Spheres grown on the walls of fibers |
| Pure starch | N/A | 200 | 50 | 14.9 | Irregular shape particles |
| Cellulose | N/A | 200 | 10 | 29.5 | Irregular shape particles |
| Packaging peanuts | N/A | 200 | 50 | 31.8 | Spheres (0.2~5 µm) mixed with irregular shape particles |
| Rice water | N/A | 200 | 50 | N/A | Spheres (1~2 µm) mixed with irregular shape particles |

TABLE 11-continued

Summary of Hydrothermal Synthesis Conditions for Precursors

| Precursor | Concentration (mol/L) | Temperature (° C.) | Dwell time (hour) | Materials yield (%) | Morphology |
|---|---|---|---|---|---|
| Bourbon waste | N/A | 200 | 50 | N/A | Spheres (1~2 μm) mixed with irregular shape particles |
| Peanut shells | N/A | 200 | 50 | 38.9 | Irregular shape particles |
| *Macadamia* nut shell | N/A | 200 | 50 | 58.9 | Irregular shape particles |
| Potato | N/A | 200 | 50 | N/A | Irregular shape particles |
| Sweet potato | N/A | 200 | 50 | N/A | Irregular shape particles |
| Banana peel | N/A | 200 | 50 | N/A | Irregular shape particles |
| Orange Peel | N/A | 200 | 50 | N/A | Irregular shape particles |
| Sugar beet juice | N/A | N/A | N/A | N/A | Mixed spheres large (5-10 um) and small (~1 um) |
| Sour milk | N/A | N/A | N/A | N/A | Spheres (2~5 um) mixed with irregular shape particles |
| Corn cob | N/A | N/A | N/A | N/A | Spheres (4~6 um) mixed with irregular shape particles |
| High fructose corn syrup | N/A | N/A | N/A | N/A | Mixed spheres large (5-10 um) and small (~1 um) |
| Bamboo fiber | N/A | N/A | N/A | N/A | Spheres grown on fibers |
| Pistachio shell | N/A | N/A | N/A | N/A | Irregular shape particles |
| Coconut shell | N/A | N/A | N/A | N/A | Irregular shape particles |
| Liquid from can fruit cocktail | N/A | N/A | N/A | N/A | Spheres (5~7 um) |
| Liquid from can sweet potato yam | N/A | N/A | N/A | N/A | Spheres (5~10 um) |
| Sea weed | N/A | N/A | N/A | N/A | Irregular shape particles |
| Pasta water | N/A | N/A | N/A | N/A | Spheres (2~3 um) mixed with irregular shape particles |
| Corn starch | N/A | N/A | N/A | N/A | Fuse spheres (5~10 um) |
| Tapioca | N/A | N/A | N/A | N/A | Mono-dispersed Spheres (1~2 um) |
| Baking flour | N/A | N/A | N/A | N/A | Spheres (4~6 um) mixed with irregular shape particles |

A summary of different physical activations done on carbon nanoparticles synthesized from various industrial and bio-precursors and their electrochemical performance in organic and aqueous electrolytes is provided in Table 12. "N/A" indicates that data are not available.

TABLE 12

Summary of Different Physical Activations of Carbon Nanoparticles Synthesized from Various Precursors and Their Electrochemical Performance in Organic and Aqueous Electrolytes.

| | | | Best Performance | | | |
|---|---|---|---|---|---|---|
| | | Mass | Organic electrolyte | | Aqueous electrolyte | |
| | Activation | loss | | | | |
| Precursor | media | (%) | F/g | F/cc | F/g | F/cc |
| Xylose | $NH_3$ | 50~75 | 120 | 70 | 200 | 190 |
| | $NH_4OH$ | 58~80 | 120 | 60 | 178 | 89 |
| | $NH_3$ + $NH_4OH$ | 64~78 | 105 | 62 | N/A | N/A |
| | $H_2O$ | 72 | 100 | 53 | 93 | 51 |
| | $NH_3$ + $H_2O$ | 77 | 105 | 54 | N/A | N/A |
| | $CO_2$ | 51 | 5 | 3 | 112 | 75 |
| Sucrose | $NH_3$ | 58~85 | 111 | 69 | 181 | 107 |
| | $NH_4OH$ | 95 | 123 | 52 | N/A | N/A |
| Glucose | $NH_3$ | 64~74 | 87 | 48 | N/A | N/A |
| | $NH_4OH$ | 81~89 | 118 | 46 | N/A | N/A |
| | $H_2O$ | 77~80 | 118 | 49 | N/A | N/A |
| Glucosamine | $NH_3$ | 73~77 | 96 | 56 | N/A | N/A |
| | $NH_4OH$ | 96 | 118 | 46 | N/A | N/A |
| | $H_2O$ | 77 | 97 | 40 | N/A | N/A |
| Rayon fiber | $NH_3$ | 91 | 71 | 50 | N/A | N/A |
| | $NH_4OH$ | 66 | 112 | 59 | N/A | N/A |
| | $H_2O$ | 58 | 115 | 56 | N/A | N/A |
| Pure starch | $NH_3$ | 68 | 86 | 41 | N/A | N/A |
| Cellulose | $NH_3$ | 80 | 105 | 53 | N/A | N/A |
| | $NH_4OH$ | 81 | 115 | 56 | N/A | N/A |
| Packaging peanuts | $NH_3$ | 71~79 | 98 | 40 | 180 | 109 |
| | $NH_4OH$ | 79 | 110 | 43 | N/A | N/A |
| | $H_2O$ | 77 | 88 | 33 | N/A | N/A |
| Rice water | $NH_3$ | 56~80 | 108 | 66 | 178 | 102 |
| | $NH_4OH$ | 77 | 96 | 56 | N/A | N/A |
| | $H_2O$ | 74 | 84 | 56 | N/A | N/A |
| Bourbon waste | $NH_3$ | 79 | 58 | 42 | N/A | N/A |
| Peanut shell | $NH_3$ | 83 | 104 | 59 | N/A | N/A |
| Macadamia nut shell | $NH_3$ | 73~78 | 106 | 61 | N/A | N/A |
| | $NH_4OH$ | 62~97 | 120 | 62 | N/A | N/A |
| Potato | $NH_3$ | 85 | 104 | 61 | N/A | N/A |
| Sweet potato | $NH_3$ | 78 | 104 | 62 | N/A | N/A |
| Banana peel | $NH_3$ | 84 | 108 | 42 | N/A | N/A |
| Orange peel | $NH_3$ | 79 | 94 | 63 | N/A | N/A |
| Sugar beet juice | N/A | N/A | 102 | 76 | N/A | N/A |
| Sour milk | N/A | N/A | 30 | 19 | N/A | N/A |
| High fructose corn syrup | N/A | N/A | 120 | 80 | N/A | N/A |
| Bamboo fiber | N/A | N/A | 121 | 75 | 194 | 124 |
| Pistachio shell | N/A | N/A | 91 | 68 | 156 | 132 |
| Coconut shell | N/A | N/A | 68 | 48 | N/A | N/A |
| Liquid from can fruit cocktail | N/A | N/A | 43 | 38 | N/A | N/A |
| Sea weed | N/A | N/A | 16 | 22 | N/A | N/A |
| Pasta water | N/A | N/A | 98 | 74 | N/A | N/A |
| Corn starch | N/A | N/A | 107 | 69 | 162 | 134 |
| Tapioca | N/A | N/A | 56 | 44 | 180 | 148 |
| Baking flour | N/A | N/A | 65 | 51 | 197 | 155 |

Example 7

Carbon nanospheres of different diameters were prepared as described in Table 13, and subsequently carbonized or graphitized.

TABLE 13

Hydrothermal Synthesis, Carbonization, and Graphitization Conditions

| | Small (<100 nm) | Medium (100~500 nm) | Large (>1 μm) |
|---|---|---|---|
| Green carbon particles | Hydrothermal synthesis (HTS) - 2 L Parr pressure vessel<br>Precursor: xylose<br>Concentration: 0.05 mol/L<br>Temperature: 200° C.<br>Dwell time: 50 hours | Hydrothermal synthesis (HTS) - 2 L Parr pressure vessel<br>Precursor: xylose<br>Concentration: 0.3 mol/L<br>Temperature: 200° C.<br>Dwell time: 50 hours | Hydrothermal synthesis (HTS) - 2 L Parr pressure vessel<br>Precursor: xylose<br>Concentration: 2.0 mol/L<br>Temperature: 200° C.<br>Dwell time: 36 hours |
| Carbonized carbon particles | Starting material: small green CNS<br>Ramp: 5° C./min to 500° C.; 1° C./min to 850° C.<br>Dwell at 850° C. for 1 hour in $N_2$ ($N_2$ flow 250 cc/min) | Starting material: medium green CNS<br>Ramp: 5° C./min to 500° C.; 1° C./min to 850° C.<br>Dwell at 850° C. for 1 hour in $N_2$ ($N_2$ flow 250 cc/min) | Starting material: large green CNS<br>Ramp: 5° C./min to 500° C.; 1° C./min to 850° C.<br>Dwell at 850° C. for 1 hour in $N_2$ ($N_2$ flow 250 cc/min) |
| Graphitized carbon particles | Starting material: small green CNS<br>Ramp: 20° C./min to 2500° C.<br>Dwell at 2500° C. for 1 hour in He (He flow 4 L/min) | Starting material: medium green CNS<br>Ramp: 20° C./min to 2500° C.<br>Dwell at 2500° C. for 1 hour in He (He flow 4 L/min) | Starting material: large green CNS<br>Ramp: 20° C./min to 2700° C.<br>Dwell at 2700° C. for 1 hour in He (He flow 4 L/min) |

The as-grown spheres were carbonized at different temperatures: 600° C., 700° C., 800° C., 900° C., 1000° C., and 1200° C. (FIG. 3 with NH$_3$ turned off). The temperature was ramped up at 5° C./min to carbonization temperature, 60 minute soak, and then the temperature was ramped down at 20° C./min to 25° C. Carbonization was performed under 250 cc/min of N$_2$ flow. Carbonization resulted in a small increase in the surface area of 10 to 30 m$^2$/g after carbonization.

The as-grown spheres were graphitized at between 1800° C. and 2500° C., ramp up temperature 20° C./min to 1800° C. to 2500° C. under He, soak for 1 hour under He, ramp down temperature at 20° C./min to 25° C. under He. Carbonization resulted in small increase in the surface area 10 to 30 m$^2$/g after graphitization.

Spray Painting

Carbonized/graphitized carbon spheres were mixed with 5-10% carbon black and 5-10% binder and dissolved in a suitable solvent. For PVA and CMC, water was used as the solvent. For PVDF, N-methyl-2-pyrrolidone ("NMP") was used as the solvent. Carbon black was used as the conductive additive. This solution was sonified for 10 minutes in order to ensure thorough mixing of the constituents. The active material was spray painted onto suitable current collectors using an air brush. Nitrogen was used instead of air in order to maintain purity of the constituents. The air-brush painting ensures uniform deposition of activated material onto various current collectors. In general, spray painting yielded very thin, uniform layers of active materials with most binders including PVA, PVDF and CMC. Air-spraying was used to coat various current collectors, including copper, aluminum and titanium with activated electrode materials.

Effect of Surface Treatments of Carbonized/Graphitized Particles

The carbonized/graphitized particles were subjected to surface treatments such as doping. The doping will be described with reference to the dopant atoms boron and nitrogen with the same effect as to other suitable dopant atoms such as oxygen, nitrogen, phosphorus, boron, sulfur, and selenium.

Boron Doping:

The carbon nanospheres were carbonized at 850° C. and then boron-doped by substitution reaction at 1,100° C. In the substitution method, the carbon atoms in the carbon nanospheres are partially or completely substituted by boron without any topological changes to the starting material. Boron oxide (B$_2$O$_3$) powder was placed in a graphite boat and covered with carbon nanospheres. The graphite boat was placed in a reactor and held at 1,100° C. for 5 hours. Argon gas was introduced to maintain the inert atmosphere during the reaction. The weight ratio of B$_2$O$_3$ powder to carbon nanospheres was 5:1. The capacity increased from 93 mAh/g to 122 mAh/g after 50 cycles as shown in FIG. 43.

Oxidation in Air:

The 850° C. carbonized spheres were burnt in air at 200° C. for 1 h. The capacity increased and the irreversible capacity decreased as shown in FIG. 40 B. Performance improvement may be attributed to chemical bonding of the passivating layer to the surface carboxylic groups, and to accommodation of extra lithium at edge sites and inside nanochannels formed by oxidation (Flandrois et al. "Carbon materials for lithium-ion rechargeable batteries," *Carbon* 37 (1999) 165-180 (incorporated by reference herein)).

Chemical Oxidation Using Nitric Acid:

The 850° C. carbonized spheres were soaked in 1M HNO$_3$ and 10M HNO$_3$, respectively. The open circuit potential increased from 3V to 3.45V. The capacity increased from 200 mAh/g to over 350 mAh/g as shown in FIG. 40A.

Ammonium Persulfate Treatment of Graphitized Spheres:

The graphitized spheres were treated with ammonium persulfate and then dried and tested for lithium intercalation. This chemical oxidation procedure may improve the lithium intercalation capacity.

Cerium Sulfate Treatment of Graphitized Spheres:

The graphitized spheres were treated with cerium sulfate and then dried and tested for lithium intercalation. This chemical oxidation procedure may improve the lithium intercalation capacity.

Hydrogen Peroxide Treatment of Graphitized Spheres:

The graphitized spheres were treated with hydrogen peroxide and then dried and tested for lithium intercalation. There was minimal improvement in the capacity after hydrogen peroxide treatment as shown in FIG. 42.

Ammonia Activation of Graphitized Spheres:

The graphitized spheres were subjected to ammonia activation and then dried and tested for lithium intercalation. There was minimal improvement in the capacity after nitrogen doping as shown in FIG. 41.

Zinc Reduction of Graphitized Spheres:

This procedure is intended to break up the graphene sheets on the surface of the spheres and improve the lithium intercalation capacity.

Example 8

Lithium Intercalation

The preparation of as-grown carbon spheres, carbonized spheres, and graphitized spheres are described in Example 7. For the cell construction, lithium metal was used as the counter electrode, a carbon nanospheres electrode was used as the working electrode, CELGARD® separator 3501 was used as the separator, and 1M LiPF6 EC:DMC 1:1 was used as the electrolyte. In some cases, a lithium reference electrode was also utilized. The working electrode was made by mixing carbon nanospheres active material with 10% carboxy methyl cellulose ("CMC") as the binder, 5% carbon black as a conductive additive, and deionized water and painting the slurry onto a copper current collector. The electrodes were dried in a vacuum oven kept at 120° C. The mass of the electrode was calculated based on the active mass of the carbon nanospheres.

XRD was used to determine graphitization development in carbon nanospheres and graphitic domains. Referring to FIGS. 24 (C), 24 (B), and 36, the XRD showed disordered carbon (i.e., amorphous) at a lower carbonization temperature (850° C.) and graphitic carbon at a higher graphitization temperature (2500° C.). Identical structure was observed for carbons carbonized at 850° C. and 1200° C. FIG. 36 shows identical structure for small and large spheres carbonized at 850° C.

FIG. 37 shows the effects of carbonization temperature on lithium intercalation. Charge/discharge plots of carbon nanospheres carbonized at different carbonization temperatures: 850° C., 1000° C., 1200° C., 1800° C., and 2500° C. are shown. Medium-sized (100 nm to 500 nm) spheres were carbonized/graphitized at different temperatures: 850° C., 1200° C., 2500° C. under inert N$_2$ atmosphere. The ramp rate was 5° C./min to 10° C./min. The dwell time at carbonization temperature was one hour. The DC experiments were conducted at C/20 rate which is 18.6 mA/g based on the theoretical capacity of graphite (372 mAh/g). Referring to FIG. 37, all the charge/discharge (DC) plots showed sloping DC curves which are typical for hard carbons. The lithium intercalation capacity decreases with increase in the carbonization/graphitization temperature. Though not wishing to be bound by a particular theory, this may be due to the fact that the carbonized spheres are amorphous at lower carbonization temperatures and provide additional edge sites for lithium intercalation. The irreversible capacity decreased as the carbonization/graphitization temperature was increased. Though not wishing to be bound by a particular theory, this may be due to the fact that amorphous carbons formed at lower carbonization temperature (e.g., 850° C.) has higher tendency to form an SEI (solid-electrode interface) layer than graphitic carbons formed at high graphitization temperatures (e.g., 2500° C.).

FIG. 38 shows the effects of carbonization temperature on lithium intercalation. Cycle life data is shown for carbon nanospheres carbonized/graphitized at different temperatures: 850° C., 1000° C., 1800° C., and 2500° C. Medium-sized (100 nm to 500 nm) spheres were carbonized/graphitized at different temperatures: 850° C., 1200° C., 2500° C. under inert $N_2$ atmosphere. The ramp rate was 5° C./min to 10° C./min. The dwell time at carbonization temperature was one hour. The cell construction is described above. The experiments were conducted at C/20 rate which is 18.6 mA/g based on the theoretical capacity of graphite (372 mAh/g). Referring to FIG. 38, the reversible capacity decreased as the carbonization/graphitization temperature was increased. Two-step carbonization where the carbon spheres were carbonized at 1000° C. and then re-carbonized at 1200° C. showed improvement in the reversible capacity.

FIG. 39A shows the lithium intercalation of small-sized carbon nanospheres graphitized at 2500° C. Cycle life data are shown for small-sized (diameter<100 nm) carbon nanospheres graphitized at 2500° C. The cell construction is described above. The experiments were conducted at 1 C rate which is 372 mA/g based on the theoretical capacity of graphite (372 mAh/g). Referring to FIG. 39A, the reversible capacity of about 100 mAh/g was obtained after 100 cycles with minimal capacity fading. FIG. 39B shows the effect of carbonization temperature on lithium intercalation of carbon nanospheres. Cycle life data are shown for medium-sized (diameter=100-500 nm) carbon nanospheres carbonized at 800° C., 1200° C., and 2500° C. The experiments were conducted at 1 C rate which is 372 mA/g based on the theoretical capacity of graphite (372 mAh/g). The carbonized/graphitized carbons showed superior lithium intercalation performance at fast rates (1 C rate).

Referring to FIG. 39B, the reversible capacity decreased with increase in the carbonization/graphitization temperature. The capacity fading was minimal in the graphitized sample (at 2500° C.) after 150 cycles. The reversible capacity was 205 mAh/g after 150 cycles for CNS carbonized at 800° C. but the reversible capacity was only 90 mAh/g for CNS carbonized at 2500° C. Though not wishing to be bound by a particular theory, this may be due to the fact that the carbonized spheres are amorphous at lower carbonization temperatures and provide additional edge sites for lithium intercalation. The CNS are graphitic at higher graphitization temperatures. The irreversible capacity also decreased as the carbonization/graphitization temperature was increased. The irreversible capacity was the lowest in highly graphitized spheres (i.e., 2500° C.).

FIG. 40 shows the effects of surface treatments of carbon nanospheres with A) nitric acid and B) air oxidation on carbon nanosphere capacity (mAh/g). Medium-sized carbon nanospheres were carbonized at 850° C. under nitrogen for one hour. A portion of the carbonized carbon nanospheres were treated with low concentration nitric acid (0.1M) and higher concentration (1M) nitric acid at 60° C. for 24 hours. Another portion was oxidized in air at 200° C. for 1 hour. The cell construction is described above. The cells were cycled at 1 C rate which is 372 mA/g based on the theoretical capacity of graphite (372 mAh/g). FIG. 40A shows the cycle life (100 cycles) performance for medium-sized carbon nanospheres treated with nitric acid (0.1M and 1M) in comparison with the untreated carbonized sample. Higher reversible capacity was observed in the nitric acid treated samples when compared to the untreated sample. Higher nitric acid concentration resulted in higher capacity than the lower concentration sample. Although there was an increase in the reversible capacity in the nitric acid treated samples during the initial cycles, capacity fading (capacity loss) resulted after 100 cycles. FIG. 40B shows the cycle life performance of carbonized medium-sized carbon nanospheres oxidized in air in comparison with the untreated carbonized sample. No significant improvement in the capacity was seen in the oxidized sample.

TABLE 14

Surface Treatment of Spheres

| Sample No. | Treatment | Procedure |
|---|---|---|
| C222 | Untreated | 850° C., $N_2$, 1 h |
| C222-NA1 | Chemical oxidation | 1. 850° C., $N_2$, 1 h<br>2. 0.1M nitric acid, 60° C., 24 h |
| C222-NA2 | Chemical oxidation | 1. 850° C., $N_2$, 1 h<br>2. 1M nitric acid, 60° C., 24 h |
| C222-H1 | Air oxidation | 1. 850° C., $N_2$, 1 h<br>2. Heat 200° C., 1 h |

FIG. 41 shows the effects of doping carbon nanospheres with nitrogen on the lithium intercalation capacity. Medium-sized carbon nanospheres were carbonized at 850° C. under nitrogen for one hour. Part of the carbonized sample was activated under ammonia at 850° C. for 30 min. The cycle life performance of the carbonized medium-sized carbon nanospheres activated under ammonia was compared to the untreated carbonized sample. The cell construction is described above. The cells were cycled at 1 C rate which is 372 mA/g based on the theoretical capacity of graphite (372 mAh/g). Higher reversible capacity was noted in the ammonia activated sample during the first 40 cycles compared to the untreated sample. As shown in FIG. 41, no significant difference in the capacity was seen in the two samples after 40 cycles.

FIG. 42 shows the effects of surface treatments of carbon nanospheres with hydrogen peroxide. Medium-sized carbon nanospheres were carbonized at 850° C. under nitrogen for one hour. Part of the carbonized sample was treated with hydrogen peroxide at 60° C. for 24 hours. The cycle life performance of the carbonized medium-sized carbon nanospheres treated with hydrogen peroxide was compared to the untreated carbonized sample. The cell construction is described above. The cells were cycled at 1 C rate which is 372 mA/g based on the theoretical capacity of graphite (372 mAh/g). As shown in FIG. 42, no significant difference in the capacity was seen in the two samples.

FIG. 43 shows the effects of doping carbon nanospheres with boron. Medium-sized carbon nanospheres were carbonized at 850° C. under nitrogen for one hour. Part of the carbonized sample was treated with boron oxide powder at 1200° C. under argon for one hour. The cycle life performance of the carbonized medium-sized CNS treated with boron oxide powder was compared to the untreated carbonized sample. The cell construction is described above. The cells were cycled at 1 C rate which is 372 mA/g based on the theoretical capacity of graphite (372 mAh/g). As shown in FIG. 43, the boron doped sample had lower capacity when compared to the untreated sample.

TABLE 15

Surface Treatment of Spheres

| Sample No. | Treatment | Procedure |
| --- | --- | --- |
| C222 | Untreated | 850° C., $N_2$, 1 h |
| C80 | Nitrogen doping | 850° C. |
| C48 $H_2O_2$ | Chemical oxidation | 1. 850° C., $N_2$, 1 h |
|  |  | 2. $H_2O_2$, 60° C., 24 h |
| C222-BD1 | Boron-doping | 1. 850° C., $N_2$, 1 h |
|  |  | 2. Boron oxide, 1200° C., 1 h |

Anion Intercalation

Carbon spheres carbonized at various temperatures were also tested for anion interaction ($PF_6^-$) with carbon spheres carbonized at 850° C. Carbon spheres with a diameter range of 300-500 nm and carbon spheres with a diameter of <100 nm were tested. The electrodes were made by mixing 5% graphite and 3% Teflon. The cell consisted of a 12 mm carbon sphere electrode as the working electrode, CELGARD® separator 3501, $LiPF_6$ EC:DMC as the electrolyte, Li metal as the counter/reference electrode. Titanium mesh (Dexmet Corporation) was used as the current collector. Electrochemical tests were performed at constant current charge/discharge at various current densities: 5 mA/g, 10 mA/g, 20 mA/g, and 30 mA/g. Initial experiments showed discharge capacity of 30 mAh/g.

Example 9

Non-Aqueous Asymmetric Capacitor

The electrochemical performance of an asymmetric hybrid energy storage cell based on hydrothermally synthesized lithium titanate oxide ("LTO") nanospheres as the negative electrode and carbon nanospheres ("CNS") as the positive electrode was investigated. Non-aqueous battery electrolytes including various lithium salts, such as 1M $LiPF_6$ EC:DMC 1:1, 1M $LiClO_4$ EC:DMC 1:1, and 1M $LiBF_4$ EC:DMC 1:2, were used. The performance of a symmetric carbon/carbon electrochemical capacitor cell is also presented for comparison. The LTO utilizes a faradaic reaction to store charge and the activated CNS utilizes a non-faradaic capacitive process to store charge.

To improve the performance of the asymmetric capacitor the activated CNS should possess high reversible capacity in terms of anion adsorption, fast electrochemical reaction with the anion, and a long cycle life. To isolate the capacitance or the capacity of the activated CNS over a defined voltage range (3-4.3V) for the anion, the electrodes were tested at a relatively slow rate of 1 C in an asymmetric configuration vs. Li metal. As the cell was charged, $Li^+$ was reduced at the Li metal negative electrode and the $PF_6^-$ anion was absorbed into a double layer on the positive electrode. The specific capacity based on anion adsorption was calculated to be 32, 29, and 34 mAh/g for $LiPF_6$, $LiClO_4$, and $LiBF_4$ respectively.

For negative electrode selection in an asymmetric capacitor, the LTO can require high capacity in terms of lithium intercalation, exceptional cycle life, and rate capability. The hydrothermal synthesis of LTO spheres involves two steps: 1) the synthesis of $TiO_2$ spheres and 2) the hydrothermal synthesis of LTO from $TiO_2$ spheres. As shown in FIGS. 33A and B, the SEM images of $TiO_2$ showed monodisperse spheres with a smooth exterior surface. The resulting LTO also showed spherical shaped particles but the exterior surface appeared rough with areas appearing to have spalled or exfoliated off into thin nano-sheets. While not wishing to be bound by a particular theory, the surface exfoliation may be due to the fast injection of vacancies in the vicinity of the hydrous $TiO_2$.

Half-cell measurements were made with LTO as the working electrode and Li metal as the counter and tested over a voltage range from 1 V to 3 V at constant current charge/discharge at different rates (1 C, 5 C, 10 C). The specific capacity of LTO was calculated to be 140 mAh/g vs. Li metal.

The asymmetric cell was fabricated with activated CNS as the positive electrode and LTO as the negative electrode with a weight ratio of 5:1, respectively, in order to ensure full lithiation of LTO upon charge. The weight ratio was calculated using 30 mAh/g specific capacity for the activated carbon nanospheres and 140 mAh/g specific capacity for the lithium titanate measured vs. the Li metal.

The LTO electrode shows two-phase lithium intercalation reaction, the activated CNS electrode shows a linear voltage increase typical of capacitive storage, and the asymmetric cell reveals a gradual sloping voltage profile as seen in the constant current charge/discharge voltage profiles in FIG. 34. The Ragone plots in FIG. 35 show the superior performance of an asymmetric cell when compared to a symmetric EDLC. Table 16 shows that an asymmetric capacitor cell had higher energy densities than a symmetric capacitor cell in all battery electrolytes.

TABLE 16

Comparison of Energy Densities of Symmetric and Asymmetric Cells in Different Battery Electrolytes.

|  | Symmetric Energy @ 100 W/kg Wh/kg | Asymmetric Energy @ 100 W/kg Wh/kg | Symmetric Energy @ 100 W/L Wh/L | Asymmetric Energy @ 100 W/L Wh/L |
| --- | --- | --- | --- | --- |
| 1M $LiPF_6$ EC:DMC 1:1 | 7 | 19 | 4 | 8 |
| 1M $LiClO_4$ EC:DMC 1:1 | 8 | 25 | 6 | 12 |
| 1M $LiBF_4$ EC:DMC 1:2 | 9 | 14 | 6 | 5 |

Example 10

$CF_x$ Cells

The disclosed compositions include fluorinated carbon. The fluorinated carbon will be described with reference to $CF_{0.96}$ with the same effect as fluorinated carbon with a composition having a composition of $CF_x$ where x is about 0.5 to about 1.1.

FIG. 44 shows a schematic representation of preparation of ($CF_{0.96}$) fluorinated carbon spheres. The ratio of carbon to fluorine in the fluorinated carbon nanospheres (i.e., 1:0.96) was determined by gravimetric analysis.

FIG. 45 is a graph showing results of a Brunauer-Emmett-Teller ("BET") method surface area measurements gas sorption study of ($CF_{0.96}$) fluorinated carbon spheres. The surface area for the ($CF_{0.96}$) fluorinated carbon spheres was determined to be 240 m$^2$/g. Other CF$_x$ of this type may have surface areas of about 160-170 m$^2$/g.

FIG. 46 is a graph showing average pore diameter and total pore volume results of a gas sorption study of (CF$_{0.96}$) fluorinated carbon spheres. The (CF$_{0.96}$) fluorinated carbon spheres had an average pore diameter of about 4.9 nm and a total pore volume of about 0.19 cm$^3$/g. Other CF$_x$ of this type may have an average pore diameter of about 7.3-7.8 nm and a total pore volume of about 0.19-0.2 cm$^3$/g.

FIG. 47 shows a C-13 solid-state NMR of (CF$_{0.96}$) fluorinated carbon spheres. The (CF$_{0.96}$) fluorinated carbon spheres have a similar C-13 solid-state NMR to other CF$_x$ of this type. The "x" value in CF$_x$ as determined by NMR is 1.04 (about a 10% overestimate).

A Li/CF$_x$ cell was prepared (CF$_{0.96}$) fluorinated carbon spheres and having the characteristics summarized in Table 17.

TABLE 17

Li/CF$_x$ Cell

| | |
|---|---|
| Cathode | 80% CF$_x$, 15% Super-P, 5% PTFE binder, Thickness approximately 200 µm, weight 15 mg-20 mg, diameter 12 mm |
| Anode | 200 µm-thick lithium, diameter 16 mm |
| Separator | Glass fiber separator |
| Electrolyte | 1M LiBF$_4$ in PC:DME (1:1), 0.5M LiBF$_4$ in PC:DME (2:8), 2016 coin cell, 1 stainless steel spacer and 1 stainless steel spring |

FIG. 48 is a graph showing the discharge profile of (CF$_{0.96}$) fluorinated carbon spheres. The discharge profile of the (CF$_{0.96}$) fluorinated carbon spheres resembles the discharge profile of other CF$_x$ of this type.

The capacity (mAh/g) of (CF$_{0.96}$) fluorinated carbon spheres in different electrolytes at 2.0 V and 1.5 V are shown in Table 18. The obtained capacities are consistent with the gravimetric formulation and in line with other CF$_x$ systems. Though not wishing to be bound by a particular theory, this suggests that very little carbon was volatilized during the fluorination process.

TABLE 18

Capacity of (CF$_{0.96}$) Fluorinated Carbon Spheres in Various Electrolytes at 2.0 V and 1.5 V

| Electrolyte used | Theoretical capacity (mAh/g) | Capacity at 2.0 V (mAh/g) | Capacity at 1.5 V (mAh/g) |
|---|---|---|---|
| 1M LiBF4 in PC:DME (1:1) | 850 | 727 | 804 |
| 0.5M LiBF4 in PC:DME (2:8) | 850 | 760 | 832 |

Comparative power performance of (CF$_{0.96}$) fluorinated carbon spheres and other CF$_x$ of similar "x" value are shown in Table 19. As shown in Table 19, the (CF$_{0.96}$) fluorinated carbon spheres had similar power performance to other CF$_x$ materials. Use of mesoporous material may improve discharge at high rates and/or cumulative discharge capacities.

TABLE 19

Comparative Power Performance of (CF$_{0.96}$) Fluorinated Carbon Spheres and CF$_x$ of Similar "x" Value

| CF$_x$ Material in 2016 Cell | 10 mA | 10 + 4 mA | 10 + 4 + 1 mA |
|---|---|---|---|
| CF0.96 | 41 | 65 | 83 |
| Other CF$_x$ of similar x-value | 40-45 | 55-70 | 80-95 |

TABLE 20

Energy Densities

| Material | Operating Voltage (V) | Energy Density Wh/kg | Energy Density Wh/L |
|---|---|---|---|
| MnO$_2$ | 2.8 | 847 | 4235 |
| SO$_2$ | 2.8 | 1150 | 1650 |
| CF$_x$ metrics | 2.6 | 2180 | 4200 |
| Fluorinated Carbon Nanospheres | 2.6 | 2052 | 4000 |

Referring to FIG. 49, the XRD of the discharged cathode shows LiF and carbon as the discharge products; interplanar spacing in the CF$_x$ material is 0.63 nm, which is typical for this type of CF$_x$. Referring to FIG. 50, (CF$_{0.96}$) fluorinated carbon spheres are thermally stable to 400° C. by TGA analysis (1% wt. loss at 206° C., typically 340° C.-400° C.). Referring to FIG. 51, (CF$_{0.96}$) fluorinated carbon spheres were found to retain the spherical morphology of the GIRAPH13 precursor. Referring to FIG. 52, the carbon obtained from the thermal decomposition of (CF$_{0.96}$) fluorinated carbon spheres was found to retain the spherical morphology. Referring to FIG. 53, the carbon obtained as the electrochemical discharge product of (CF$_{0.96}$) fluorinated carbon spheres was found to retain the spherical morphology. Referring to FIG. 54, the carbon obtained as the electrochemical discharge product of (CF$_{0.96}$) fluorinated carbon spheres was found to retain the spherical morphology.

Example 11

Dual Activation (Chemical and Physical Activation) of Carbon Spheres

K$_2$CO$_3$+NH$_3$ Activation

Potassium carbonate (4.0073 g) was ground up and thoroughly mixed with 2.0038 g (2:1 K$_2$CO$_3$/carbon mass ratio) of 500° C. carbonized carbon 200 nm-300 nm spheres in an agate mortar. The mixture was added to a stainless steel boat, and placed into a horizontal Lindberg Blue tube furnace. The furnace was then purged with nitrogen for approximately 10 minutes at a nitrogen flow rate of 0.2 L/min; the nitrogen purge was kept on throughout the duration of the entire activation procedure. The sample was ramped up to 800° C. at a ramp rate of 5° C./min, and held at 800° C. for three hours. The furnace was then cooled to room temperature, and the stainless steel boat was removed from the furnace. The solid residue was then removed from the boat, and rinsed with 2000 mL of deionized water, until the pH of the filtrate was approximately 6. The remaining material was dried in a vacuum oven overnight at 120° C. The recovered mass of activated carbon was 1.3060 grams, corresponding to an activation mass loss of 34.8%.

The chemically activated carbon particles were subjected to an additional physical activation using ammonia gas as the activating agent. The chemically activated carbon particles (0.5047 g) were loaded into a ceramic boat, and placed into a Thermolyne 79300 Tube Furnace. The furnace was purged with nitrogen for 10 minutes, using a nitrogen flow of 250 cc/min. The nitrogen purge was maintained through the duration of the activation. The furnace was then turned on, and ammonia gas was introduced into the furnace, with a flow rate of 750 cc/min. The furnace was ramped up to 850° C. at a ramp rate of 5° C./min. There was no dwell time at 850° C., and the ammonia was immediately turned off upon reaching the activation temperature, and cooled to room temperature under a nitrogen purge. The product was then isolated from the furnace, and 0.3753 g of activated carbon was recovered, corresponding to a mass loss of 26%.

Referring to FIG. 55, the electrochemical performance of dual-activated carbon particles was evaluated through the fabrication of symmetric carbon/carbon electrochemical capacitors using 1.8M TEMABF$_4$ in PC as the electrolyte. The electrode composition was 92% of the dual-activated carbon particles, 5% KS6 graphite, and 3% Teflon 6C. The sweep rate was 0.02 V/s for the cyclic voltammetry. The capacitance of the material was 107 F/g, 64 F/cc (measured at 1V), and 109 F/g, 65 F/cc, measured at 1.5 V.

Also referring to FIG. 56, electrochemical impedance spectroscopy measurements were performed on the dual-activated carbon particles by applying a DC potential of 2V (i.e. charged state), an AC potential perturbation of 10 mV peak to peak, and sweeping the frequency from 1 MHz to 0.001 Hz. The electrolyte was 1.8M TEMABF$_4$ in PC. FIG. 56$a$ is a Nyquist plot, FIG. 56$b$ is a Bode plot, FIG. 56$c$ is a graph plotting C" vs. frequency, and FIG. 56$d$ is a graph plotting C' vs. frequency. The average active mass of material was 0.00391 g, and the average electrode thickness was 58 microns. The measured capacitance of the material was 108 F/g at 0.001 Hz, and had an RC time constant of 3.16 seconds.

Also referring to FIG. 57, the ammonia post-treatment resulted in an improvement in electrochemical performance. FIG. 57 shows cyclic voltammograms (1.8M TEMABF$_4$ in PC; sweep rate=0.02 V/s) comparing the chemically activated carbon particles (Chem-013) with the dual-activated carbon particles (Chem-013/NH$_3$). The capacitance of the dual-activated carbon particles was clearly enhanced over that of the chemically activated carbon particles. Moreover, the charge/discharge performance was improved, as indicated by the rectangular cyclic voltammogram for the dual-activated carbon particles.

K$_2$CO$_3$+NH$_4$OH Activation

In another sample, the chemically activated carbon particles were subjected to an additional physical activation using ammonium hydroxide (NH$_4$OH) as the activating agent. The chemically activated carbon particles (0.508 g) were loaded into a ceramic boat, and placed into a Thermolyne 21100 Tube Furnace. The furnace was purged with nitrogen for 10 minutes, using a nitrogen flow of 250 cc/min. The nitrogen purge was maintained through the duration of the activation. The furnace was then turned on, and ammonium hydroxide was introduced into the furnace at 600° C., using a Razel syringe pump Model A-99, with a flow rate of 0.5 cc/min. The furnace was ramped up to 850° C. at a ramp rate of 5° C./min. There was no dwell time at 850° C., and the ammonium hydroxide was immediately turned off upon reaching the activation temperature, and cooled to room temperature under a nitrogen purge. The product was then isolated from the furnace, and 0.2848 g of activated carbon was recovered, corresponding to a mass loss of 44%.

Referring to FIG. 58, the electrochemical performance of the dual-activated carbon particles was evaluated through the fabrication of symmetric carbon/carbon electrochemical capacitors using 1.8M TEMABF$_4$ in PC as the electrolyte. The electrode composition was 92% dual-activated carbon particles, 5% KS6 graphite, and 3% Teflon 6C. FIG. 58$a$ shows cyclic voltammograms, and FIG. 58$b$ shows the constant current charge/discharge data. The capacitance of the material was 109 F/g, 59 F/cc (measured at 1V), and 116 F/g, 62 F/cc, measured at 1.5 V.

Also referring to FIG. 59, electrochemical impedance spectroscopy measurements were performed on the dual-activated carbon particles by applying a DC potential of 2V (i.e. charged state), an AC potential perturbation of 10 mV peak to peak, and sweeping the frequency from 1 MHz to 0.001 Hz. The electrolyte was 1.8M TEMABF$_4$ in PC. FIG. 59$a$ is a Nyquist plot, FIG. 59$b$ is a Bode plot, FIG. 59$c$ is a graph plotting C" vs. frequency, and FIG. 59$d$ is a graph plotting C' vs. frequency. The average active mass of material was 0.00338 g, and the average electrode thickness was 57 microns. The measured capacitance of the material was 112 F/g at 0.001 Hz, and had an RC time constant of 2.51 seconds.

Also referring to FIG. 60, the ammonium hydroxide post-treatment resulted in an improvement in electrochemical performance. FIG. 60 shows cyclic voltammograms (1.8M TEMABF$_4$ in PC; sweep rate=0.02 V/s) comparing the chemically activated carbon particles (Chem-013) with the dual-activated carbon particles (Chem-013/NH$_4$OH). The capacitance of the dual-activated carbon particles was clearly enhanced over that of the chemically activated carbon particles. Moreover, the charge/discharge performance was improved, as indicated by the rectangular cyclic voltammogram for the dual-activated carbon particles.

BET surface area measurements were carried out on samples Chem-013, Chem-013/NH$_4$OH, and Chem-013/NH$_3$. A Micromeritics ASAP 2020 Surface Area and Porosity Analyzer was used for the measurements. The BET surface areas, total pore volumes, and pore size distributions are listed in Table 21.

TABLE 21

BET surface area of samples Chem-013, Chem-013/NH$_4$OH, and Chem-013/NH$_3$

| Sample ID | $S_{BET}$ (m$^2$/g) | TPV (cm$^3$/g) | micro (%) | Abs. micro. PV (cm$^3$/g) | meso (%) | Abs. meso. PV (cm$^3$/g) | macro (%) | Abs. micro. PV (cm$^3$/g) |
|---|---|---|---|---|---|---|---|---|
| Chem-013 | 1315 | 0.69949 | 71.8 | 0.5022 | 4.8 | 0.0335 | 23.4 | 0.1636 |
| Chem-013/NH$_4$OH | 1341 | 0.72084 | 67.4 | 0.4858 | 8.3 | 0.0598 | 24.3 | 0.1751 |
| Chem-013/NH$_3$ | 1362 | 0.71008 | 72.2 | 0.5126 | 6.8 | 0.0482 | 21.0 | 0.1491 |

Example 12

Light Corn Syrup as a Precursor for Carbon Particles

Light corn syrup was purchased from a supermarket. The total carbohydrate content was 1.067 g/ml. 200 ml light corn syrup (213.4 g of carbohydrate) was dissolved in 800 ml of deionized water. The solution was put in a Teflon lined Parr non-stirred pressure vessel. The pressure vessel was heated to 200° C., and held at that temperature for 24 hours. After the pressure vessel cooled down, the resulting material was filtered. The filtered material was collected and dried in the vacuum oven overnight at 120° C. The yield was 103 g (48.3% based on carbohydrate input) in a black powder form. The filtered liquid had a pH of 4. Electrochemical properties such as capacitance and lithium intercalation capacity will be measured for the resulting carbon particles.

Example 13

High-Fructose Corn Syrup as a Precursor for Carbon Particles

High fructose corn syrup (HFCS) was purchased from a commercial source (ADM). According to the USDA, HFCS contains 24% water, and the rest sugars. Three different varieties of HFCS were purchased: HFCS 42, HFCS 55, and HFCS 90. HFCS 55 contains approximately 55% fructose and 42% glucose; HFCS 42 contains approximately 42% fructose and 53% glucose and HFCS 90 contains approximately 90% fructose and 10% glucose.

Hydrothermal Run

An aqueous precursor solution was made by dissolving 30% by volume of HFCS in deionized water. 60 mL of HFCS 55 was mixed with 140 mL of deionized water. The density of HFCS at room temperature is 1.38 g/mL. Since HFCS contains 76% sugar, the weight of the sugar present in 30% HFCS was calculated as follows:

(60 mL×1.38 g/mL)×76%=62.93 g.

The aqueous HFCS solution was placed in a 1 L pressure vessel lined with TEFLON® sleeve. The pressure vessel was sealed and heated to a reaction temperature of 200° C. The pressure vessel was kept at the reaction temperature for a dwell time of about 1 hour. After the dwell time, the pressure vessel was cooled down to room temperature. The resulting material was recovered from the pressure vessel and filtered using a vacuum filtration system. The filtered material was collected and dried in a vacuum oven kept at 120° C.

Some carbon particles were chemically activated by mixing them with ground-up potassium hydroxide. To make 30% HFCS 55 with 1.2 g/L KOH, 60 mL of HFCS 55 was mixed with 140 mL of deionized water and 0.24 g of KOH was added. The weight of the sugar present in 30% HFCS+ 1.2 g/L KOH was calculated as follows:

0.24 g+(60 mL×1.38 g/mL)×76%=63.17 g.

The hydrothermal reaction temperature was 200° C. and the dwell time was kept at one hour. The % yield was determined by taking the weight of the material output from the HTS (e.g., the dried carbon material) and dividing it by the weight of sugar in the HFCS (e.g., HFCS contains 76% sugar) into the HTS vessel and multiplying the result by 100. The carbon materials made with KOH additive had a yield of 42%, while the carbon materials made without KOH had a yield of only 39%.

FIG. 61 shows SEM images of carbon particles made hydrothermally from 30% HFCS 55. The SEM images showed that particles were mostly non-spherical. Some spherical structures could be observed sporadically. The carbon particles made from pure HFCS without any additives were smaller in size compared to the ones made with the KOH additive. The carbon materials made without KOH additive had a particle size of 2-3 microns, while the carbon materials made with KOH additive had a particle size of 4-8 microns.

In another sample, an aqueous precursor solution was made by dissolving 10% by volume of HFCS in deionized water. 20 mL of HFCS 55 was mixed with 180 mL of deionized water. The weight of the sugar present in 10% HFCS was calculated as follows:

(20 mL×1.38 g/mL)×76%=20.98 g.

Some carbon particles were chemically activated by mixing them with ground-up potassium hydroxide. To make 10% HFCS 55 with 1.2 g/L KOH, 20 mL of HFCS 55 was mixed with 180 mL of deionized water and 0.24 g of KOH was added. The weight of the sugar present in 10% HFCS was calculated as follows:

0.24 g+(20 mL×1.38 g/mL)×76%=21.22 g.

The material yield increased as the dwell time was increased from 1 hour to 18 hours. The yield of carbon materials HFCS 55+1.2 g/L KOH additive for 1 hour was 27%, 40% for 5 hour dwell, and 41% for 18 hour dwell. There was no change in the yield for carbon materials made with and without KOH additive.

FIG. 62 shows SEM images of carbon materials made from HFCS 55+1.2 g/L KOH at different dwell times: 18 hour, 5 hour and 1 hour. The SEM images of carbon materials made from HFCS 55 without KOH additive are also shown for comparison. The SEM images show that the particles are mostly non-spherical. Some spherical structures could be observed sporadically. The size of the particles increased as a result of KOH addition. The particle size was 0.8-1.2 microns for the 10% HFCS 55 without any additives and 1-2 microns for the 10% HFCS 55 with 1.2 g/L KOH. The particle size for the chemically activated particles was unchanged with increase in the dwell time. The particle size was 1-2 microns from 5 to 18 hours.

FIG. 63 shows carbons particles made from different concentrations of HFCS 55 (10%, 20%, 30%) with the addition of 1.2 g/L of KOH. The particle size increased as the concentration of HFCS was increased. The particle size was 1-2 microns for the carbon materials made from 10% HFCS 55+1.2 g/L KOH, 3-6 microns for 20% HFCS 55+1.2 g/L KOH, and 4-8 microns for 30% HFCS 55+1.2 g/L KOH. The carbon particles appeared to be more spherical at higher concentrations of HFCS than at lower concentrations. The material yield increased as the concentration of HFCS was increased. The yield was 27% for carbon materials made from 10% HFCS 55+1.2 g/L KOH, 41% for 20% HFCS 55+1.2 g/L KOH, and 42% for 30% HFCS 55+1.2 g/L KOH.

Effect of Temperature on Particle Size and Yield

Table 22 shows the hydrothermal synthesis conditions used and the material yield for different varieties of HFCS: 42, 44, and 90 with and without the addition of 0.1 wt % KOH. The HTS runs were conducted at 150° C. for 5 hours. 10% HFCS was used in all the runs. The pH increased from ~4 to ~10 with the addition of KOH. The pH of the filtrate after the HTS runs dropped to 2-3. Overall, the material yield in HFCS 90 was higher than HFCS 55 and the material yield in HFCS 55 was higher than HFCS 42. The addition of KOH to HFCS 42 resulted in a slight increase in the yield from 4.08% to 5.44%. The addition of KOH to HFCS 90 resulted in a decrease in the yield from 20.22% to 11.08%.

TABLE 22

Hydrothermal synthesis conditions and the material yield for different varieties of HFCS: 42, 55, and 90 with and without KOH additive. The HTS runs were conducted at 150° C.

| Precursor | Conc (volume) | Temp (° C.) | Dwell (Hours) | KOH | Yield* (%) | pH before:after |
|---|---|---|---|---|---|---|
| HFCS 42 | 10% | 150 | 5 | n/a | 4.08 | 4.1:2.4 |
| HFCS 55 | 10% | 150 | 5 | n/a | 8.17 | 4.6:2.3 |
| HFCS 90 | 10% | 150 | 5 | n/a | 20.22 | 4.5:2.2 |
| HFCS 42 | 10% | 150 | 5 | 0.1 wt % KOH | 5.44 | 10.6:3.1 |
| HFCS 55 | 10% | 150 | 5 | 0.1 wt % KOH | 7.49 | 10.6:3.0 |
| HFCS 90 | 10% | 150 | 5 | 0.1 wt % KOH | 11.08 | 10.6:3.0 |

FIG. 64 shows SEM images of carbon particles made from 10% HFCS 42, 55, and 90, with and without the addition of 0.1 wt % of KOH. The hydrothermal runs were conducted at 150° C. for 5 hours. The particle size of carbon particles made from HFCS 90 was greater than HFCS 55. The carbon particles made from HFCS 90 had a size of 2-3µ and the ones made from HFCS 55 had a diameter of 300 nm-350 nm. The carbon particles made from HFCS 42 were smaller than HFCS 55. The carbon particles made from HFCS 42 had a size range of 150 nm-200 nm and HFCS 55 had a diameter range of 300 nm-350 nm. The carbon particles made from HFCS without any additive showed irregular/asymmetric shape but the carbon particles made from HFCS with KOH additive showed a more spherical shape with a narrow size distribution. The carbon particles made from HFCS 42 and 55 with KOH additive had a slight increase in particle size. For example, for HFCS 55, the particle size increased from 300-350 nm to 400-600 nm with KOH addition. There was a slight decrease in particle size in HFCS 90 with KOH addition. The particle size dropped from 2-3µ to 0.9-1.1µ with KOH addition.

TABLE 23

Hydrothermal synthesis conditions and the material yield for different varieties of HFCS: 42, 55, and 90 with and without KOH additive. The HTS runs were conducted at 175° C.

| Precursor | Conc (volume) | Temp (° C.) | Dwell (Hours) | KOH | Yield* (%) | pH before:after |
|---|---|---|---|---|---|---|
| HFCS 42 | 10% | 175 | 5 | n/a | 18.57 | 4.2:2.4 |
| HFCS 55 | 10% | 175 | 5 | n/a | 29.65 | 4.6:2.3 |
| HFCS 90 | 10% | 175 | 5 | n/a | 31.11 | 4.5:2.3 |
| HFCS 42 | 10% | 175 | 5 | 0.1 wt % KOH | 19.93 | 10.7:3.1 |
| HFCS 55 | 10% | 175 | 5 | 0.1 wt % KOH | 25.08 | 10.6:3.0 |
| HFCS 90 | 10% | 175 | 5 | 0.1 wt % KOH | 24.50 | 10.7:3.1 |

Table 23 shows the hydrothermal synthesis conditions used and the material yield for different varieties of HFCS: 42, 44, and 90 with and without the addition of 0.1 wt % KOH. The HTS runs were conducted at 175° C. for 5 hours. 10% HFCS was used in all the runs. The pH increased from ~4 to ~10 with the addition of KOH. The pH of the filtrate after the HTS runs dropped to 2-3. Overall, the material yield from HFCS 90 was higher than HFCS 55 and the material yield in HFCS 55 was higher than HFCS 42. Overall, the material yield at 175° C. was higher than the material yield at 150° C. There was a slight increase in the material yield with HFCS 42 with addition of KOH. The material yield increased from 18.57% to 19.93% with the addition of KOH to HFCS 42. The material yield decreased in the case of HFCS 55 and 90 with the addition of KOH. The yield dropped from 29.65% to 25.08% in HFCS 55 with the addition of KOH and the yield dropped from 31.11% to 24.50% in HFCS 90 with the addition of KOH.

FIG. 65 shows the SEM images of carbon particles made from 10% HFCS made from HFCS 42, 55, and 90 with and without the addition of 0.1 wt % of KOH. The hydrothermal runs were conducted at 175° C. for 5 hours. The carbon particles made from HFCS without any additive showed irregular/asymmetric shaped particles with a broad diameter distribution. For example, HFCS 55 had smaller particles in the size range of 500-600 nm and larger particles in the size range 3-4 µm. The carbon particles made from HFCS with KOH additive showed a more spherical shape with a narrow size distribution. For example, HFCS 55 had particles with size range of 0.8-1 µm. The particles made from HFCS 90 had larger particles than the particles made from HFCS 42 and 55.

TABLE 24

Hydrothermal synthesis conditions and the material yield for different varieties of HFCS: 42, 55, and 90. The HTS runs were conducted at 200° C.

| Precursor | Conc (volume) | Temp (° C.) | Dwell (Hours) | KOH | Yield* (%) | pH Before:after |
|---|---|---|---|---|---|---|
| HFCS 42 | 10% | 200 | 5 | n/a | 42.68 | 4.1:2.2 |
| HFCS 55 | 10% | 200 | 5 | n/a | 40.15 | 4.8:2.2 |
| HFCS 90 | 10% | 200 | 0 | n/a | 39.57 | 4.5:2.1 |

Table 24 shows the hydrothermal synthesis conditions used and the material yield for different varieties of HFCS: 42, 44, and 90. The HTS runs were conducted at 200° C. for 5 hours. 10% HFCS was used in all the runs. The pH of the filtrate after the HTS runs dropped to ~2. The material yield from HFCS 42, 55, and 90 was about 40%. The material yield at 200° C. was higher than the material yield at 175° C. and 150° C.

FIG. 66 shows SEM images (low and high magnification) of carbon particles made from 10% HFCS made from HFCS 42, 55, and 90 at 200° C. for 5 hours. The carbon particles made from HFCS 42, 55, and 90 had a broad diameter distribution. For example, HFCS 42 had smaller particles in the size range 0.9-1 µm and large particles in the diameter range 7-10 µm. The carbon particles made from HFCS 42 were more spherical than HFCS 55 and 90. The carbon particles made from HFCS 90 had fused spheres and irregular shaped-particles.

FIG. 67 shows cyclic voltammograms and charge/discharge plots of supercapacitor cells composed of activated carbons made from 10% HFCS 55 and 10% HFCS 55 with 1.2 g/L KOH additive. The activated carbons were made by physical activation of carbons made from 10% HFCS 55 and 10% HFCS 55 with 1.2 g/L KOH additive. Physical activation was conducted in the presence of ammonium hydroxide. The furnace was heated at a rate of 10° C./min to activation temperature of 850° C. and the soak time was 30 minutes. Ammonium hydroxide was injected using a syringe pump once the furnace reached a temperature of 600° C. and turned off after soak time. The mass loss for the 10% HFCS 55 sample after activation was 80% and the 10% HFCS 55 with 1.2 g/L KOH sample after activation was 77%. Nitrogen gas was used the carrier gas and maintained at 250 cc/min throughout the activation.

The cyclic voltammograms were generated by subjecting the supercapacitor cell to a scan rate of 20 mV/s and sweeping between 0-2.0V, 0-2.25V, and 0-2.5V. The cyclic voltammograms displayed rectangular shape characteristic of capacitive carbons. The charge/discharge plots were generated at constant current densities of 500 mA/g, 1500 mA/g, 2000 mA/g and 2500 mA/g between 0-2.0V, 0-2.25V, and 0-2.5V. The charge/discharge plots showed linear curves characteristic of capacitive materials. The charge/discharge plots also displayed negligible IR drop. The activated carbons made from 10% HFCS with KOH additive showed superior capacitive performance compared to the activated carbons made from 10% HFCS without KOH additive. The activated carbons made from 10% HFCS with KOH additive was less resistive than the one without KOH additive. The activated carbons made from 10% HFCS showed capacitance of 102 F/g and 68 F/cc and the activated carbons made from 10% HFCS with KOH additive showed capacitance of 116 F/g and 73 F/cc.

Chemical Activation of HFCS

Carbonization of high fructose corn syrup (HFCS) derived carbon: The "green" carbon precursor (5.1853 grams of CNB 321; HFCS 55; 1:9 HFCS/DI water (v/v), 200° C., 5 hours in the pressure vessel) was placed into a ceramic boat, and placed inside of a horizontal Lindberg Blue tube furnace. The furnace was then purged with nitrogen for approximately 10 minutes at a nitrogen flow rate of 0.2 L/min; the nitrogen purge was kept on throughout the duration of the entire carbonization procedure. The sample was then ramped up to 500° C. at a ramp rate of 5° C./min, and held at 500° C. for a dwell time of one hour (60 minutes). The furnace was then cooled to room temperature, and the ceramic boat was removed from the furnace. The black solid residue was then collected and weighed, with a mass of 3.0408 grams recovered, corresponding to a carbonization mass loss of 41.3%.

Activation procedure (carbonized HFCS 55 derived carbon; sample Chem-030): Potassium hydroxide (6.0046 grams) was ground up to a fine powder in an agate mortar, and was then mixed thoroughly with 2.0099 grams of carbonized HFCS-derived carbon (3:1 mass ratio of KOH/carbon). The solid mixture was then placed inside of a stainless steel boat, and loaded into a horizontal Lindberg Blue tube furnace. The furnace was then purged with nitrogen for approximately 10 minutes at a nitrogen flow rate of 0.2 L/min; the nitrogen purge was kept on throughout the duration of the entire activation procedure. The sample was then ramped up to 800° C. at a ramp rate of 5° C./min, and held at 800° C. for a dwell time of three hours (180 minutes). The furnace was then cooled to room temperature, and the stainless steel boat was removed from the furnace. The black solid residue was then collected and rinsed thoroughly with deionized water, until the pH of the filtrate was 6. The black solid residue was then dried under vacuum at 120° C. The dried product was then weighed, and 0.8572 grams was recovered, corresponding to an activation mass loss of 57.4%. The electrochemical performance of sample Chem-030 is shown in FIG. 68. The energy density in 1.8M TEMABF$_4$/PC, as measured by cyclic voltammetry (FIG. 68a) was 161 F/g, 65 F/cc (measured at 1V), and 162 F/g, 68 F/cc (measured at 1.5V). The constant current charge/discharge data is shown in FIG. 68b.

The electrochemical impedance spectroscopy (EIS) data in 1.8M TEMABF$_4$/PC for Chem-030 is shown in FIG. 69. The Nyquist plot is shown in FIG. 69a; the Bode plot is shown in FIG. 69b; the plot of C" (F) vs. frequency is shown in FIG. 69c, and the plot of C'(F) vs. frequency is shown in FIG. 69d. The bias voltage was 2V, and the average electrode active mass and thickness were 0.002976 grams and 65 microns, respectively. The sample had an RC time constant of 3.16 seconds, and a specific capacitance of 147 F/g, measured at 0.001 Hz.

Activation procedure (uncarbonized HFCS 55 derived carbon; sample Chem-028): Potassium hydroxide (6.0436 grams) was ground up to a fine powder in an agate mortar, and was then mixed thoroughly with 2.0095 grams of uncarbonized HFCS-derived carbon (3:1 mass ratio of KOH/carbon). The solid mixture was then placed inside of a stainless steel boat, and loaded into a horizontal Lindberg Blue tube furnace. The furnace was then purged with nitrogen for approximately 10 minutes at a nitrogen flow rate of 0.2 L/min; the nitrogen purge was kept on throughout the duration of the entire activation procedure. The sample was then ramped up to 800° C. at a ramp rate of 5° C./min, and held at 800° C. for a dwell time of three hours (180 minutes). The furnace was then cooled to room temperature, and the stainless steel boat was removed from the furnace. The black solid residue was then collected and rinsed thoroughly with deionized water, until the pH of the filtrate was 6. The black solid residue was then dried under vacuum at 120° C. The dried product was then weighed, and 0.3027 grams was recovered, corresponding to an activation mass loss of 84.9%. The electrochemical performance of sample chem-028 is shown in FIG. 70. The energy density in 1.8M TEMABF$_4$/PC, as measured by cyclic voltammetry (FIG. 70a) was 185 F/g, 50 F/cc (measured at 1V), and 195 F/g, 53 F/cc (measured at 1.5V). The constant current charge/discharge data is also shown in FIG. 70b.

The electrochemical impedance spectroscopy (EIS) data in 1.8M TEMABF$_4$/PC for Chem-028 is shown in FIG. 71. The Nyquist plot is shown in FIG. 71a; the Bode plot is shown in FIG. 71b; the plot of C" (F) vs. frequency is shown in FIG. 71c, and the plot of C'(F) vs. frequency is shown in FIG. 71d. The bias voltage was 2V, and the average electrode active mass and thickness were 0.001656 grams and 54 microns, respectively. The sample had an RC time constant of 1.58 seconds, and a specific capacitance of 166 F/g, measured at 0.001 Hz.

Example 14

High Oxygen Content Activated Carbon Particles

The chemical composition of carbon particles are shown in Table 25. The carbonized xylose-derived carbon particles had high carbon content of almost 91% and oxygen content of 7.36%. The carbon particles made from xylose+phloroglucinol mixture had oxygen content of almost 11%, the carbonized material had oxygen content of 14%, and the physically activated material had oxygen content of almost 12%. The carbon particles made from HFCS 55 had oxygen content of almost 8%, the carbonized HFCS had oxygen content of 11%, and the physically activated HFCS had oxygen content of almost 11%. The carbon content of green HFCS carbon was as high as 80%, the carbonized material was 85%, and the physically activated material was 82%. The overall nitrogen content increased from 1% to 3.53% as a result of physical activation. The overall ash content increased as a result of activation and further increased with an increase in the activation dwell time. There were negligible amounts of trace elements and metals in the carbon particles.

TABLE 25

Chemical Analysis of Activated Carbon Nanospheres

| Comment | % Oxygen | % C | % H | % Hitrogen | % Ash | Sulfur (ppm) | P (ppm) | Cl (ppm) | K (ppm) | Cu (ppm) | Mn (ppm) | Fe (ppm) |
|---|---|---|---|---|---|---|---|---|---|---|---|---|
| xylose CMS carbonized at 850° C. | 7.36 | 91.48 | <0.1 | 1.16 | <0.1 | 72 | 6 | 331 | 100 | 197 | 1 | 75 |
| xylose + phloroglucinol CMS - green | 10.82 | 83.59 | 3.8 | 1 | 0.79 | 32 | <1 | 283 | 55 | 226 | 0.5 | 34 |
| xylose + phloroglucinol CMS - carbonized @ 500° C. for 1 h in $N_2$ | 14.15 | 82.19 | 2.53 | 1.13 | <0.1 | 32 | 15 | 266 | 92 | 227 | 0.7 | 92 |
| xylose + phloroglucinol CMS - physically activated $NH_4OH$, 30 minutes @ 850° C. | 11.85 | 84.8 | <0.1 | 3.35 | <0.1 | 92 | 22 | 239 | 470 | 187 | 1 | 94 |
| 40% HFCS 55 - green | 7.68 | 79.64 | 5.99 | 1.21 | 5.48 | 39 | 14 | 227 | 51 | 105 | 0.8 | 50 |
| 40% HFCS CMS - carbonized @ 500 C, 1 h in $N_2$ | 11.1 | 84.73 | 2.55 | 1.62 | <0.1 | 59 | 19 | 285 | 70 | 205 | 0.6 | 51 |
| 40% HFCS 55, physically activated $NH_4OH$, 30 minutes @ 850° C. | 10.52 | 82.35 | <0.1 | 3.53 | 3.6 | 96 | 19 | 442 | 211 | 316 | 1 | 85 |

Example 15

Salt Treatment with 10% NaCl Before Activation

Potassium hydroxide (6.0002 grams) was ground up to a fine powder in an agate mortar, and was then mixed thoroughly with 2.0042 grams of carbonized xylose/phloroglucinol-derived carbon (3:1 mass ratio of KOH/carbon). The solid mixture was then placed inside of a stainless steel boat, and loaded into a horizontal Lindberg Blue tube furnace. The furnace was then purged with nitrogen for approximately 10 minutes at a nitrogen flow rate of 0.2 L/min; the nitrogen purge was kept on throughout the duration of the entire activation procedure. The sample was then ramped up to 800° C. at a ramp rate of 5° C./min, and held at 800° C. for a dwell time of three hours (180 minutes). The furnace was then cooled to room temperature, and the stainless steel boat was removed from the furnace. The black solid residue was then collected and rinsed thoroughly with deionized water, until the pH of the filtrate was ~6-7. The black solid residue was then dried under vacuum at 120° C. The dried product was then weighed, and 0.8351 grams was recovered, corresponding to an activation mass loss of 58.3%. The energy density in 1.8M TEMABF4/PC, as measured by cyclic voltammetry was 176 F/g, 52 F/cc (measured at 1V), and 184 F/g, 55 F/cc (measured at 1.5V).

The cyclic voltammetry data for salted (Chem-056) and unsalted (Chem-064) samples are plotted together in FIG. 72, demonstrating the enhancement in capacitive energy storage caused by the soaking pretreatment of uncarbonized xylose/phloroglucinol carbon spheres in 10% NaCl solution. Table 26 is a summary of the mass loss and electrochemical performance data for the two samples.

TABLE 26

Summary of mass loss and performance data for Chem-056 and Chem-064.

| sample | Carbonization mass loss (%) | Activation mass loss (%) | F/g (1 V, 1.5 V) | F/cc (1 V, 1.5 V) |
|---|---|---|---|---|
| no pretreatment | 37 | 60 | 130, 135 | 43, 44 |
| pretreatment | 41 | 58 | 176, 184 | 52, 55 |

FIG. 73 is the electrochemical impedance spectroscopy data for Chem-064 and Chem-056, plotted on the same graph. FIG. 73a) is a Nyquist plot, FIG. 73b) is a Bode plot, FIG. 73c) is a plot of C"(F) vs. frequency, and FIG. 73d) is a plot of capacitance (F/g) vs. frequency for the two samples. The salted sample (Chem-056) has lower ESR than the unsalted material (Chem-064), as seen in the Bode plot. The plot of C" (F) vs. frequency (4c) demonstrates enhanced charge/discharge kinetics for Chem-056, with an RC time constant of 1.99 s, vs. 3.16 seconds for the unsalted material. The specific capacitance for the salted material is 171 F/g, while the unsalted material is 148 F/g, with both values being measured at a frequency of 0.002 Hz (5d).

Example 16

Salt Treatment with 10% Sodium Acetate Before Activation

Potassium hydroxide (6.0123 grams) was ground up to a fine powder in an agate mortar, and was then mixed thoroughly with 2.0051 grams of carbonized xylose/phloroglucinol-derived carbon (3:1 mass ratio of KOH/carbon). The solid mixture was then placed inside of a stainless steel boat, and loaded into a horizontal Lindberg Blue tube furnace. The furnace was then purged with nitrogen for approximately 10 minutes at a nitrogen flow rate of 0.2 L/min; the nitrogen purge was kept on throughout the duration of the entire activation procedure. The sample was then ramped up to 800° C. at a ramp rate of 5° C./min, and held at 800° C. for a dwell time of three hours (180 minutes). The furnace was then cooled to room temperature, and the stainless steel boat was removed from the furnace. The black solid residue was then collected and rinsed thoroughly with deionized water, until the pH of the filtrate was ~6-7. The black solid residue was then dried under vacuum at 120° C. The dried product was then weighed, and 0.8834 grams was recovered, corresponding to an activation mass loss of 55.9%. The energy density in 1.8M TEMABF4/PC, as measured by cyclic voltammetry was 167 F/g, 51 F/cc (measured at 1V), and 176 F/g, 54 F/cc (measured at 1.5V).

The cyclic voltammetry data for Chem-064 (no pretreatment), and Chem-072 (10% sodium acetate pretreatment)

are plotted together in FIG. 74, demonstrating the enhancement in capacitive energy storage caused by the soaking pretreatment of uncarbonized xylose/phloroglucinol carbon spheres in 10% sodium acetate solution. Table 27 is a summary of the mass loss and electrochemical performance data for the two samples.

TABLE 27

Summary of mass loss and performance data for Chem-064 and Chem-072.

| sample | Carbonization mass loss (%) | Activation mass loss (%) | F/g (1 V, 1.5 V) | F/cc (1 V, 1.5 V) |
|---|---|---|---|---|
| no pretreatment | 37 | 60 | 130, 135 | 43, 44 |
| pretreatment | 41 | 56 | 167, 176 | 51, 54 |

TABLE 28

BET surface area, total pore volume, and pore size distributions for activated samples.

| Sample ID | $S_{BET}$ (m$^2$/g) | TPV (cm$^3$/g) | micro (%) | meso (%) | macro (%) |
|---|---|---|---|---|---|
| Chem-064 | 3096 | 1.48692 | 56.6 | 42.9 | 0.5 |
| Chem-056 (10% NaCl) | 3290 | 1.55050 | 62.3 | 37.1 | 0.6 |
| Chem-072 (10% sodium acetate) | 2931 | 1.38016 | 59.4 | 39.8 | 0.8 |

Example 17

In another aspect, the disclosure relates to a battery pack, battery bank, or battery stack that includes one or more electrochemical cells or battery cells. Each cell (e.g., having a lithium ion battery chemistry) includes a cathode with a cathode terminal, the cathode including the disclosed carbon particles described above, an anode with an anode terminal, an ion conductor such as an electrolyte, and a battery cell housing. The battery pack, bank, or stack includes a housing and optionally control electronics to control discharge and/or charging of the cells contained therein. The cells can be connected in parallel and/or series combinations. In one embodiment, a battery pack includes a ruggedized housing that contains a plurality of battery cells and a plurality of pack terminals (e.g., positive, negative, communication) by which the cell interfaces with external devices or systems.

The above-disclosed compositions are useful for numerous other applications wherein portable power with high energy density is desired. For example, Li/CF$_x$ cells that include the disclosed carbon particles can be useful for military applications such as a radio, a global positioning system unit, night vision goggles, a watch, a sonobuoy, and a hybrid electric combat vehicle. Electrochemical cells or batteries that include the disclosed carbon particles also can be useful for storing energy harnessed from renewable sources of power, such as from solar, wind, geothermal, ocean thermal, and ocean wave power. Accordingly, battery packs, banks, stacks, or cells described herein can be interfaced with such power sources.

Example 18

In another aspect, the disclosure relates to a capacitor pack, capacitor bank, or capacitor stack that includes one or more capacitors (e.g., ultracapacitors having a lithium chemistry). Each capacitor includes two electrodes that may be symmetric (i.e., carbon-carbon) or asymmetric, and an electrolyte disposed between the two electrodes. The capacitor pack, bank, or stack includes a housing and optionally control electronics to control discharge and/or charging of the capacitors contained therein. The capacitors can be connected in parallel and/or series combinations. In one embodiment, a capacitor pack includes a ruggedized housing that contains a plurality of capacitors and a plurality of pack terminals by which the capacitor interfaces with external devices or systems.

The above-disclosed compositions are useful for numerous other applications wherein energy storage with high power density is desired. For example, a capacitor pack that includes the disclosed carbon particles can be useful for hybrid vehicles. Hybrid platforms for heavy vehicles and machinery can demand the delivery of high currents at a suitable voltage. The disclosed carbon particles, particularly when used in a capacitor pack, can exhibit the gravimetric/volumetric capacitance needed for such hybrid platforms.

Example 19

Direct KOH Activation of Uncarbonized Carbon Particles (Sample Chem-004)

Potassium hydroxide (8.018 g) was ground up and mixed with 2.0041 grams of "green" carbon nanospheres (sphere diameter ~200-300 nm; 4:1 KOH/carbon nanosphere ratio) in an agate mortar. The mixture was then added to a stainless steel boat, and placed into a horizontal Lindberg Blue tube furnace. The furnace was then purged with nitrogen for ~10 minutes at a nitrogen flow rate of 0.2 L/min; the nitrogen purge was kept on throughout the duration of the entire activation procedure. The sample was then ramped up to 115° C. at 5° C./min., and held at that temperature for 18.5 hours. The furnace then ramped up from 115° C. to 700° C. at a ramp rate of 5° C./min., and was held at 700° C. for 2 hours. The furnace then cooled down to room temperature, and the stainless steel boat was removed from the furnace. The solid residue was then removed from the boat, and rinsed with 1500 mL of deionized water, until the pH of the filtrate was ~7. The remaining material was then dried in a vacuum oven overnight at 120° C. The recovered mass of carbon was 0.5781 grams, corresponding to an activation mass loss of 71.2%. FIG. 75 shows the dried activated product. The uncarbonized carbon particles lost their shape during the course of the KOH activation, and the material was exfoliated, resulting in the formation of large, irregularly shaped carbon particles.

The electrochemical performance of sample Chem-004 was then evaluated in 1.8M triethylmethylammonium tetrafluoroborate (1.8M TEMABF$_4$) in propylene carbonate, a common electrochemical capacitor electrolyte. Electrodes were fabricated by mixing the activated carbon with or without KS6 graphite (5%), which serves as a conductivity enhancer. Teflon 6C (3%) served as the mechanical binder for the electrode structure. The carbon, graphite, and Teflon were mixed together thoroughly in an agate mortar with a pestle, and were bound up into a Teflon-bonded sheet. Electrodes were then punched out, and rolled to a desired thickness of 55-65 microns, with an electrode diameter of 12 mm. Symmetric carbon/carbon electrochemical capacitors were fabricated inside of an argon-filled glove box, using 1.8M TEMABF4 in PC as the organic electrolyte, and Celgard 3501 as the separator. The electrochemical performance of the symmetric carbon/carbon cells was then evaluated using Corrware and Zplot software. Experiments performed on the cells included cyclic voltammetry, constant current charge/discharge, leakage current measurements, and electrochemical impedance spectroscopy measurements. FIG. 76 *a*) shows the cyclic voltammetry data (sweep rate=0.02 V/s) for Chem-004 (with 5% KS6 graphite), while FIG. 76*b*) demonstrates the constant current charge/discharge behavior (normalized to active mass) of Chem-004. The capacitance of the material, as determined by cyclic voltammetry, was 173 F/g, 68 F/cc (measured at 1V), and 180 F/g, 71 F/cc (measured at 1.5V).

Electrochemical impedance spectroscopy measurements were performed on sample Chem-004 by applying a DC potential of 2V (i.e. charged state), an AC potential perturbation of 10 mV peak to peak, and sweeping the frequency from 1 MHz to 0.001 Hz, and the electrolyte was 1.8M TEMABF$_4$ in PC. FIG. 77 shows the Nyquist plot (FIG. 77*a*), Bode plot (FIG. 77*b*), C" vs. frequency (FIG. 77*c*), and C' vs. frequency (FIG. 77*d*) plots. The average active mass of material was 0.00277 g, and the average electrode thickness was 63 microns. The measured capacitance of the material was 160 F/g at 0.001 Hz, and had an RC time constant of 5.01 seconds.

BET surface area measurements on sample Chem-004 were carried out on a Micromeritics ASAP 2020 Surface Area and Porosity Analyzer. The BET surface areas, total pore volumes, and pore size distributions are listed in Table 29.

activated carbon was 0.9508 grams, corresponding to an activation mass loss of 52.6%.

FIG. 78 shows the dried activated product of sample Chem-010. The carbon nanospheres that were carbonized at 500° C. prior to the KOH activation retained their shape during the course of the activation, and the material was spherical, with typical particle diameters in the range of 200-300 nm.

A composite electrode was made by mechanically mixing, in weight percentage, about 48.5% Chem-004, about 48.5% Chem-010, and about 3% Teflon 6C. The composite electrode was substantially free of KS6 graphite. The electrochemical performance of the composite electrode was evaluated using 1.8M TEMABF$_4$ in PC as the electrolyte. FIG. 79 *a*) shows cyclic voltammetry (sweep rate=0.02 V/s) data, and FIG. 79 *b*) shows the constant current charge/discharge data. The capacitance values of the composite electrode measured at 1V were 174 F/g, 68 F/cc, which are substantially equal to the capacitance values for Chem-004, and higher than the values for Chem-010. At 1.5V, the capacitance of the composite electrode measured 182 F/g, 72 F/cc, which represents a substantial improvement relative to both Chem-004 and Chem-010.

Electrochemical impedance spectroscopy measurements were performed on the composite electrode by applying a DC potential of 2V (i.e. charged state), and sweeping the frequency from 1 kHz to 0.001 Hz. The electrolyte was 1.8M TEMABF$_4$ in PC. FIG. 80 shows the Nyquist plot (FIG. 80*a*), Bode plot (FIG. 80*b*), C" vs. frequency (FIG. 80*c*), and

| Sample ID | $S_{BET}$ (m²/g) | TPV (cm³/g) | micro (%) | Abs. micro. PV (cm³/g) | meso (%) | Abs. meso. PV (cm³/g) | macro (%) | Abs. micro. PV (cm³/g) |
|---|---|---|---|---|---|---|---|---|
| Chem-004 | 2725 | 1.21733 | 74.1 | 0.9020 | 24.7 | 0.3006 | 1.2 | 0.0014 |

Example 20

Composite Electrode of Spherical and Non-Spherical Carbon Particles

A composite electrode was made by adding substantially equal parts of uncarbonized substantially non-spherical carbon particles of Example 19 (sample Chem-004) and chemically activated substantially spherical carbon particles (sample Chem-010). Although this Example describes the ratio of substantially non-spherical carbon particles to the substantially spherical carbon particles as about 50%:50%, other ratios are possible, e.g., 80%:20% or 20%:80%.

For the sample Chem-010, potassium hydroxide (8.0094 g) was ground up and mixed with 2.0038 g (4:1 KOH/carbon nanospheres) of 500° C. carbonized carbon nanospheres in an agate mortar. The mixture was then added to a stainless steel boat, and placed into a horizontal Lindberg Blue tube furnace. The furnace was then purged with nitrogen for ~10 minutes at a nitrogen flow rate of 0.2 L/min; the nitrogen purge was kept on throughout the duration of the entire activation procedure. The sample was then ramped up to 800° C. at a ramp rate of 5° C./min., and held at 800° C. for three hours. The furnace was then cooled to room temperature, and the stainless steel boat was removed from the furnace. The solid residue was then removed from the boat, and rinsed with 2000 mL of deionized water, until the pH of the filtrate was ~6. The remaining material was then dried in a vacuum oven overnight at 120° C. The recovered mass of C' vs. frequency (FIG. 80*d*) plots. The average active mass of material was 0.00282 g, and the average electrode thickness was 63.5 microns. The measured capacitance of the material was 159 F/g at 0.001 Hz, and had an RC time constant of 5.01 seconds.

It is understood that the invention may embody other specific forms without departing from the spirit or central characteristics thereof. The disclosure of aspects and embodiments, therefore, are to be considered as illustrative and not restrictive. While specific embodiments have been illustrated and described, other modifications may be made without significantly departing from the spirit of the invention.

What is claimed is:

1. A method of making a composite electrode, the method comprising:
   preparing a set of uncarbonized asymmetrical carbon nanoparticles by hydrothermal dehydration of a solution of carbohydrates, followed by activation of formed nanoparticles;
   preparing a set of activated carbonized carbon nanoparticles by hydrothermal dehydration of a solution of carbohydrates, followed by carbonization and activation of formed nanoparticles; and
   mixing the set of uncarbonized asymmetrical carbon nanoparticles with the set of activated carbonized nanoparticles to form a composite electrode.

2. The method of claim 1, wherein the sets of activated carbonized carbon nanoparticles and the uncarbonized asymmetrical carbon nanoparticles are substantially equal by weight.

3. A method of making a composite electrode, the method comprising:
preparing a set of uncarbonized asymmetrical carbon nanoparticles by hydrothermal dehydration of a solution of carbohydrates, followed by activation of formed nanoparticles;
preparing a set of activated carbonized carbon nanoparticles by hydrothermal dehydration of a solution of carbohydrates, followed by carbonization and activation of formed nanoparticles; and
mixing the set of uncarbonized asymmetrical carbon nanoparticles with the set of activated carbonized nanoparticles to form a composite electrode, wherein the mixed sets have a gravimetric capacitance of over 100 F/g and a volumetric capacitance of over 50 F/cc.

4. The method of claim 3, wherein sets of activated carbonized carbon nanoparticles and the uncarbonized asymmetrical carbon nanoparticles are substantially equal by weight.

5. The method of claim 1, wherein the solution of carbohydrates comprise a carbohydrate selected from the group consisting of glucose, glucosamine, fructose, xylose, sucrose, maltose, packaging peanuts, rayon fiber, starch, cellulose, rice water, bourbon waste, peanut shells, macadamia nut shell, potato, sweet potato, banana peel, orange peel, sugar beet juice, sour milk, corn cob, high fructose corn syrup, bamboo fiber, pistachio shell, coconut shell, fruit cocktail liquid, sweet potato yam liquid, sea weed, pasta water, corn starch, and tapioca.

6. The method of claim 1, wherein the hydrothermal dehydration comprises a reaction temperature from about 140° C. to about 230° C.

7. The method of claim 6, wherein the hydrothermal dehydration is in a pressure vessel pressurized to less than about 350 psi.

8. The method of claim 1, wherein the weight of carbon in the sets is at least about 60% of the weight of carbon in the carbohydrate solution.

9. The method of claim 1, wherein the carbohydrate solution comprises at least one additive selected from the group consisting of potassium hydroxide, sodium hydroxide, ammonium hydroxide, cysteine, phloroglucinol, ammonium phosphate, ammonium hydroxide, boric acid, lead nitrate, melamine, sodium lauryl sulfate, ammonium tetraborate, methane sulfonic acid, ethylene glycol, hydroquinone, catechol, resorcinol, ammonium bicarbonate, oxalic acid, citric acid, acetic acid, acrylic acid, ammonium chloride, ammonium sulfate, polyethylenimine, and urea.

10. The method of claim 1, wherein the activation of formed nanoparticles comprises mixing with potassium hydroxide, potassium carbonate, sodium hydroxide, sodium carbonate, or a mixture thereof.

11. The method of claim 1, wherein the activation comprises subjecting the formed nanoparticles to a gas flow of ammonia, ammonium hydroxide, steam, carbon dioxide, or a combination thereof.

12. The method of claim 1, wherein the formed nanoparticles are mixed with a metal-based salt before activation.

13. The method of claim 1, wherein the solution is placed in the pressure vessel on a carbohydrate-based substrate.

* * * * *